United States Patent
Kato

(10) Patent No.: US 11,017,544 B2
(45) Date of Patent: May 25, 2021

(54) COMMUNICATION TERMINAL, COMMUNICATION SYSTEM, COMMUNICATION CONTROL METHOD, AND RECORDING MEDIUM

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 16/526,617

(22) Filed: Jul. 30, 2019

(65) Prior Publication Data

US 2020/0043188 A1    Feb. 6, 2020

(30) Foreign Application Priority Data

Jul. 31, 2018  (JP) .............................. JP2018-143865
Jul. 25, 2019  (JP) .............................. JP2019-137065

(51) Int. Cl.
*G06T 7/20*  (2017.01)
*G06T 7/579*  (2017.01)
*G06K 9/20*  (2006.01)

(52) U.S. Cl.
CPC ............ *G06T 7/579* (2017.01); *G06K 9/2027* (2013.01); *G06T 7/20* (2013.01); *G06K 2209/21* (2013.01);
(Continued)

(58) Field of Classification Search
CPC . G06T 7/579; G06T 7/20; G06T 2207/30232; G06T 2207/30242;
(Continued)

(56) References Cited

U.S. PATENT DOCUMENTS

2004/0095467 A1* 5/2004 Koizumi .......... G08B 13/19669
                                                    348/169
2017/0269810 A1   9/2017 Kanda et al.
(Continued)

FOREIGN PATENT DOCUMENTS

JP    2007-128332    5/2007
JP    2013-114304    6/2013
(Continued)

OTHER PUBLICATIONS

Kinjal A Joshi, Darshak G. Thakore: "A Survey on Moving Object Detection and Tracking in Video Surveillance System", Jul. 2012, International Journal of Soft Computing and Engineering (IJSCE), ISSN:2231-2307, vol. 2, Issue 3, pp. 44-48. (Year: 2012).*
(Continued)

*Primary Examiner* — Siamak Harandi
(74) *Attorney, Agent, or Firm* — Oblon, McClelland, Maier & Neustadt, L.L.P.

(57) ABSTRACT

A communication terminal communicably connected with a server, including circuitry to: obtain first image data of at least a part of a first object detected at a first point of time; transmit the first image data to the server to request verification of the first image data; obtain second image data of at least a part of a second object detected at a second point of time, the second point of time being a time later than the first point of time; calculate a distance between a first position indicating a position of the first object at the first point of time, and a second position indicating a position of the second object at the second point of time; and control not to transmit the second image data based on a determination indicating that the calculated distance is equal to or less than a threshold

15 Claims, 37 Drawing Sheets

(52) U.S. Cl.
CPC ............... *G06T 2207/30232* (2013.01); *G06T 2207/30242* (2013.01)

(58) Field of Classification Search
CPC ........... G06T 2207/10016; G06T 7/292; G06T 7/254; G06K 9/2027; G06K 2209/21; G06K 9/00295; G06K 9/00228
See application file for complete search history.

(56) References Cited

U.S. PATENT DOCUMENTS

| 2018/0341385 | A1 | | 11/2018 | Kato | |
|---|---|---|---|---|---|
| 2019/0080197 | A1 | | 3/2019 | Kato | |
| 2020/0020110 | A1 | * | 1/2020 | Lee | ........................... G06T 7/20 |

FOREIGN PATENT DOCUMENTS

| JP | 2017-204825 | 11/2017 |
|---|---|---|
| WO | WO2019/026828 A1 | 2/2019 |

OTHER PUBLICATIONS

U.S. Appl. No. 16/369,830, filed Mar. 29, 2019, Yoshinaga Kato, et al.
U.S. Appl. No. 16/366,422, filed Mar. 27, 2019, Takamichi Katoh, et al.

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

FIG. 10A

| MODEL NUMBER (TYPE) | NUMBER OF IMAGING ELEMENTS | LENS TYPE |
|---|---|---|
| AAA111 | 1 | WIDE-ANGLE LENS |
| AAA112 | 2 | FISH-EYE LENS |
| ... | ... | ... |

FIG. 10B

| NUMBER OF IMAGING ELEMENTS | CYCLE VALUE (fps) |
|---|---|
| 1 | 60 |
| 2 | 30 |
| ... | ... |

FIG. 11A

| NUMBER OF IMAGING ELEMENTS | IMAGE ACQUISITION PROGRAM | INSTALL |
|---|---|---|
| 1 | ProgC01 (1 SYSTEM) | 1 |
| 2 | ProgC02 (2 SYSTEMS) | 1 |
| ... | ... | ... |

FIG. 11B

| NUMBER OF IMAGING ELEMENTS | IMAGE COMPOSITION PROGRAM | INSTALL |
|---|---|---|
| 1 | ProgS01 (IMAGE COMPOSITION) | 0 |
| 2 | ProgS02 (IMAGE COMPOSITION) | 1 |
| ... | ... | ... |

FIG. 11C

| LENS TYPE | DISTORTION CORRECTION PROGRAM | INSTALL |
|---|---|---|
| WIDE-ANGLE LENS | ProgW01 (WIDE-ANGLE CORRECTION) | 1 |
| FISH-EYE LENS | ProgW02 (FISH-EYE CORRECTION) | 1 |
| ... | ... | ... |

FIG. 11D

| AUTHENTICATION SERVER ID | SERVICE PROGRAM | INSTALL |
|---|---|---|
| a01 | ProgD01 (OBJECT DETECTION) | 1 |
| a02 | ProgD02 (OBJECT COUNTING) | 1 |
| a03 | ProgD03 (... PROCESS) | ... |

FIG. 12

| VERIFICATION DATA FILE NAME | NAME |
|---|---|
| kato.jpg | Kato |
| asai.jpg | Asai |
| ... | ... |

FIG. 13

SESSION MANAGEMENT TABLE

| SESSION ID | TERMINAL ID | IP ADDRESS |
|---|---|---|
| se01 | asai@myhost.ricoo.com/theta1 | 1.2.1.3 |
| se02 | asai@myhost.ricoo.com/pc | 1.2.1.4 |
| se03 | jim@myhost.obrom.com/theta2 | 1.2.2.3 |
| ... | ... | ... |

FIG. 14

OBJECT INFORMATION MANAGEMENT TABLE

| NUMBER | POSITION (COORDINATE) | WIDTH | HEIGHT | MATCH FLAG |
|---|---|---|---|---|
| 1 | xn0, yn0 | width0 | height0 | |
| 2 | xn1, yn1 | width1 | height1 | |
| 3 | xn2, yn2 | width2 | height2 | * |
| ... | ... | ... | ... | ... |

FIG. 15

OBJECT DISPLACEMENT MANAGEMENT TABLE

| PARTIAL IMAGE ID | POSITION (COORDINATE) | WIDTH | HEIGHT | VERIFICATION STATUS | NAME | MATCH FLAG |
|---|---|---|---|---|---|---|
| p001 | x0, y0 | width0 | height0 | 0 (BEFORE VERIFICATION) | | |
| p002 | x1, y1 | width1 | height1 | 1 (VERIFYING) | | |
| p003 | x2, y2 | width2 | height2 | | | |
| p004 | x3, y3 | width3 | height3 | 2 (VERIFICATION COMPLETED) | Kato | * |
| ⋮ | ⋮ | ⋮ | ⋮ | ⋮ | ⋮ | ⋮ |

FIG. 17

AUTHENTICATION SERVER MANAGEMENT TABLE

| AUTHENTICATION SERVER ID | AUTHENTICATION SERVER URL |
|---|---|
| a01 | http:// ··· |
| a02 | http:// ··· |
| a03 | http:// ··· |
| ... | ... |

FIG. 18A

AUTHENTICATION MANAGEMENT TABLE

| USER ID (SUBJECT FOR AUTHENTICATION) | PASSWORD |
|---|---|
| asai@myhost.ricoo.com | aaaa |
| jim@myhost.obrom.com | abab |
| ... | ... |

FIG. 18B

AUTHENTICATION MANAGEMENT TABLE

| USER ID (SUBJECT FOR AUTHENTICATION) | PASSWORD |
|---|---|
| asai | baba |
| kurt | bbbb |
| ... | ... |

FIG. 18C

AUTHENTICATION MANAGEMENT TABLE

| USER ID (SUBJECT FOR AUTHENTICATION) | PASSWORD |
|---|---|
| kondo | caca |
| kulbaski | cccc |
| ... | ... |

COMMUNICATION TERMINAL, COMMUNICATION SYSTEM, COMMUNICATION CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2018-143865 filed on Jul. 31, 2018, and 2019-137065, filed on Jul. 25, 2019, in the Japan Patent Office, the entire disclosure of which is hereby incorporated by reference herein.

BACKGROUND

Technical Field

The present disclosure relates to a communication terminal, a communication system, a communication control method, and a recording medium.

Description of the Related Art

Recently, Internet of Things (IoT) attracts attention, such as communication systems utilizing edge computing. In such communication system, a terminal acquires image data, and transmits the image data to a server via the Internet to request for processing to analyze the image data. For example, a cloud service platform is known, which performs processing to recognize a human face at a server. Specifically, a camera is provided at the image acquisition terminal (edge node). The image acquisition terminal transmits image data captured at the camera to a server, to request for performing processing to recognize a human face in the captured image.

In the above-described communication system, the image acquisition terminal transmits the request for processing to the server every time a particular object (such as a human face) is detected, or any change such as a change in position is detected for the particular object. In some cases, the request for processing, which may also include captured image data, is repeatedly transmitted for the same object.

SUMMARY

Example embodiments of the present invention include a communication terminal communicably connected with a server, including circuitry to: obtain first image data of at least a part of a first object detected at a first point of time; transmit the first image data to the server to request verification of the first image data; obtain second image data of at least a part of a second object detected at a second point of time, the second point of time being a time later than the first point of time; calculate a distance between a first position indicating a position of the first object at the first point of time, and a second position indicating a position of the second object at the second point of time; and control not to transmit the second image data based on a determination indicating that the calculated distance is equal to or less than a threshold.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10A is a conceptual diagram illustrating an example of image element data management table;

FIG. 10B is a conceptual diagram illustrating an example of cycle value management table;

FIG. 11A is a conceptual diagram illustrating an example of image acquisition program management table;

FIG. 11B is a conceptual diagram illustrating an example of image composition program management table;

FIG. 11C is a conceptual diagram illustrating an example of distortion correction program management table;

FIG. 11D is a conceptual diagram illustrating an example of service program management table;

FIG. 12 is a conceptual diagram illustrating an example of verification data management table;

FIG. 13 is a conceptual diagram illustrating an example of session management table;

FIG. 14 is a conceptual diagram illustrating an example of object information management table;

FIG. 15 is a conceptual diagram illustrating an example of object displacement management table;

FIG. 17 is a conceptual diagram illustrating an example of authentication server management table;

FIGS. 18A, 18B, and 18C are each a conceptual diagram illustrating an example of authentication management table;

Figure 1:
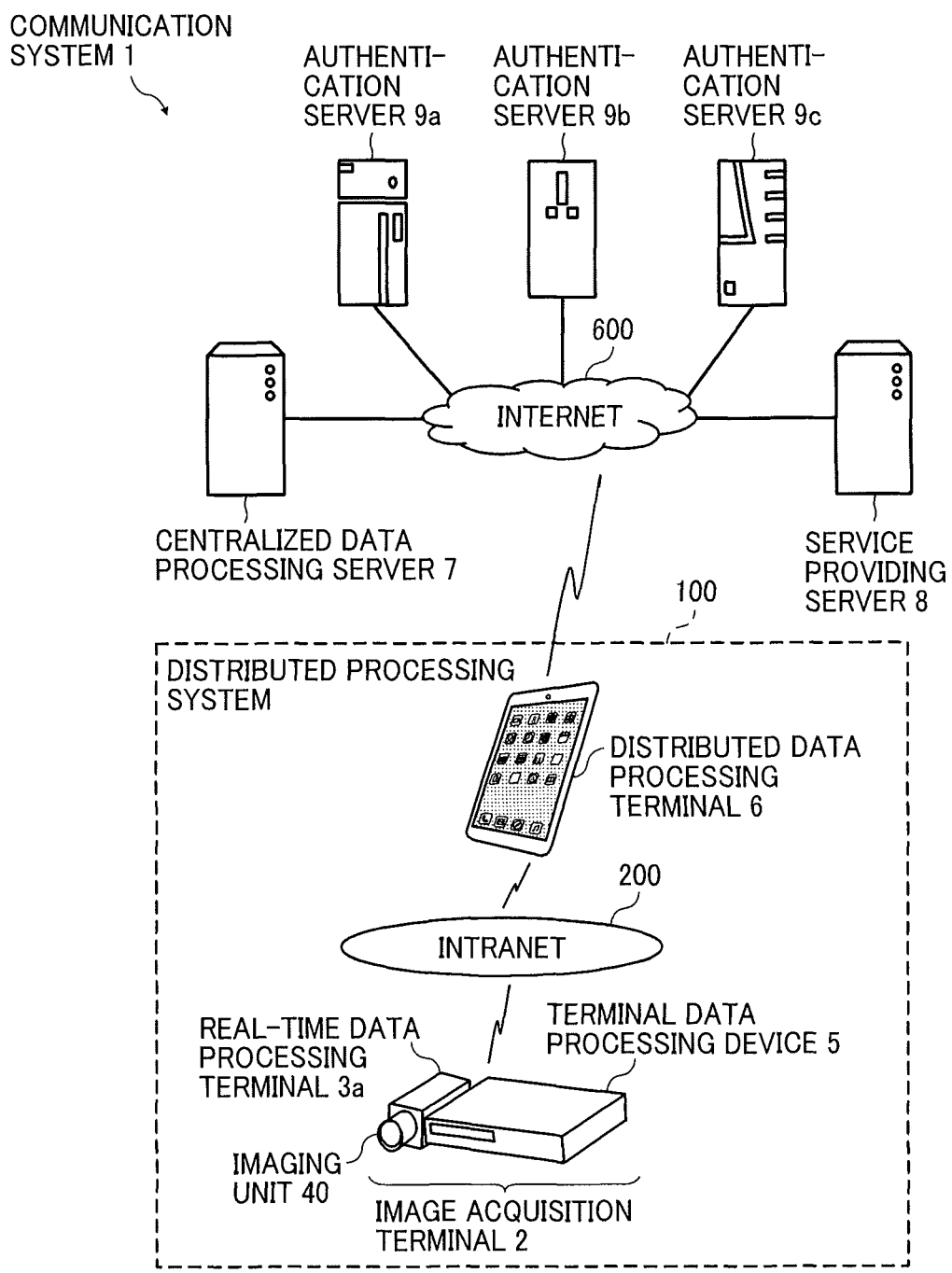
FIG. 1 is a schematic diagram illustrating a communication system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Overview

Referring to the drawings, one or more embodiments of the present invention are described. The following describes a communication system for edge computing. As described below, the image acquisition terminal 2 and the service providing server 8 operate in cooperation with each other to provide various types of services. Specifically, the image acquisition terminal 2, as an edge device, performs operation according to various types of services provided by the service providing server 8.

<<System Configuration>>

FIG. 1 is a schematic diagram illustrating a configuration of a communication system 1 according to an embodiment. As illustrated in FIG. 1, the communication system 1 of this embodiment includes a real-time data processing terminal 3a, a terminal data processing device 5, a distributed data processing terminal 6, the centralized data processing server 7, a service providing server 8, and a plurality of authentication servers 9a, 9b, and 9c. The real-time data processing terminal 3a, the terminal data processing device 5, and the distributed data processing terminal 6 together operate as a distributed processing system 100. While a plurality of distributed processing systems 100 can be provided, FIG. 1 only illustrates one distributed processing system 100 for simplicity.

The terminal data processing device 5 is communicably connected to the distributed data processing terminal 6 via the intranet 200. The distributed data processing terminal 6 is communicably connected to the centralized data processing server 7, the service providing server 8, and the authentication servers 9a, 9b, and 9c via the Internet 600. In this disclosure, the authentication servers 9a, 9b, and 9c are collectively referred to as the authentication server 9.

The real-time data processing terminal 3a is a terminal that captures images in real-time to obtain real-time captured image data. This processing to capture images in real-time may be referred to as real-time processing. The real-time data processing terminal 3a is detachably connected to an imaging unit 40 provided with an image sensor that captures an image of a target, such as a Complementary Metal Oxide Semiconductor (CMOS) sensor or a Charge Coupled Device (CCD) sensor. The real-time data processing terminal 3a digitizes the captured image, which is input from the imaging unit 40, into captured image data, and detects a specific object (here, an image of a human face) in the captured image in real-time (for example, every 1/60 seconds). The real-time data processing terminal 3a transmits, to the terminal data processing device 5, data of a partial image of the captured image having the detected object ("partial image data"). While a human face is a target for detection in this disclosure, any other part of a human body may be detected to generate a captured image, such as a human head, an upper body or a lower body of the human, a part of the human face such as eyes, etc. In alternative to or in addition to the human, any object such as an automobile or an animal may be subjected to detection. When an automobile is a target for detection, a driver or a passenger in the automobile, or a license plate attached to the automobile, may be detected. When an animal is a target for detection, a face, or a pattern of its body may be detected.

The terminal data processing device 5, which is located closely to the real-time data processing terminal 3a, is connected to the real-time data processing terminal 3a in a one-to-one correspondence, for example, by a data bus, a Universal Serial Bus (USB), or the like. The terminal data processing device 5 encodes the partial image data received from the real-time data processing terminal 3a into encoded partial image data in a general-purpose format such as Joint Photographic Experts Group (JPEG). The terminal data processing device 5 further transmits the encoded partial image data to the distributed data processing terminal 6 via the intranet 200, as data to be verified in processing of facial image verification. The real-time data processing terminal 3a and the terminal data processing device 5 are connected with each other so as to together function as the image acquisition terminal 2. While only one image acquisition terminal 2 is shown in this figure, any number of image acquisition terminals 2 may be provided in the system.

The distributed data processing terminal 6 is a computer that accepts various operations from a user, and is disposed at a location relatively close to the terminal data processing device 5, compared to a location of the centralized data processing server 7 with respect to the distributed data processing terminal 6. The distributed data processing terminal 6 previously registers verification data for facial image verification. The distributed data processing terminal 6 transmits a request, via the Internet 600, for requesting the centralized data processing server 7 to verify the data to be verified, using the verification data. In such case, the distributed data processing terminal 6 also transmits, to the centralized data processing server 7, the data to be verified that is received from the terminal data processing device 5 and the pre-registered verification data. In response, the distributed data processing terminal 6 receives, from the centralized data processing server 7, verification result information indicating the verification result including similarity. Further, the distributed data processing terminal 6 displays the received verification result via a graphical interface.

The centralized data processing server 7 is disposed at a location relatively far from the terminal data processing device 5, compared to a location of the terminal data processing device 5 to the distributed data processing terminal 6. The centralized data processing server 7 communicates with the distributed data processing terminal 6 via a communication network such as the Internet 600. In response to reception of the verification request, the verification data, and the data to be verified, the centralized data processing server 7 compares between the verification data and the data to be verified to calculate the degree of similarity. The centralized data processing server 7 transmits verification result information indicating the verification result that includes the calculated similarity to the distributed data processing terminal 6. The verification result information may further include, for example, a device identifier (ID) of the distributed data processing terminal 6 that has transmitted the verification request, a device ID of the image acquisition terminal 2 that has transmitted the data to be verified, the calculated date and time, a target for verification such as a name of a person being verified or a number being verified that may be obtained using the calculated similarity. In case a target for verification is an object other than the person, such as an automobile, aircraft, train, or article (goods), a name, a machine type, an ID code, etc. for identifying a particular object may be included.

The service providing server 8 provides the image acquisition terminal 2 with various services.

The authentication server 9 authenticates the image acquisition terminal 2, to determine whether or not the image acquisition terminal 2 has authorized authority to receive various services from the service providing server 8. As described below, authentication of the image acquisition terminal 2 is performed using an ID of the distributed data processing terminal 6 managing the image acquisition terminal 2.

<<Hardware Configuration>>

Referring now to FIGS. 2 to 6, a hardware configuration of the communication system 1 is described according to the embodiment.

<Hardware Configuration of Real-Time Data Processing Terminal>

Figure 2:
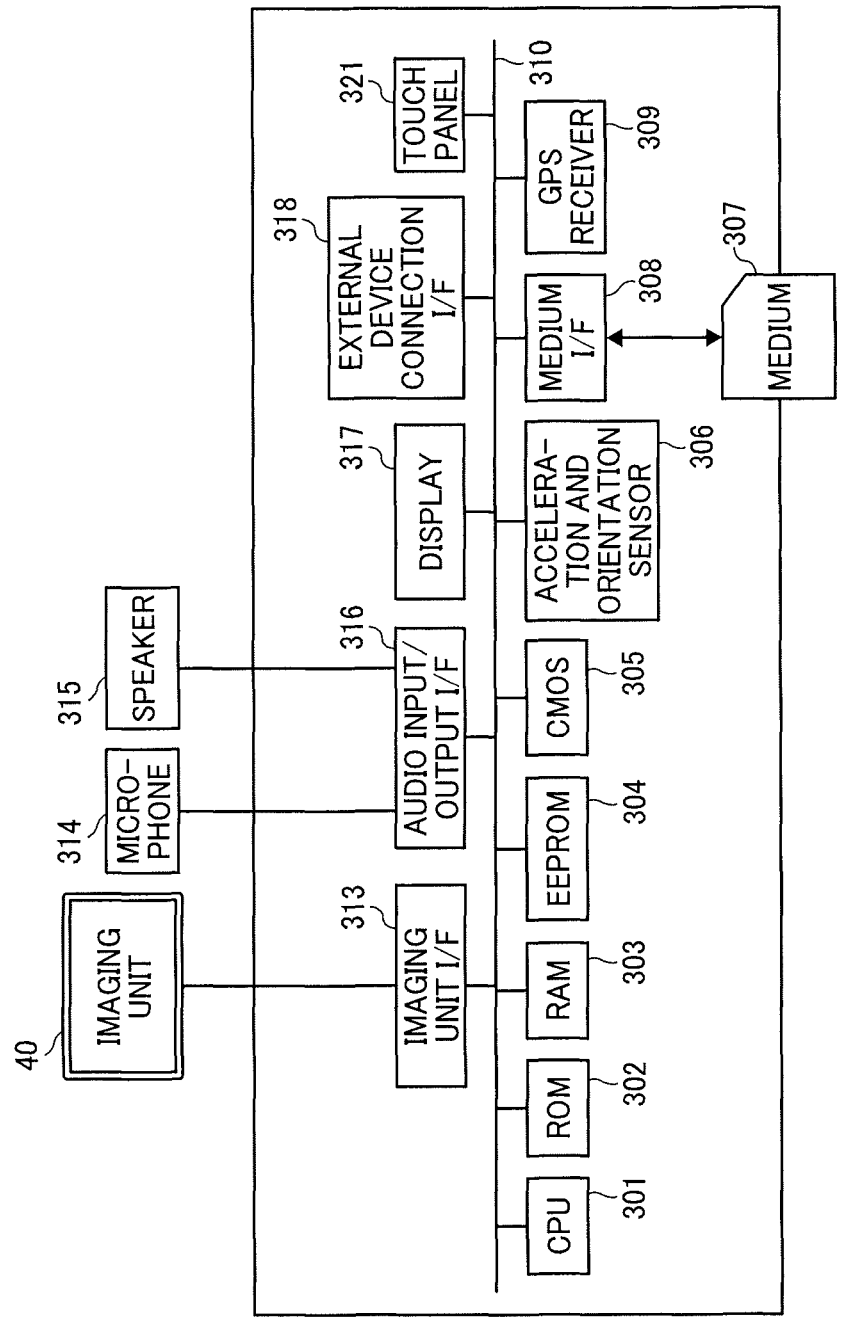
FIG. 2 is a schematic diagram illustrating a hardware configuration of a real-time data processing terminal, according to an embodiment.

FIG. 2 is a schematic diagram illustrating a hardware configuration of the real-time data processing terminal 3a, according to the embodiment. The real-time data processing terminal 3a includes a CPU 301, a ROM 302, a RAM 303, an EEPROM 304, a CMOS sensor (CMOS) 305, an acceleration and orientation sensor 306, a medium I/F 308, and a GPS receiver 309.

The CPU 301 controls entire operation of the real-time data processing terminal 3a. The ROM 302 stores a control program for operating the CPU 301. The RAM 303 is used as a work area for the CPU 301. The EEPROM 304 reads or writes various data such as a control program for the real-time data processing terminal 3a under control of the CPU 301. Under control of the CPU 301, the CMOS sensor 305 captures an image of a target (mainly a blind spot of the imaging unit 40) to obtain captured image data. The acceleration and orientation sensor 306 includes various sensors such as an electromagnetic compass for detecting geomagnetism, a gyrocompass, and an acceleration sensor. The medium I/F 308 controls reading or writing of data with respect to a recording medium 307 such as a flash memory. The GPS receiver 309 receives a GPS signal from a GPS satellite.

The real-time data processing terminal 3a further includes an imaging unit I/F 313, a microphone 314, a speaker 315, an audio input/output I/F 316, a display 317, an external device connection I/F 318, and a touch panel 321.

The imaging unit I/F 313 is a circuit that controls driving of the imaging unit 40 when an external imaging unit 40 is connected to the real-time data processing terminal 3a. The microphone 314 is an example of built-in audio collecting device capable of inputting audio under control of the CPU 301. The audio I/O I/F 316 is a circuit for inputting or outputting an audio signal to the microphone 314 or from the speaker 315 under control of the CPU 301. The display 317 may be a liquid crystal or organic electro luminescence (EL) display that displays an image of a target, an operation icon, or the like. The external device connection I/F 318 is an interface circuit that connects the real-time data processing terminal 3a to various external devices. The touch panel 321 is an example of input device that enables the user to input a user instruction to the real-time data processing terminal 3a through touching a screen of the display 317.

The real-time data processing terminal 3a further includes a bus line 310. The bus line 310 is an address bus or a data bus, which electrically connects the elements in FIG. 2 such as the CPU 301.

<Hardware Configuration of Imaging Unit>

Figure 3A:
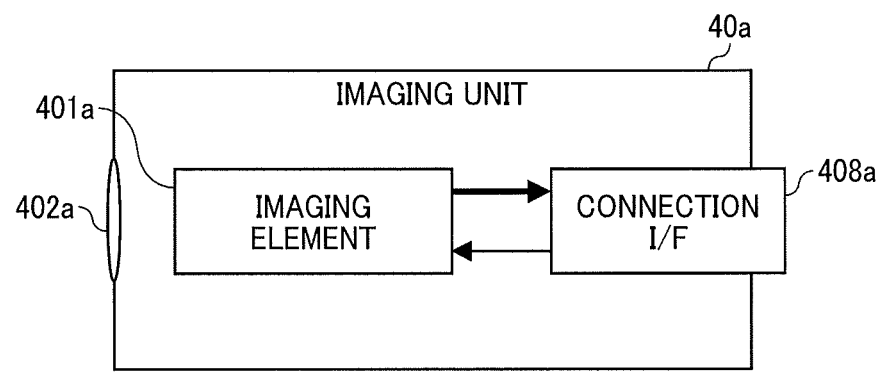
FIGS. 3A and 3B (FIG. 3) are schematic diagrams each illustrating an example of a hardware configuration of an imaging unit, according to an embodiment.
Figure 3B:
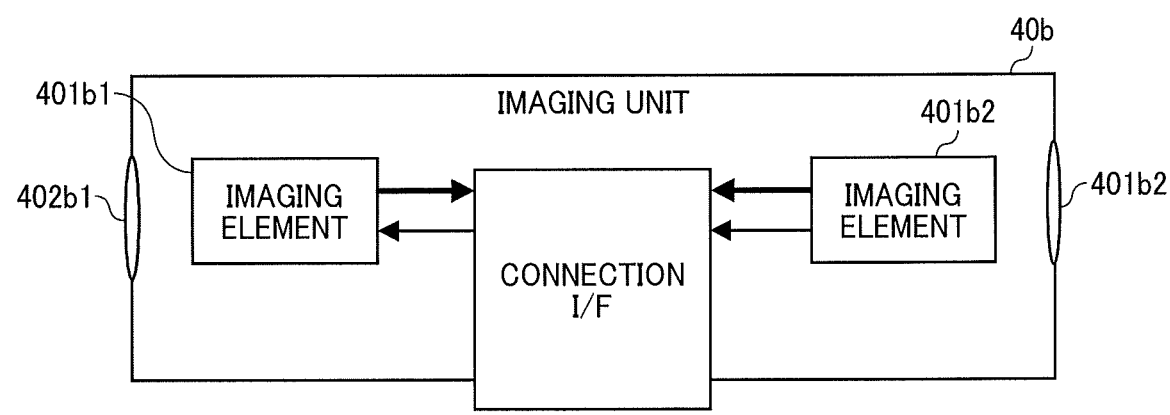

FIGS. 3A and 3B are each a schematic block diagram illustrating a hardware configuration of the imaging unit 40, according to the embodiment. Specifically, FIG. 3A illustrates a hardware configuration of a monocular imaging unit 40a, as an example of the imaging unit 40. FIG. 3B illustrates a hardware configuration of a compound eye imaging unit 40b, as an example of the imaging unit 40. The imaging unit 40 is a generic term for a plurality of types of imaging units (imaging unit 40a, 40b, etc.) having different number of imaging elements or having different types of imaging elements. As described below, example types of imaging elements include, but not limited to, standard zoom lens, fish-eye lens, wide-angle lens, which may be determined according to a specific application of the imaging unit 40.

As illustrated in FIG. 3A, the imaging unit 40a includes an imaging element 401a such as a CMOS or a CCD, a lens 402a, and a connection I/F 408a to be electronically connected to the imaging unit I/F 313 of the real-time data processing terminal 3a. The lenses 402a is, for example, a standard lens, wide-angle lens, or fish-eye lens, which is suitable to correct distortion. When the imaging unit 40a is connected to the imaging unit I/F 313 of the real-time data processing terminal 3a, the imaging element 401a captures an image according to an imaging control signal transmitted from the imaging unit I/F 313 via the connection I/F 408a. Accordingly, the imaging unit 40a illustrated in FIG. 3A obtains a planar image.

As illustrated in FIG. 3B, the imaging unit 40b includes imaging elements 401b1 and 401b2 each may be a CMOS or a CCD, lenses 402b1 and 402b2, and a connection I/F 408b to be electronically connected to the imaging unit I/F 313 of the real-time data processing terminal 3a. The lenses 402b1 and 402b2 are, for example, fish-eye lenses. When the imaging unit 40b is connected to the imaging unit I/F 313 of the real-time data processing terminal 3a, each of the imaging element 401b1 and 401b2 captures an image according to an imaging control signal transmitted from the imaging unit I/F 313 via the connection I/F 408b, and transmits the captured image to the imaging unit I/F 313. Accordingly, a plurality of images is transmitted as captured image data. Accordingly, the imaging unit 40b illustrated in FIG. 3B obtains a spherical image, which may be referred to as an equirectangular projection image as described below.

Figure 4A:
FIG. 4A is a view illustrating a hemispherical image (front side) captured by the imaging unit of FIG. 3B.
Figure 4B:
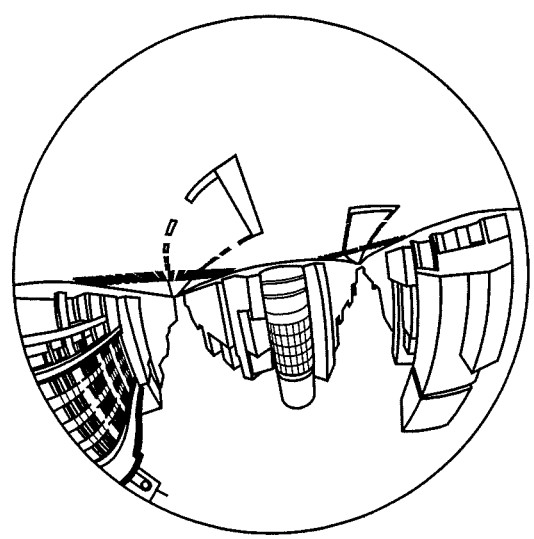
FIG. 4B is a view illustrating a hemispherical image (back side) captured by the imaging unit of FIG. 3B.
Figure 4C:
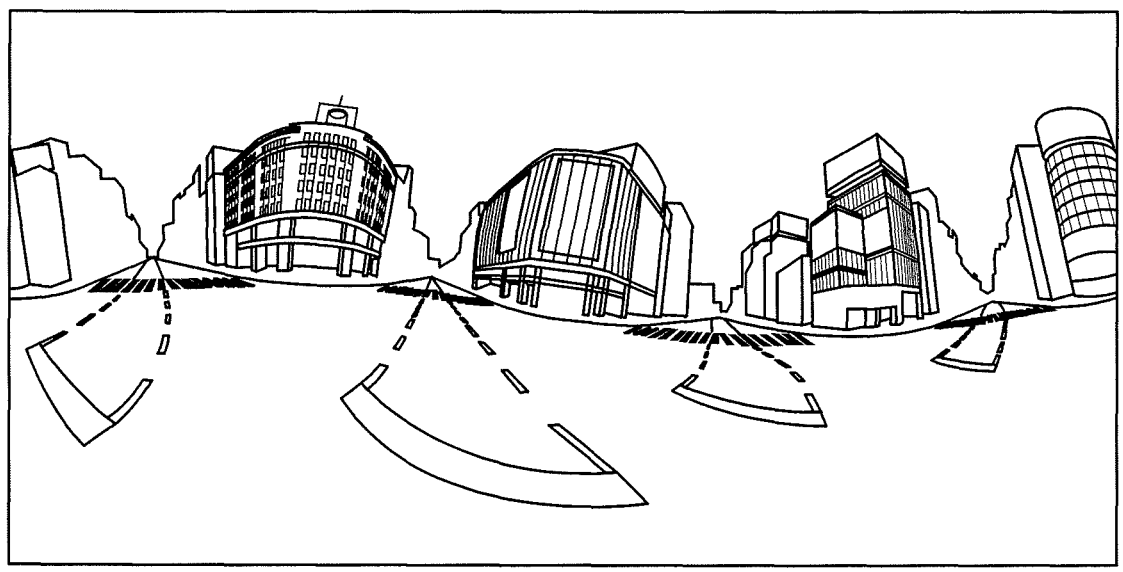
FIG. 4C is a view illustrating an image in equirectangular projection, generated by the imaging unit of FIG. 3B.

Next, referring to FIGS. 4A to 4C, a description is given of an overview of operation of generating an equirectangular projection image EC from the images captured by the imaging unit 40b. FIG. 4A is a view illustrating a hemispherical image (front side) captured by the imaging unit 40b. FIG. 4B is a view illustrating a hemispherical image (back side) captured by the imaging unit 40b. FIG. 4C is a view illustrating an image in equirectangular projection, which is referred to as an "equirectangular projection image" (or equidistant cylindrical projection image) EC.

As illustrated in FIG. 4A, an image captured by the imaging element 401b1 is a curved hemispherical image (front side) taken through the lens 402b1. Similarly, as illustrated in FIG. 4B, an image captured by the imaging element 401b2 is a curved hemispherical image (back side) taken through the lens 402b2. The hemispherical image (front side) and the hemispherical image (back side), which are reversed by 180-degree from each other, are combined by the real-time data processing terminal 3a. This results in generation of the equirectangular projection image EC as illustrated in FIG. 4C. Here, the lenses are arranged to face each other, such that the front side and the back side of the imaging unit 40 can be captured to obtain hemispherical images of both sides, to generate the equirectangular projection image EC as illustrated in FIG. 4C.

<Hardware Configuration of Terminal Data Processing Device and Distributed Data Processing Terminal>

Figure 5:
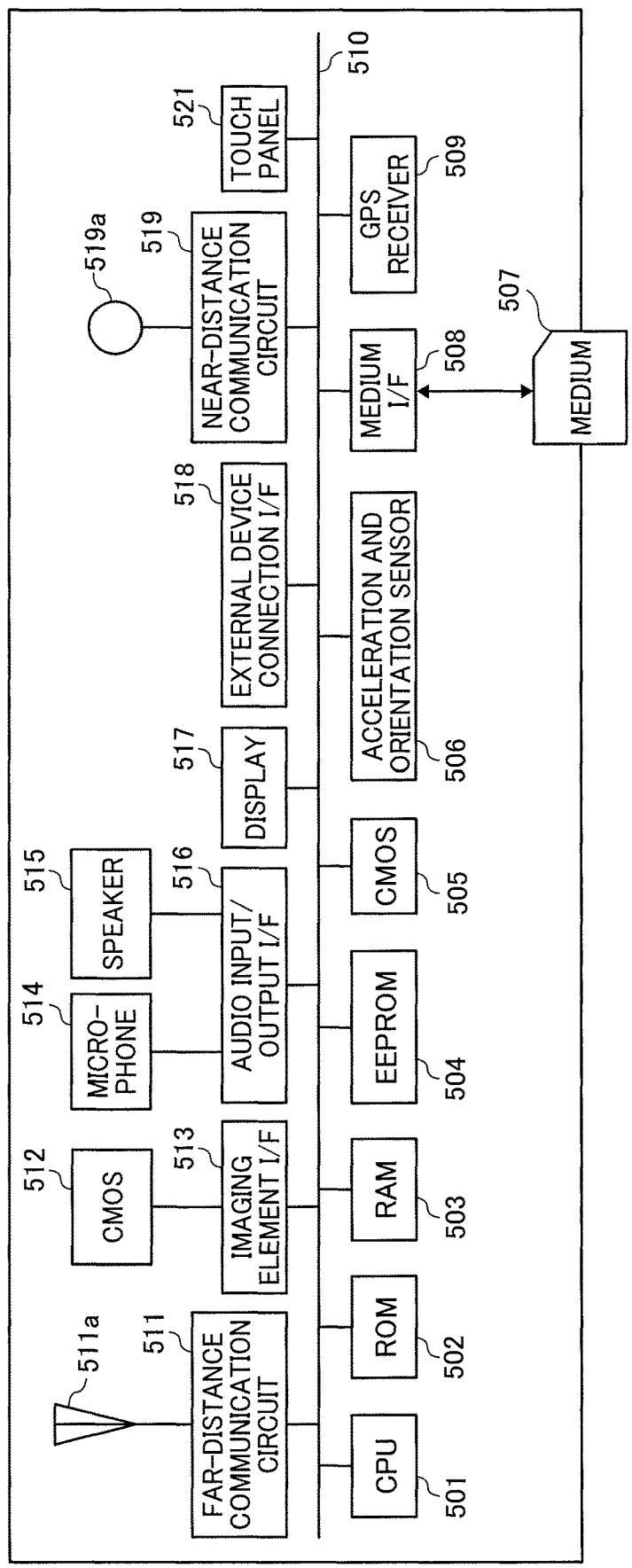
FIG. 5 is a schematic diagram illustrating a hardware configuration of each one of a terminal data processing device and a distributed data processing terminal, according to the embodiment.

FIG. 5 is a schematic diagram illustrating a hardware configuration of each one of the terminal data processing device 5 and the distributed data processing terminal 6, according to the embodiment. Since the terminal data processing device 5 and the distributed data processing terminal 6 are substantially the same in hardware configuration, an example case of the terminal data processing device 5 is described below, while omitting the description of the distributed data processing terminal 6.

As illustrated in FIG. 5, the terminal data processing device 5 includes a CPU 501, a ROM 502, a RAM 503, an EEPROM 504, a CMOS sensor 505, an acceleration and orientation sensor 506, a medium I/F 508, and a GPS receiver 509.

The CPU 501 controls entire operation of the terminal data processing device 5. The ROM 502 stores a control program for controlling the CPU 501. The RAM 503 is used as a work area for the CPU 501. The EEPROM 504 reads or writes various data such as a control program for the terminal data processing device 5 under control of the CPU 501. The CMOS sensor 505 captures an object (for example, a self-image of the user operating the terminal data processing device 5) under control of the CPU 501 to obtain captured image data. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The terminal data processing device 5 further includes a far-distance communication circuit 511, an antenna 511a for the far-distance communication circuit 511, a CMOS sensor 512, an imaging element I/F 513, a microphone 514, a speaker 515, an audio input/output I/F 516, a display 517, an external device connection I/F 518, a near-distance communication circuit 519, an antenna 519a for the near-distance communication circuit 519, and a touch panel 521.

The far-distance communication circuit 511 is a circuit that communicates with another device through the intranet 200, for example. The camera 112 is an example of built-in imaging device capable of capturing a target under control of the CPU 501. The imaging element i/F 513 is a circuit that controls driving of the CMOS 512. The microphone 514 is an example of built-in audio collecting device capable of inputting audio under control of the CPU 501. The audio I/O I/F 516 is a circuit for inputting or outputting an audio signal to the microphone 514 or from the speaker 515 under control of the CPU 501. The display 517 may be a liquid crystal or organic electro luminescence (EL) display that displays an image of a subject, an operation icon, or the like. The external device connection I/F 518 is an interface circuit that connects the terminal data processing device 5 to various external devices. The near-distance communication circuit 519 is a communication circuit that communicates in compliance with the near field communication (NFC) (Registered Trademark), the Bluetooth (Registered Trademark), and the like. The touch panel 521 is an example of input device that enables the user to input a user instruction for operating the terminal data processing device 5 through touching a screen of the display 517.

The terminal data processing device 5 further includes a bus line 510. The bus line 510 may be an address bus or a data bus, which electrically connects various elements such as the CPU 501 of FIG. 5.

<Hardware Configuration of Server>

Figure 6:
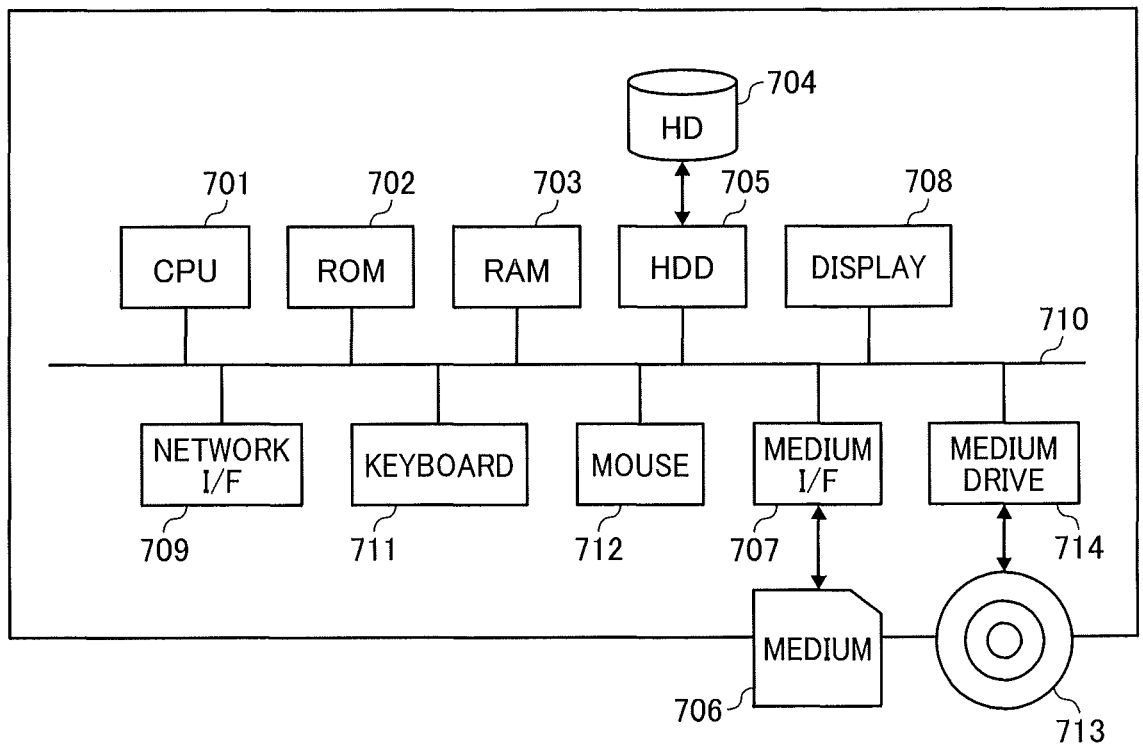
FIG. 6 is a schematic diagram illustrating a hardware configuration of any one of centralized data processing server, service providing server, and authentication server, according to the embodiment.

FIG. 6 is a schematic diagram illustrating a hardware configuration of any one of the centralized data processing server 7, the service providing server 8, and the authentication server 9, according to the embodiment. Since the centralized data processing server 7, the service providing server 8, and the authentication server 9 are substantially the same in hardware configuration, an example case of the centralized data processing server 7 is described below, while omitting the description of the service providing server 8 and the authentication server 9.

FIG. 6 is a schematic diagram illustrating a hardware configuration of the centralized data processing server 7, according to the embodiment. Referring to FIG. 6, the centralized data processing server 7, which is implemented by the general-purpose computer, includes a CPU 701, a ROM 702, a RAM 703, a hard disk (HD) 704, a hard disk drive (HDD) 705, a medium I/F 707, a display 708, a network I/F 709, a keyboard 711, a mouse 712, a medium drive 714, and a bus line 710. Since the centralized data processing server 7 operates as a server, an input device such as the keyboard 711 and the mouse 712, or an output device such as the display 708 does not have to be provided.

The CPU 701 controls entire operation of the centralized data processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network I/F 709 is an interface that controls communication of data with an external device through the Internet 600. The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The medium drive 714 reads or writes various data with respect to an optical disc 713 such as a Compact Disc ReWritable (CD-RW), DVD, and Blue-disc, as an example of removable recording medium.

The centralized data processing server 7 further includes a bus line 710. The bus line 710 is an address bus or a data bus, which electrically connects the elements in FIG. 6 such as the CPU 701. The service providing server 8 and the authentication server 9 each have the same hardware configuration as described above.

<<Software Configuration>>

Figure 7:
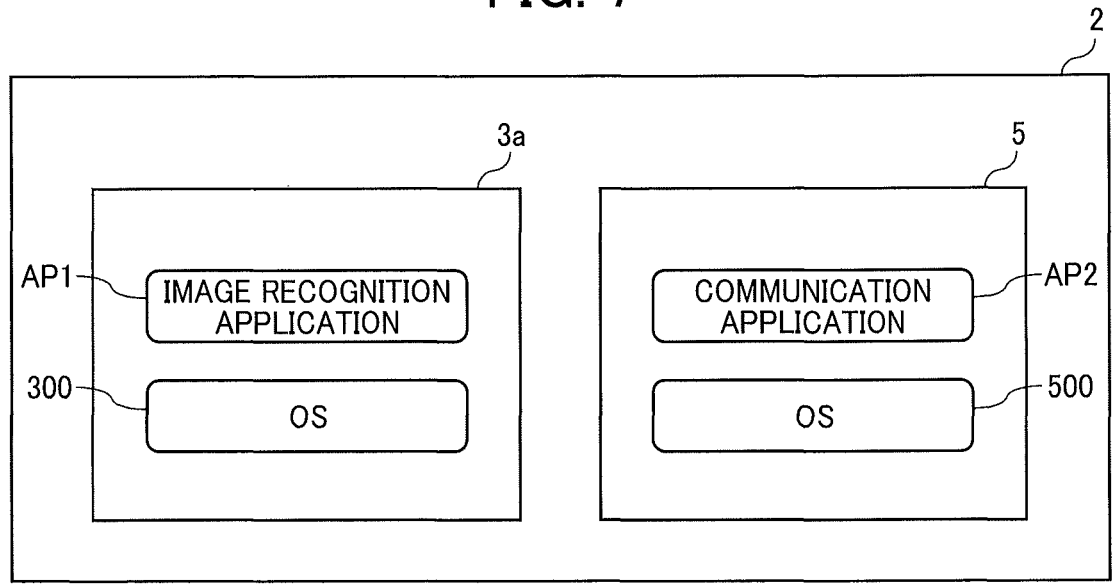
FIG. 7 is a schematic diagram illustrating a software configuration of the real-time data processing terminal and the terminal data processing device, according to the embodiment.

FIG. 7 is a schematic diagram illustrating a software configuration of the real-time data processing terminal 3a and the terminal data processing device 5, which together operate as the image acquisition terminal 2, according to the embodiment.

As illustrated in FIG. 7, the real-time data processing terminal 3a includes OS 300, and image recognition application AP1. The image recognition application AP1 is deployed in a work area, such as the RAM 303 of the real-time data processing terminal 3a. The OS 300 is basic software that controls entire operation of the real-time data processing terminal 3a through providing basic functions. The image recognition application AP1 is an application for recognizing faces of people, animals, etc. from the captured images.

The terminal data processing device 5 includes OS 500 and communication application AP2. The communication application AP2 is deployed in a work area, such as the RAM 503 of the terminal data processing device 5. The OS 500 is basic software that controls entire operation of the terminal data processing device 5 through providing basic functions. The communication application AP2 is an application for communicating with another terminal (device) such as the distributed data processing terminal 6.

In the image acquisition terminal 2, while the real-time data processing terminal 3a performs image recognition, the terminal data processing device 5 communicates with the distributed data processing terminal 6 via the intranet 200 to perform distributed processing to transmit the partial image data as data to be verified, or receive a verification result.

Note that the real-time data processing terminal 3a and the terminal data processing device 5 are each installed with not only the OS but also a driver, a software development kit (SDK), or an application programming interface (API) that may be different between the real-time data processing terminal 3a and the terminal data processing device 5.

Referring to FIGS. 8 to 16C, a functional configuration of the communication system 1 is described according to one or more embodiments.

<<Functional Configuration>>

Figure 8:
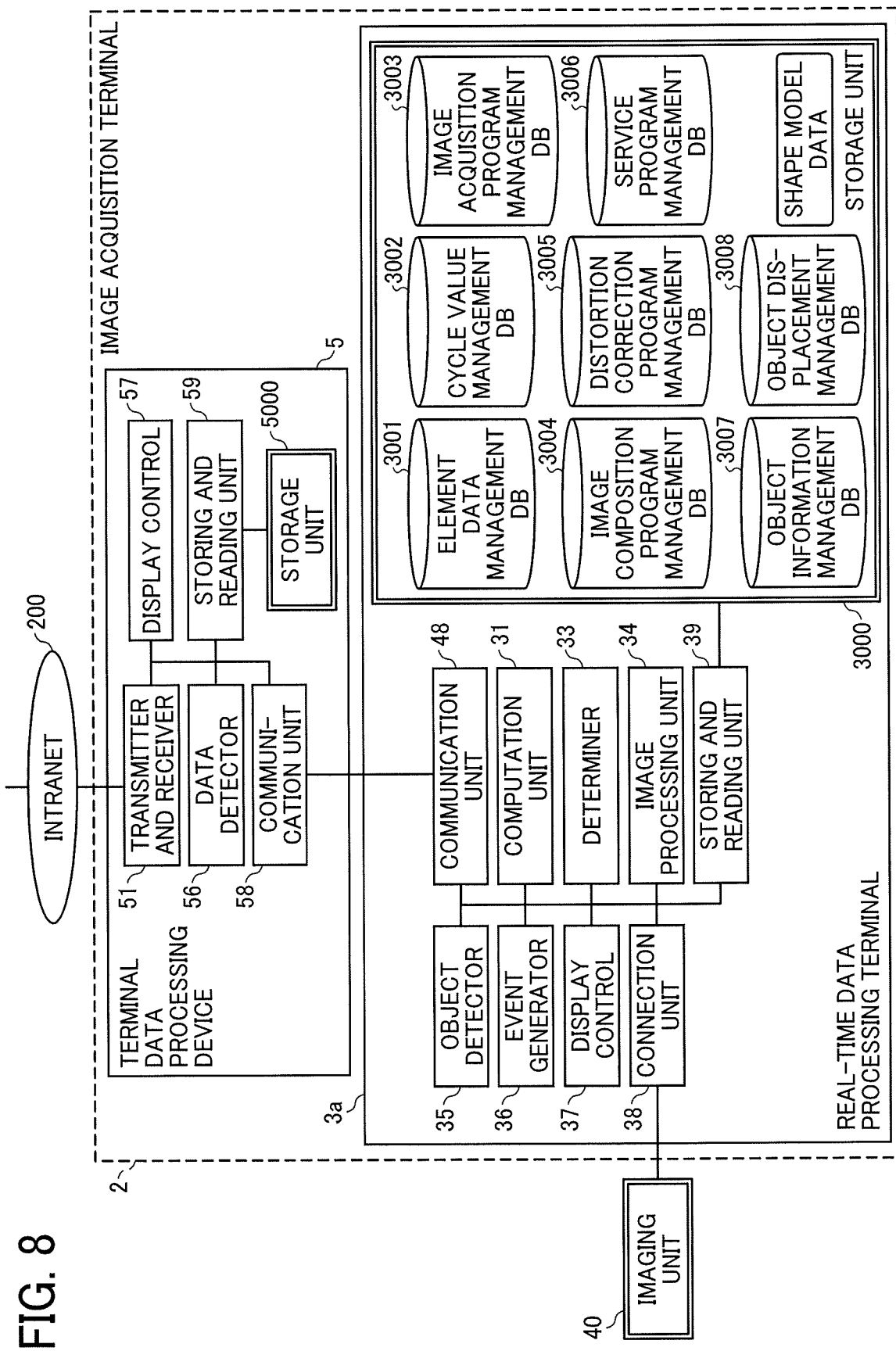
FIG. 8 is a schematic block diagram illustrating a functional configuration of the communication system of FIG. 1, specifically, the image acquisition terminal, according to the embodiment.
Figure 9:
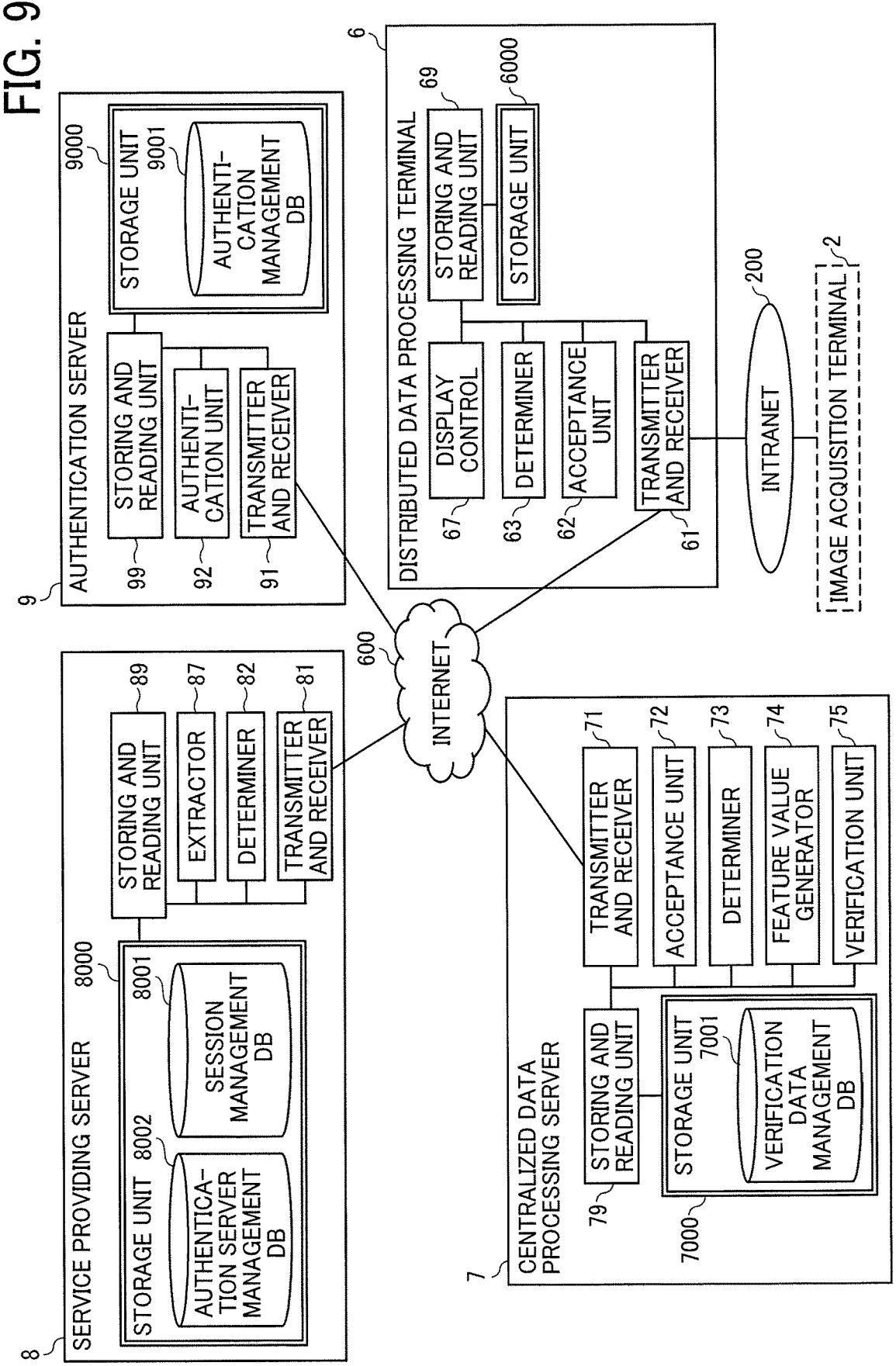
FIG. 9 is a schematic diagram illustrating a functional configuration of the communication system of FIG. 1, specifically, the service providing server, authentication server, distributed data processing terminal, and centralized data processing server, according to the embodiment.

First, referring to FIG. 8 to FIG. 18, functional configurations of terminals, apparatuses, and servers in the communication system 1 are described, according to the embodiment. FIGS. 8 and 9 are a schematic block diagram illustrating a functional configuration of the communication system 1 according to embodiments. FIG. 8 specifically illustrates a functional configuration of the image acquisition terminal 2 in the communication system 1.

<Functional Configuration of Real-Time Data Processing Terminal>

Referring to FIG. 8, the real-time data processing terminal 3a includes a computation unit 31, a determiner 33, an image processing unit 34, an object detector 35, an event generator 36, a display control 37, a connection unit 38, a storing and reading unit 39, and a communication unit 48. These units are functions that are implemented by or that are caused to function by operating any of the hardware components illustrated in FIG. 2 in cooperation with the instructions of the CPU 301 according to the control program expanded from the EEPROM 304 to the RAM 303.

The real-time data processing terminal 3a further includes a storage unit 3000, which is implemented by the ROM 302, the RAM 303, and/or the EEPROM 304 illustrated in FIG. 2. The storage unit 3000 stores therein shape model data, which is described below. The storage unit 3000 further stores an imaging element data management DB 3001, a cycle value management DB 3002, an image acquisition program management DB 3003, an image composition program management DB 3004, a distortion correction program management DB 3005, and a service program management DB 3006.

The imaging element data management DB 3001 is implemented by an imaging element data management table, which is described below referring to FIG. 10A. The cycle value management DB 3002 is implemented by a cycle value management table, which is described below referring to FIG. 10B. The image acquisition program management DB 3003 is implemented by an image acquisition program management table, which is described below referring to FIG. 11A. The image composition program management DB 3004 is implemented by an image composition program management table, which is described below referring to FIG. 11B. The distortion correction program management DB 3005 is implemented by a distortion correction program management table, which is described below referring to FIG. 11C. The service program management DB 3006 is implemented by a service program management table, which is described below referring to FIG. 11D.

(Imaging Element Data Management Table)

FIG. 10A is a conceptual diagram of an example of imaging element data management table. The imaging element data management table stores, for each one or more types of imaging unit 40, a model number of the imaging unit 40, the number of imaging elements included in the imaging unit 40, and a type of one or more lenses in the imaging unit 40, in association with one another. The model number is an example of type information indicating a type of the imaging unit 40 that is determined by the difference in number of imaging elements or type of lenses. In alternative to the model number, an identifier of the imaging unit 40 such as a product number, a bar code, etc. may be used, as long as such identifier is able to determine a number of imaging elements and/or a lens type of the imaging unit 40.

(Cycle Value Management Table)

FIG. 10B is a conceptual diagram illustrating an example of cycle value management table. The cycle value management table stores a number of imaging elements in the imaging unit 40 and a cycle value (frames per second) indicating a cycle time of the object recognition process, which will be described later, in association.

The tables of FIGS. 11A to 11C are each used for managing whether or not an appropriate program is installed in the real-time data processing terminal 3a, depending on a model number of the real-time data processing terminal 3a.

(Image Acquisition Program Management Table)

FIG. 11A is a conceptual diagram of an example of image acquisition program management table. The image acquisition program management table stores a number of imaging elements in the imaging unit 40 and an identifier of an image acquisition program (such as a name) to be installed in the real-time data processing terminal 3a to process data of the imaging unit 40 having a specific number of imaging elements, in association with flag information indicating whether that image acquisition program is installed ("install" field). For example, in case an image acquisition program is installed in the real-time data processing terminal 3a for processing data of the imaging unit 40 having one imaging element, the program name "ProgC01 (1 system)" and the flag information "1" are stored in association with the number of imaging elements "1". Similarly, in case an image acquisition program is installed in the real-time data processing terminal 3a for processing data of the imaging unit 40 having two imaging elements, the program name "ProgC02 (2 systems)" and the flag information "1" are stored in association with the number of imaging elements "2". In case no program is installed, the program name and the flag information "0" indicating that program is not installed are stored in association with the number of imaging elements.

(Image Composition Program Management Table)

FIG. 11B is a conceptual diagram illustrating an example of image composition program management table. The image composition program management table stores a number of imaging elements in the imaging unit 40 and an identifier of an image composition program (such as a name) to be installed in the real-time data processing terminal 3a to process data of the imaging unit 40 having a specific number of imaging elements, in association with flag information indicating whether the image composition program is installed ("install" field). For example, in case an image composition program is installed in the real-time data processing terminal 3a for processing data of the imaging unit 40 having a single imaging element, the program name "ProgS01 (image composition)" and the flag information "1" are stored in association with the number of imaging element "1". For instance, the program identified with "ProgS01 (image composition)" is used to combine images, which are sequentially obtained using the one imaging unit. Similarly, in case an image composition program is installed in the real-time data processing terminal 3a for processing data of the imaging unit 40 having two imaging elements, the program name "ProgS02 (image composition)" and the flag information "1" are stored in association with the number of imaging elements "2". In case no program is installed, the program name and the flag information "0" indicating that program is not installed are stored in association with the number of imaging elements. In alternative example, since composition (combining) of images is not necessary for the imaging unit 40 with one imaging element, no program name may be managed.

(Distortion Correction Program Management Table)

FIG. 11C is a conceptual diagram illustrating an example of distortion correction program management table. The distortion correction program management table stores a type of the lens in the imaging unit 40 and an identifier of the distortion correction program (such as the name) to be installed in the real-time data processing terminal 3a to process data of the imaging unit 40 having a specific lens type, in association with flag information indicating whether the distortion correction program is installed ("install" field). For example, in case a distortion correction program is installed in the real-time data processing terminal 3a for processing data of the imaging unit 40 having the wide-angle lens, the program name "ProgW01 (wide-angle correction)" and the flag information "1" are stored in association with the lens type "wide-angle lens". Similarly, in case a distortion correction program is installed in the real-time data processing terminal 3a for processing data of the imaging unit 40 having the fish-eye lens, the program name "ProgW02 (fish-eye correction)" and the flag information "1" are stored in association with the lens type "fish-eye lens". In case no program is installed, the program name and the flag information "0" indicating that program is not installed are stored in association with the type of imaging elements.

(Service Program Management Table)

FIG. 11D is a conceptual diagram illustrating an example of service program management table. The table of FIG. 11D is used for determining whether a specific program is installed at the image acquisition terminal 2 (in this case, the real-time data processing terminal 3a) to perform a specific service, based on authentication of the image acquisition terminal 2 (or the user operating the image acquisition terminal 2) by the authentication server 9. The service program management table stores an authentication server ID for identifying an authentication server for providing a specific service and an identifier (such as a name of the program) of a service program for providing the specific service to the image acquisition terminal 2, in association with flag information indicating whether the service program is installed ("install" field). For example, in case an object detection program is installed in the real-time data processing terminal 3a, which is authenticated by the authentication server for providing an object detection service, the program name "Prog D01 (object detection)" and the flag information "1" are stored in association with the authentication server ID "a01" of the authentication server providing the object detection service. Similarly, in case an object counting program is installed in the real-time data processing terminal 3a, which is authenticated by the authentication server for providing an object counting service, the program name "Prog D02 (object counting)" and the flag information "1" are stored in association with the authentication server ID "a02" of the authentication server providing the object counting service. In case no program is installed, the program name and the flag information "0" indicating that program is not installed are stored in association with the authentication server ID.

As described above, some application programs, like the programs described above referring to FIGS. 11A to 11C, are installed at the image acquisition terminal 2, for example, when an imaging unit 40 is newly detected or the image acquisition terminal 2 is newly registered to a system. Once such application programs are installed, authentication of the user using the image acquisition terminal 2 (or the distributed data processing terminal 6 that manages the image acquisition terminal 2) to use such application programs is not necessary, as none of these application programs referring to FIGS. 11A to 11C handles information that can identify a user.

On the other hand, some application programs, like the programs described above referring to FIG. 11D, are installed at the image acquisition terminal 2 when a specific service related to identification of a user is requested. Even when such application programs are installed based on authentication, authentication of user using the image acquisition terminal 2 (or the distributed data processing terminal 6 that manages the image acquisition terminal 2) to use such application programs is necessary, as these application programs referring to FIG. 11D handles user-specific information that can identify a user, such as a facial image of the user and a name of the user.

While it is possible that the communication system 1 allows the image acquisition terminal 2 to execute various types of application programs only when the image acquisition terminal 2 is authenticated as an authorized terminal, performing authentication processing for each of the application programs to be executed is cumbersome, resulting in the increase in processing load. This may result in delay in overall processing, which is not desirable especially for the communication system 1 that may be used to detect a suspicious person in which real-time data processing is preferable.

In view of this, the communication system 1 described in this disclosure performs authentication processing only for the application programs that are previously determined as authentication processing is needed, such as the application programs that handle user-specific information. Accordingly, processing of image data, which is acquired at the image acquisition terminal 2, is performed in real time, while still maintaining the security level.

(Object Information Management Table)

FIG. 14 is a conceptual diagram illustrating an object information management table. As described below referring to FIG. 28, as an object is detected in a detectable area P, a record for the detected object is entered into the object information management table. The object information management table stores, for each record, a unique numeral assigned to the record, a position of a partial image of the object detected in the detectable area P, a width of the partial image, a height of the partial image, and an "MATCH" flag. The position of the partial image is represented by X and Y coordinates of the upper left corner of the partial image having a rectangular shape.

(Object Displacement Management Table)

FIG. 15 is a conceptual diagram illustrating an object displacement management table. The object displacement management table stores, for each record, a partial image ID for identifying the partial image, the position of the partial image, the width of the partial image, the height of the partial image, a verification status of the partial image, a name of a person identified with the verified partial image, and a MATCH flag, in association.

The position of the partial image, and the width and the height of the partial image, are information relating to the object, which are read out from the object information management table (FIG. 14). That is, for each object being detected, as a record having the position of the currently-detected object is entered into the object information management table, a record that is previously stored in the object information management table is now entered into the object displacement management table, as a record indicating the position of the previously-detected object. Accordingly, the object-related information, such as the position, width, and height of the partial image, in the object information management table, is used as information indicating the partial image representing the currently-detected object. The object-related information, such as the position, width, and height of the partial image, in the object displacement management table, is used as information indicating the partial image representing the previously-detected object. That is, the partial image of the previously-detected object is the partial image of the object detected at a first point of time. The partial image of the currently-detected object is the partial image of the object detected at a second point of time later than the first point of time, such as after a predetermined time period elapses from the first point of time.

The verification status of the partial image indicates a status of verification processing to be performed at the centralized data processing server 7 with respect to the partial image.

The MATCH flag in the object information management table (FIG. 14), and the MATCH flag in the object displacement management table (FIG. 15) are each entered with a predetermined value (indicated by *), when the currently-detected object in the object information management table and the previously-detected object in the object displacement management table are determined to be the same object. As described below referring to FIG. 28, when the position of the currently-detected object in the object information management table (FIG. 14) is within a predetermined distance from the position of the currently-detected object in the object displacement management table (FIG. 15), these two objects are determined to be the same object, and the MATCH flag having the predetermined value is entered for a record of such object. For simplicity, when the MATCH flag having the predetermined value (indicated by *) is entered, it is referred to that the MATCH flag is added.

(Functional Configuration of Real-Time Data Processing Terminal)

Referring to FIG. 8, a functional configuration of the real-time data processing terminal 3a is described according to the embodiment.

The computation unit 31, which is implemented by instructions of the CPU 301, calculates a distance between a previous location of the object and a current location of the object.

The determiner 33, which is implemented by instructions of the CPU 301, performs various determinations. For example, the determiner 33 refers to the imaging element data management DB 3001 to determine a number of imaging elements or a lens type of the imaging unit 40 having the model type sent from the imaging unit 40.

The image processing unit 34, which is implemented by the instructions of the CPU 301, performs various types of image processing according to one or more programs (image acquisition program, image composition program, distortion correction program, and service program), which are managed using the tables described above referring to FIGS. 11A to 11D. More specifically, the image processing unit 34 executes a first program (for example, an image acquisition program, an image composition program, and a distortion correction program) that does not require authentication for obtaining, to apply first image processing (for example, image acquisition, image composition, and distortion correction) to image data such as captured image data. The image processing unit 34 further executes a second program (for example, a service program) that requires authentication for obtaining, to apply second image processing (for example, an object detection, an object counting) to image data such as captured image data.

The captured image data to be applied with image processing, contains a detection target as described above. For example, the object detector 35, which is implemented by instructions of the CPU 301, detects feature points as a candidate for a specific object such as a human face in the captured image, and refers to the shape model data indicating a shape model of the specific object (such as the human face) to detect the coordinates of the specific object in the captured image. Any desired known method may be used to detect the specific object.

The event generator 36, which is implemented by the instructions of the CPU 301, generates detection data (event data) indicating detection of a specific object, for example, when the coordinates of a specific object are specified by the object detector 35.

The display control 37, which is implemented by the instructions of the CPU 301, controls the display 317 to display various screens.

The connection unit 38, which is implemented by the imaging unit I/F 313 and the instructions of the CPU 301, is an interface for mechanically and electrically connecting the imaging unit 40 to the real-time data processing terminal 3a.

The storing and reading unit 39, which is implemented by instructions of the CPU 301, stores various data or information in the storage unit 3000 or reads out various data or information from the storage unit 3000.

The communication unit 48, which may be implemented by the instructions of the CPU 301 and the external device connection I/F 318, transmits or receives various data (or information) to or from the communication unit 58 of the terminal data processing device 5. The one-to-one communication between the communication unit 48 and the communication unit 58 may be performed via a wired network or a wireless network.

<Functional Configuration of Terminal Data Processing Device>

As illustrated in FIG. 8, the terminal data processing device 5 includes a transmitter and receiver 51, a data detector 56, a display control 57, a communication unit 58, and a storing and reading unit 59. These units are functions that are implemented by or that are caused to function by operating any of the elements illustrated in FIG. 5 in cooperation with the instructions of the CPU 501 according to the control program expanded from the EEPROM 504 to the RAM 503.

The terminal data processing device 5 further includes a storage unit 5000, which is implemented by the ROM 502, RAM 503 and EEPROM 504 illustrated in FIG. 5.

(Functional Configuration of Terminal Data Processing Device)

Referring to FIG. 8, a functional configuration of the terminal data processing device 5 is described according to the embodiment.

The transmitter and receiver 51 of the terminal data processing device 5, which is implemented by the far-distance communication circuit 511, the antenna 511a, and the instructions of the CPU 501, transmits or receives various data (or information) to or from the distributed data processing terminal 6 via a communication network (the intranet 200).

The data detector 56, which is implemented by the instructions of the CPU 501, detects whether or not an event has occurred that triggers reception of data from the real-time data processing terminal 3a, and whether or not the reception of data is completed.

The display control 57, which is implemented by the instructions of the CPU 501, controls the display 517 to display various screens.

The communication unit 58, which may be implemented by the instructions of the CPU 501 and the external device connection I/F 518, transmits or receives various data (or information) to or from the communication unit 48 of the real-time data processing terminal 3a. The one-to-one communication between the communication unit 58 and the communication unit 48 may be performed via a wired network or a wireless network.

The storing and reading unit 59, which is implemented by instructions of the CPU 501, stores various data or information in the storage unit 5000 or reads out various data or information from the storage unit 5000.

<Functional Configuration of Distributed Data Processing Terminal>

As illustrated in FIG. 9, the distributed data processing terminal 6 includes a transmitter and receiver 61, an acceptance unit 62, a determiner 63, a display control 67, and a storing and reading unit 69. These units are functions that are implemented by or that are caused to function by operating any of the elements illustrated in FIG. 5 in cooperation with the instructions of the CPU 501 according to the control program expanded from the EEPROM 504 to the RAM 503 in the distributed data processing terminal 6.

The distributed data processing terminal 6 further includes a storage unit 6000, which is implemented by the ROM 502, RAM 503 and EEPROM 504 illustrated in FIG. 5.

(Functional Configuration of Distributed Data Processing Terminal)

The transmitter and receiver 61 of the distributed data processing terminal 6, which is implemented by the far-distance communication circuit 511, the antenna 511a, and the instructions of the CPU 501, transmits or receives various data (or information) to or from the centralized data processing server 7 via a communication network (the Internet 600). For example, the transmitter and receiver 61 transmits a verification request for verifying the data to be verified using the verification data, to the centralized data processing server 7, or performs processing on the verification result sent from the centralized data processing server 7. The transmitter and receiver 61 transmits or receives various data (or information), such as the data to be verified, to or from the image acquisition terminal 2 via the communication network (such as the intranet 200).

The acceptance unit 62 is implement by the touch panel 521 of the distributed data processing terminal 6, which operates under control of the CPU 501, to receive various selections or inputs from the user.

The determiner 63, which is implemented by instructions of the CPU 501 of the distributed data processing terminal 6, performs various determinations.

The display control 67, which is implemented by the instructions of the CPU 501 of the distributed data processing terminal 6, controls the display 517 to display various screens.

The storing and reading unit 69, which is implemented by instructions of the CPU 501 of the distributed data processing terminal 6, stores various data or information in the storage unit 6000 or reads out various data or information from the storage unit 6000. For example, the storing and reading unit 69 stores the verification data (in this case, the facial image data) in the storage unit 6000 according to a registration request received at the acceptance unit 62. The storing and reading unit 69 may store verification data and target data to be verified, in the storage unit 6000 (verification data management DB 6001).

<Functional Configuration of Centralized Data Processing Server>

As illustrated in FIG. 9, the centralized data processing server 7 includes a transmitter and receiver 71, an acceptance unit 72, a determiner 73, a feature value generator 74, a verification unit 75, and a storing and reading unit 79. These units are functions that are implemented by or that are caused to function by operating any of the elements illustrated in FIG. 6 in cooperation with the instructions of the CPU 701 according to the control program expanded from the HD 704 to the RAM 703 in the centralized data processing server 7.

The centralized data processing server 7 further includes a storage unit 7000, which is implemented by the ROM 702, the RAM 703 and the HD 704 illustrated in FIG. 6. The storage unit 7000 stores feature value data to be used for verification, which will be described below, and a name or an identification code of the object having the feature values. The storage unit 7000 further stores a verification data management DB 7001. The verification data management DB 7001 is implemented by a verification data management table, which will be described below referring to FIG. 12. The verification data may be stored in a memory of any data management server other than the centralized data processing server 7.

(Verification Data Management Table)

FIG. 12 is a conceptual diagram illustrating the verification data management table according to the embodiment. The verification data management table stores, for each one of a plurality of persons (or objects) to be verified, a file name of an image file (such as a facial image) as the verification data and a name of a person identified with this image file such as the facial image.

In addition to the data items illustrated in FIG. 12, the verification data management table may store any other data such as a verification result, and feature values parameters of an image.

Further, while the name of the person corresponding to the verification data is stored, any other type of data may be used as identification information of the person. Examples of the object identification information include, but not limited to, an employee number, a student ID or number, a driver's license number, and a social security number. The object identification information may be represented in any symbol including Chinese character, Alphabet, numeral, etc. Alternatively, a name of the object, other than the person, may be used in case the object is not a human. For example, if the object is a car, aircraft, train, or any goods, a name of such object or an ID (such as an ID code) of such object may be stored. Further, such identification information may be obtained from the centralized data processing server 7.

(Functional Configuration of Centralized Data Processing Server)

The transmitter and receiver 71 of the centralized data processing server 7, which is implemented by the network I/F 709 and the instructions of the CPU 701, transmits or receives various data (or information) to or from the distributed data processing terminal 6 via a communication network (the Internet 600). For example, the transmitter and receiver 71 receives a verification request for verifying the data to be verified using the verification data, from the distributed data processing terminal 6, or sends the verification result indicating similarity to the distributed data processing terminal 6.

The acceptance unit 72 is implemented by the keyboard 711 or mouse 712, which operates under control of the CPU 701, to receive various selections or inputs from the user.

The determiner 73, which is implemented by the instructions of the CPU 701, makes various determinations.

The feature value generator 74, which is implemented by the instructions of the CPU 701, generates parameters of feature values from the data to be verified (partial image data) and the verification data that are received at the transmitter and receiver 71.

The verification unit 75, which is implemented by the instructions of the CPU 701, compares the feature values between the verification data and the data to be verified, using the feature values obtained at the feature value generator 74, to calculate a score (in points) indicating the similarity in feature values.

The storing and reading unit 79, which is implemented by the instructions of the CPU 701, stores various data or information in the storage unit 7000 or reads out various data or information from the storage unit 7000.

<Functional Configuration of Service Providing Server>

Next, referring to FIGS. 9, 13 to 17, each functional unit of the service providing server 8 is described in detail. As illustrated in FIG. 9, the service providing server 8 includes a transmitter and receiver 81, a determiner 82, an extractor 87, and a storing and reading unit 89. These units are functions that are implemented by or that are caused to function by operating any of the elements illustrated in FIG. 6 in cooperation with the instructions of the CPU 701 according to the service providing program expanded from the HD 704 to the RAM 703.

The service providing server 8 further includes a storage unit 8000, which is implemented by the RAM 703 and the HD 704 illustrated in FIG. 6. The storage unit 8000 stores various data transmitted from the distributed data processing terminal 6 or the authentication server 9. The storage unit 8000 stores all of the programs, which is determined according to the tables referring to FIGS. 11A to 11D. In response to a request from the real-time data processing terminal 3*a*, the service providing server 8 transmits the requested program for installation to the real-time data processing terminal 3*a*.

The storage unit 8000 further includes a session management DB 8001 and an authentication server management DB 8002. The session management DB 8001 is implemented by a session management table, which is described below referring to FIG. 13. The authentication server management DB 8002 is implemented by an authentication server management table, which is described below referring to FIG. 15. Each table will be described in detail below.

(Session Management Table)

FIG. 13 is a conceptual diagram of an example of session management table. The session management table of FIG. 13 manages a session to be used for providing various types of services (that is, various types of programs for executing the services) to the distributed data processing terminal 6 managing the image acquisition terminal 2. The session management table stores a session ID for identifying a communication session established with the distributed data processing terminal 6, a terminal ID for identifying the distributed data processing terminal 6, and an IP address of the distributed data processing terminal 6 operated by the user identified with the terminal ID, in association. Here, the terminal ID may be any identifier for identifying the user operating the distributed data processing terminal 6, or the distributed data processing terminal 6 itself. In the following example, the terminal ID includes a user ID identifying the user operating the distributed data processing terminal 6.

Figure 16A:
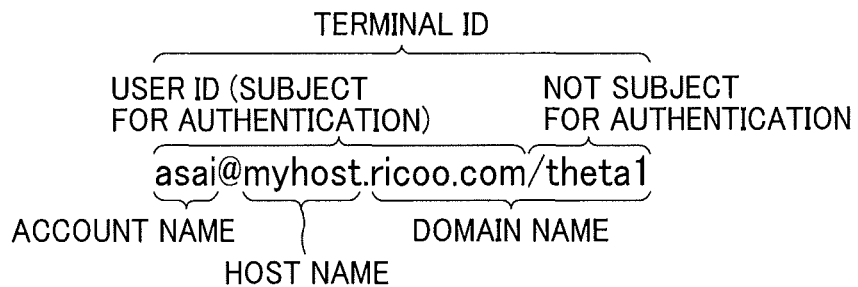
FIGS. 16A, 16B, and 16C are each a conceptual diagram illustrating an example of terminal identifier.
Figure 16B:
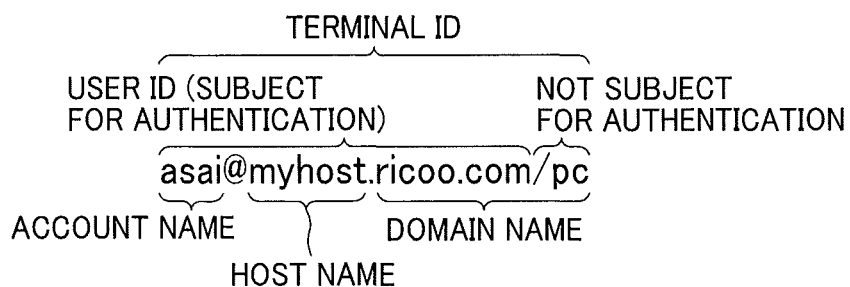
Figure 16C:
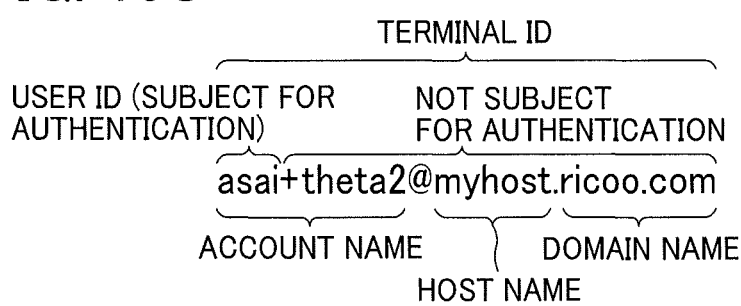

FIGS. 16A, 16B, and 16C each illustrate an email address as an example of the terminal ID, which can be classified into a part to be authenticated (subject for authentication) and a part not to be authenticated (not subject for authentication). More specifically, in the following examples, the email address, as an example of the terminal ID, includes a user ID. A part or entire user ID is used for authentication. The part subject for authentication is a user ID to be used for authentication by the authentication server 9. The part not subject for authentication is any part other than the user ID, which is not to be used for authentication by the authentication server 9.

Referring to a first example case of FIG. 16A, the part subject for authentication includes an account name "asai", a host name "myhost" and a domain name "ricoo.com". The part not subject or authentication includes "theta1", which is any remaining part of the email address. In such case, the extractor 87 distinguishes between the part subject for authentication and the part not subject for authentication by "/".

The email address of FIG. 16B can be classified into the part subject for authentication and the part not subject for authentication, similar to that of FIG. 16A, except that the part not subject for authentication differs. Specifically, the authentication server 9 recognizes that the terminal ID of FIG. 16B is the same as that of FIG. 16A, as the part subject for authentication is the same, even when the part not subject for authentication differs.

Alternatively, the terminal ID may be authenticated according to a second example case illustrated in FIG. 16C.

Referring to the second example case of FIG. 16C, the part subject for authentication includes a front part of an account name, that is, "asai". The part not subject for authentication includes "theta2", which is any remaining part of the account name, and a host name "myhost", and a domain name "ricoo.com". In such case, the extractor 87 distinguishes between the part subject for authentication and the part not subject for authentication by "+".

(Authentication Server Management Table)

FIG. 17 is a conceptual diagram of an example of authentication server management table. The authentication server management table stores, for each authentication server 9, an authentication server ID identifying the authentication server 9 and a URL (Uniform Resource Locator) for accessing the authentication server 9 in association.

(Each Functional Unit of Service Providing Server)

Next, referring to FIG. 9, a functional unit of the service providing server 8 is described in detail.

The transmitter and receiver 81 of the service providing server 8, which may be implemented by the instructions from the CPU 701, and the network I/F 709, illustrated in FIG. 6, transmits or receives various data (or information) to or from the distributed data processing terminal 6 or the authentication server 9 through the communication network (such as the Internet 600).

The determiner 82, which is implemented by instructions from the CPU 701 illustrated in FIG. 6, determines, for example, whether or not a communication session for providing a service to the distributed data processing terminal 6 has already been established.

The extractor 87, which is implemented by instructions from the CPU 701 illustrated in FIG. 6, extracts a user ID (part subject for authentication) from the terminal ID as illustrated in FIGS. 16A to 16C.

The storing and reading unit 89, which is implemented by instructions from the CPU 701 and the HDD 705, illustrated in FIG. 6, stores various data or information in the storage unit 8000 or reads out various data or information from the storage unit 8000.

<Functional Configuration of Authentication Server>

Next, referring to FIG. 9 and FIG. 18, a functional configuration of the authentication server 9 is described in detail. The authentication server 9 includes a transmitter and receiver 91, an authentication unit 92, and a storing and reading unit 99. These units are functions that are implemented by or that are caused to function by operating any of the elements illustrated in FIG. 6 in cooperation with the instructions of the CPU 701 according to the authentication server program expanded from the HD 704 to the RAM 703.

The authentication server 9 further includes a storage unit 9000, which is implemented by the RAM 703 and the HD 704 illustrated in FIG. 6. The storage unit 9000 stores various data transmitted from the distributed data processing terminal 6 or the service providing server 8.

The storage unit 9000 further stores an authentication management DB 9001. The authentication management DB 9001 is implemented by an authentication management table, which is described below. The authentication management table will be described in detail below.

(Authentication Management Table)

FIG. 18A is a conceptual diagram of an example of authentication management table stored in the authentication server 9*a*. FIG. 18B is a conceptual diagram of an example of authentication management table stored in the authentication server 9*b*. 18C is a conceptual diagram of an example of authentication management table stored in the authentication server 9*c*.

The authentication management table stores, for each user being managed, a user ID (the part subject for authentication) for identifying the user, and a password, in association. In this example, the user ID is a part of the terminal ID, which is subject for authentication, as described above referring to FIGS. 16A to 16C. The password is previously set by the user identified with the user ID.

(Each Functional Unit of Authentication Server)

Next, referring to FIG. 9, each functional unit of the authentication server 9 is described in detail.

The transmitter and receiver 91 of the authentication server 9, which is implemented by the instructions from the CPU 701 and the network I/F 709, transmits or receives various data (or information) to or from the distributed data processing terminal 6 and the service providing server 8 via the communication network (the Internet 600).

The authentication unit 92, which is implemented by the instructions from the CPU 701 illustrated in FIG. 6, authenticates the ID (such as the terminal ID) of the distributed data processing terminal 6, based on a determination of whether or not the image acquisition terminal 2 that has transmitted the authentication request has an authority to receive a service. Such authentication is performed because the distributed data processing terminal 6 manages the image acquisition terminal 2. That is, in one example, the distributed data processing terminal 6 manages a plurality of image acquisition terminals 2, which may be distributed over different places, but within a same local area. In such case, the user (usually, the operator) of the distributed data processing terminal 6 is given an authorization to install or use some application programs (that is, services) that require authentication.

The storing and reading unit 99, which is implemented by the instructions of the CPU 701 and the HDD 705, illustrated in FIG. 6, stores various data or information in the storage unit 9000 or reads out various data or information from the storage unit 9000.

<<Operation>>

Referring now to FIGS. 19 to 32, operation performed by the communication system 1 is described according to the embodiment.

<Authentication Processing>

Figure 19:
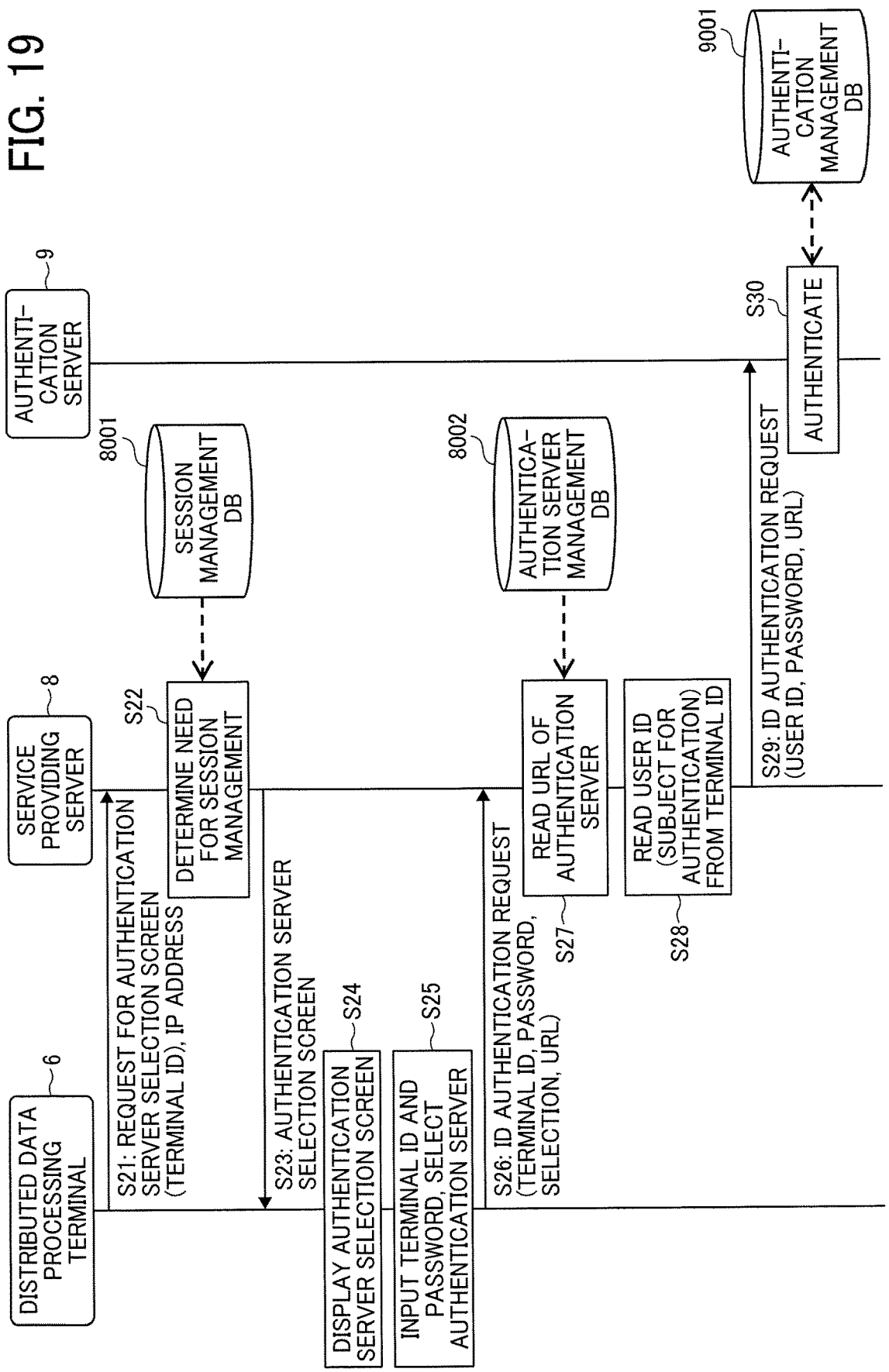
FIG. 19 is a sequence diagram illustrating authentication processing, performed by the communication system of FIG. 1, according to an embodiment.
Figure 20:
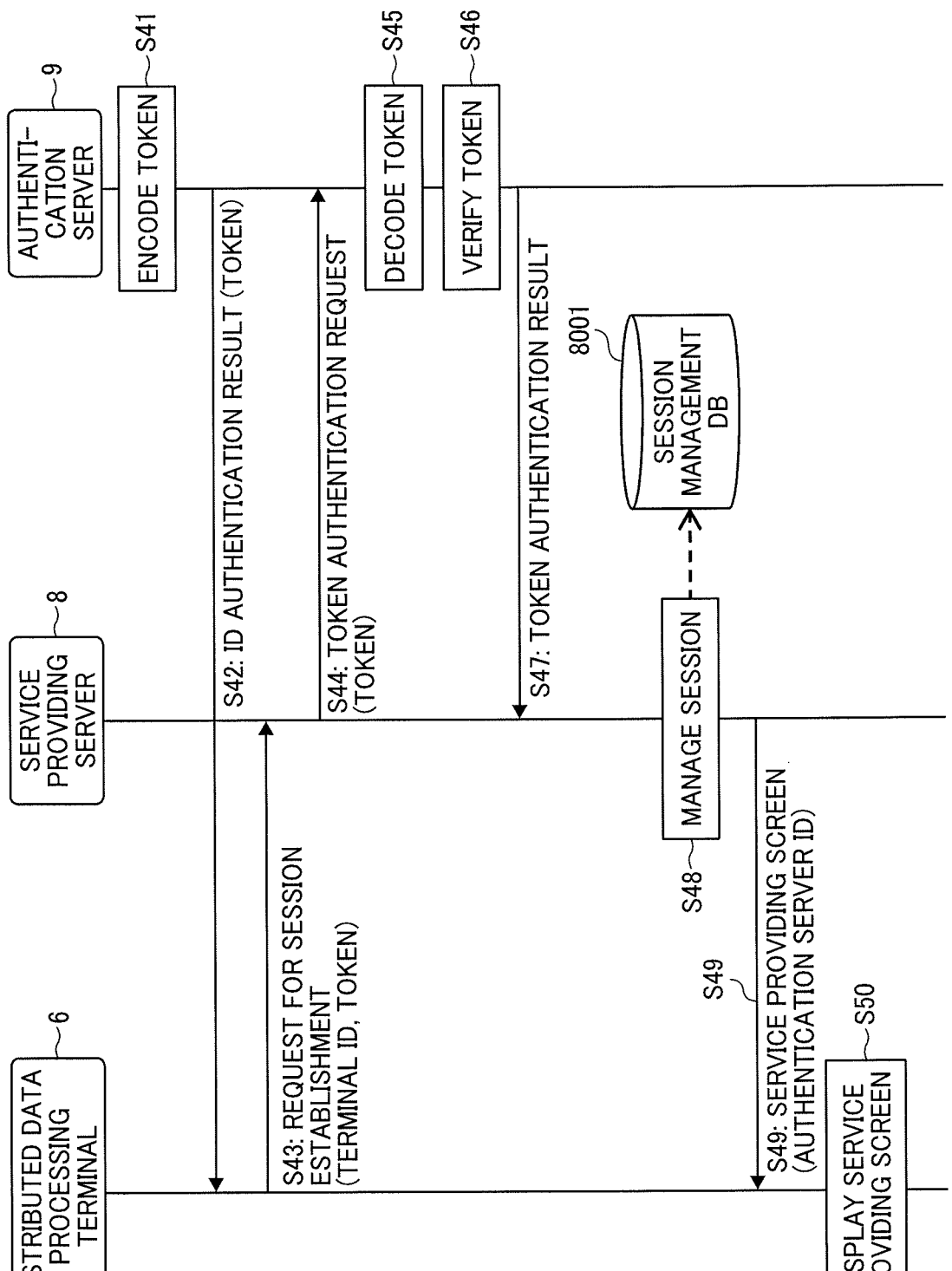
FIG. 20 is a sequence diagram illustrating authentication processing, performed by the communication system of FIG. 1 after processing of FIG. 19, according to the embodiment.
Figure 21:
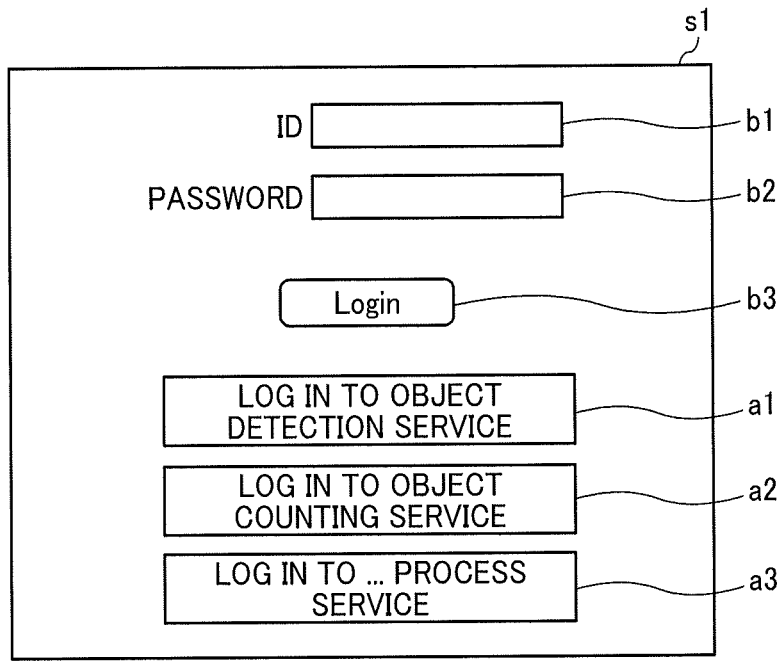
FIG. 21 is an example authentication server selection screen to be displayed at the distributed data processing terminal.
Figure 22:
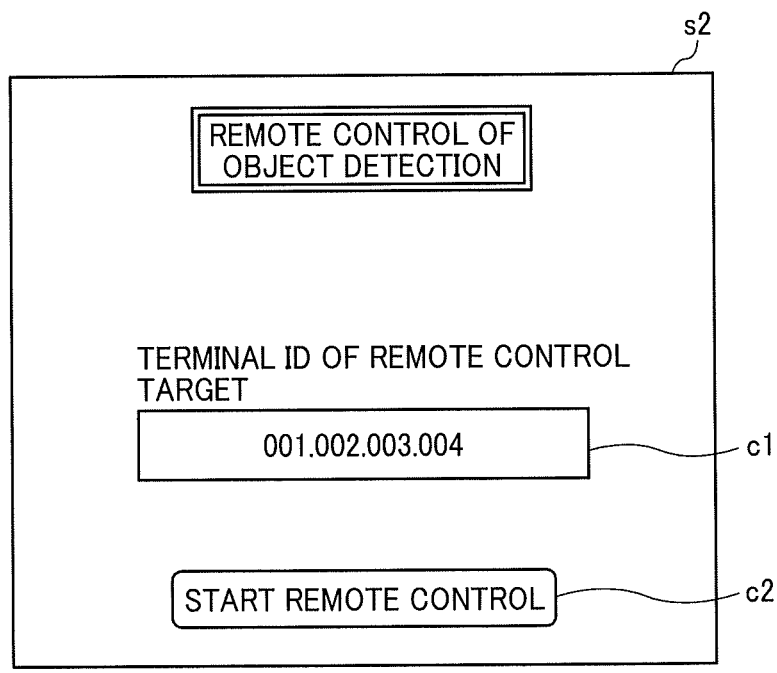
FIG. 22 is an example service providing screen to be displayed at the distributed data processing terminal.

First, authentication processing will be described with reference to FIGS. 19 to 22. FIGS. 19 and 20 are sequence diagrams illustrating authentication processing, performed by the communication system 1, according to the embodiment. FIG. 21 and FIG. 22 are diagrams illustrating examples of screens, displayed at the distributed data processing terminal 6.

As illustrated in FIG. 19, the transmitter and receiver 61 of the distributed data processing terminal 6 transmits a request for an authentication server selection screen to the service providing server 8 (S21). This authentication server selection screen request includes the terminal ID of the distributed data processing terminal 6. The transmitter and receiver 61 further transmits the IP address of the distributed data processing terminal 6, with the authentication server selection screen request. The transmitter and receiver 81 of the service providing server 8 receives the request for the authentication server selection screen and the IP address of the distributed data processing terminal 6.

Next, the determiner 82 of the service providing server 8 determines whether or not the terminal ID of the distributed data processing terminal 6 received at S21 is stored in association with a session ID in the session management table (FIG. 13) (S22). Hereinafter, the case where the terminal ID of the distributed data processing terminal 6 is not stored in association with the session ID will be described.

The transmitter and receiver 81 of the service providing server 8 transmits data of an authentication server selection screen to the distributed data processing terminal 6 (S23). The transmitter and receiver 61 of the distributed data processing terminal 6 receives the data of the authentication server selection screen.

Next, the display control 67 of the distributed data processing terminal 6 controls the display 517 to display an authentication server selection screen s1 as illustrated in FIG. 21 (S24). FIG. 21 illustrates an example of the authentication server selection screen s1, displayed at the distributed data processing terminal 6. The authentication server selection screen s1 includes an ID entry field b1, a password entry field b2, and a login button b3 for accepting a login request (authentication request). The authentication server selection screen s1 further includes a plurality of authentication server selection buttons a1, a2, and a3 for selecting the authentication servers 9a, 9b, and 9c, respectively. For example, the authentication server selection button a1 provides, when selected, a user with a service of object detection using the object detection program. The authentication server selection button a2 provides, when selected, a user with a service of object counting using the object counting program.

Here, the user inputs the terminal ID of the distributed data processing terminal 6 operated by the user in the ID entry field b1, and a password in the password entry field b2, as information to be used for authentication. As described above referring to FIGS. 14A to 14C, in this example, the email address of the user is used as the terminal ID. After entering the terminal ID and the password, the user presses a desired button from among the authentication server selection buttons a1, a2, and a3, and further presses the login button b3. The acceptance unit 62 accepts a selection of a specific service, indicated by the selected authentication server selection button (S25). The following describes an example case in which, in response to selection of the authentication server selection button a1, the service providing server 8 provides the object detection service according to the object detection program ProgD01.

The transmitter and receiver 61 transmits an ID authentication request for authenticating the ID (in this example, the terminal ID) of the distributed data processing terminal 6 to the service providing server 8 (S26). The ID authentication request includes the terminal ID and the password, and the selection result of the authentication server 9, received at S25, and the URL of the distributed data processing terminal 6. The selection result of the authentication server 9 indicates an authentication server ID for identifying the selected authentication server 9. The transmitter and receiver 81 of the service providing server 8 receives the ID authentication request.

Next, the storing and reading unit 89 of the service providing server 8 searches the authentication server management table (FIG. 17) using the authentication server ID, which is received at S26 as the selection result, as a search key, to read out the URL of the authentication server associated with the received authentication server ID (S27).

The extractor 87 extracts only the user ID (the part subject for authentication) out of the terminal ID received at S26 (S28). Then, the transmitter and receiver 81 transmits an ID authentication request to the authentication server 9 indicated by the URL read out at S27 (S29). The ID authentication request includes the user ID (the part subject for authentication) extracted at S28, the password received at S26, and the URL of the distributed data processing terminal 6 received at S26. Accordingly, the transmitter and receiver 71 of the authentication server 9 receives the ID authentication request, which is a request for authenticating the user of the distributed data processing terminal 6.

Next, the storing and reading unit 99 of the authentication server 9 searches the authentication management table (FIG. 18), using a pair of the user ID (the part subject for authentication) and the password received at S29 as a search key, to output a search result. Based on this search result indicating whether the same pair has been stored, the authentication unit 92 authenticates the ID of the distributed data processing terminal 6 (S30). When the same pair is stored, the authentication unit 92 determines that the distributed data processing terminal 6 is an authorized terminal allowed to receive a requested service from the service providing server 8. When the same pair is not stored, the authentication unit 92 determines that the distributed data processing terminal 6 is not an authorized terminal for receiving a requested service from the service providing server 8.

At S28, the extractor 87 extracts the part subject for authentication from the terminal ID, but it is not limited thereto. For example, the service providing server 8 does not have to be provided with the extractor 87. In such case, at S29, the transmitter and receiver 81 may transmit only the user ID (the part subjected for authentication) out of the terminal ID, in addition to the password and the URL. While a part of the user ID may not be recognized without the extractor 87, as long as the user ID is recognized and sent to the authentication server 9, the authentication server 9 is able to authenticate the user at the distributed data processing terminal 6. For example, the authentication server 9 may be provided with the extractor 87 to extract the part subjected for authentication, from the user ID that is received. More specifically, in one example, the distributed data processing terminal 6 may extract the part subjected to authentication from the terminal ID in prior to S26. In such case, at S26, the user ID (the part subjected to authentication) is sent. Alternatively, the authentication server 9 may extract, from the terminal ID, the part subjected to authentication after S29. In such case, the terminal ID is transmitted at S29, rather than the user ID (the part subjected to authentication).

Subsequently, as illustrated in FIG. 20, the authentication unit 92 of the authentication server 9 encodes a token (transmission right) (S41). The transmitter and receiver 91 of the authentication server 9 transmits an ID authentication result to the distributed data processing terminal 6, using the URL of the distributed data processing terminal 6 received at S29 (S42). The ID authentication result indicates whether or not the distributed data processing terminal 6 is an authorized terminal, and further includes the token encoded at S41 when the distributed data processing terminal 6 is an authorized terminal. When the distributed data processing terminal 6 is not an authorized terminal, the ID authentication result includes an error message. Accordingly, the transmitter and receiver 61 of the distributed data processing terminal 6 receives the ID authentication result indicating whether the distributed data processing terminal 6 is an authorized terminal, that is, whether the user is authorized to use the requested service. The following describes an example case in which the user is determined to be the authorized user.

The transmitter and receiver 61 of the distributed data processing terminal 6 transmits a request for establishing a session to the service providing server 8 (S43). This session establishment request includes the terminal ID, which is authenticated, and the encoded token received at S42. Accordingly, the transmitter and receiver 81 of the service providing server 8 receives the session establishment request.

Next, to confirm that the distributed data processing terminal 6 that transmitted the session establishment request has been determined to be a terminal operated by the authorized user at S30, the service providing server 8 transmits a token authentication request to the authentication server 9 (S44). The token authentication request includes the encoded token received at S43. Accordingly, the transmitter and receiver 91 of the authentication server 9 receives the token authentication request.

Next, the authentication unit 92 decodes the encoded token received at S44 (S45). The authentication unit 92 authenticates the token by comparing the token before encoding at S41 with the token after decoding at S45 (S46). Then, the transmitter and receiver 91 of the authentication server 9 transmits the token authentication result of S46 to the service providing server 8 (S47). Accordingly, the transmitter and receiver 81 of the service providing server 8 receives the token authentication result. The following illustrates the example case in which the token is authenticated at S46.

Next, the storing and reading unit 89 of the service providing server 8 newly assigns a session ID to a session being established with the distributed data processing terminal 6, and stores in the session management table (FIG. 13) the terminal ID and the IP address of the distributed data processing terminal 6, received at S21, in association with the newly-assigned session ID (S48). The transmitter and receiver 81 transmits data of a service providing screen to the distributed data processing terminal 6 through the established session (S49). The transmitter and receiver 81 further transmits an authentication server ID of the authentication server 9, and the session ID generated at S48. Accordingly, the transmitter and receiver 61 of the distributed data processing terminal 6 receives the data of the service providing screen, the authentication server ID, and the session ID.

Next, the display control 67 of the distributed data processing terminal 6 controls the display 517 to display the service providing screen s2 as illustrated in FIG. 22 (S50). FIG. 22 illustrates an example of the service providing screen s2 displayed at the distributed data processing terminal 6. The service providing screen s2 requests the user to enter a detection target. As described above, in this example, it is assumed that more than one image acquisition terminal 2 is provided under management of the distributed data processing terminal 6. The user at the distributed data processing terminal 6 selects at least one image acquisition terminal 2, as a detection target.

The following describes an example case in which a remote operation service is provided as an example service, which remotely controls the image acquisition terminal 2 from the distributed data processing terminal 6. The service providing screen s2 illustrated in FIG. 20 includes an entry field c1 for an IP address for identifying a remote-control target, and a "remote control start" button c2. In this example, the IP address for identifying an address of the image acquisition terminal 2 is input as the IP address for identifying the remote control target. Alternatively, the distributed data processing terminal 6 may set the image acquisition terminal 2 as a remote control target, by a terminal ID of the image acquisition terminal 2 entered by a user, or by a connection address (other than the IP address) of the image acquisition terminal 2 stored in the distributed data processing terminal 6.

As described above, more than one image acquisition terminal 2 may be managed by the distributed data processing terminal 6. In such case, the user at the distributed data processing terminal 6 enters information identifying one or more of the image acquisition terminals 2, as a remote control target.

Through operation of FIGS. 17 and 18, the distributed data processing terminal 6 performs objection detection service, provided by the service providing server 8, with respect to the image acquisition terminal 2. The processing of objection detection service includes a series of processing described below.

<Preparation Processing for Image Recognition>

Figure 23:
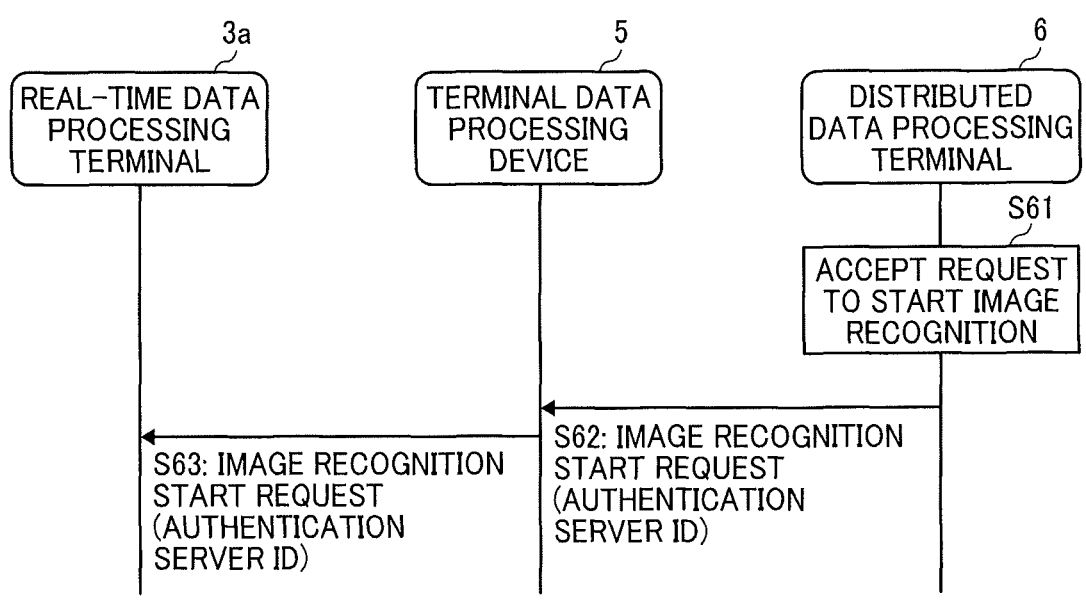
FIG. 23 is a sequence diagram illustrating operation of processing an image recognition start request, performed by the communication system 1, according to an embodiment.
Figure 24:
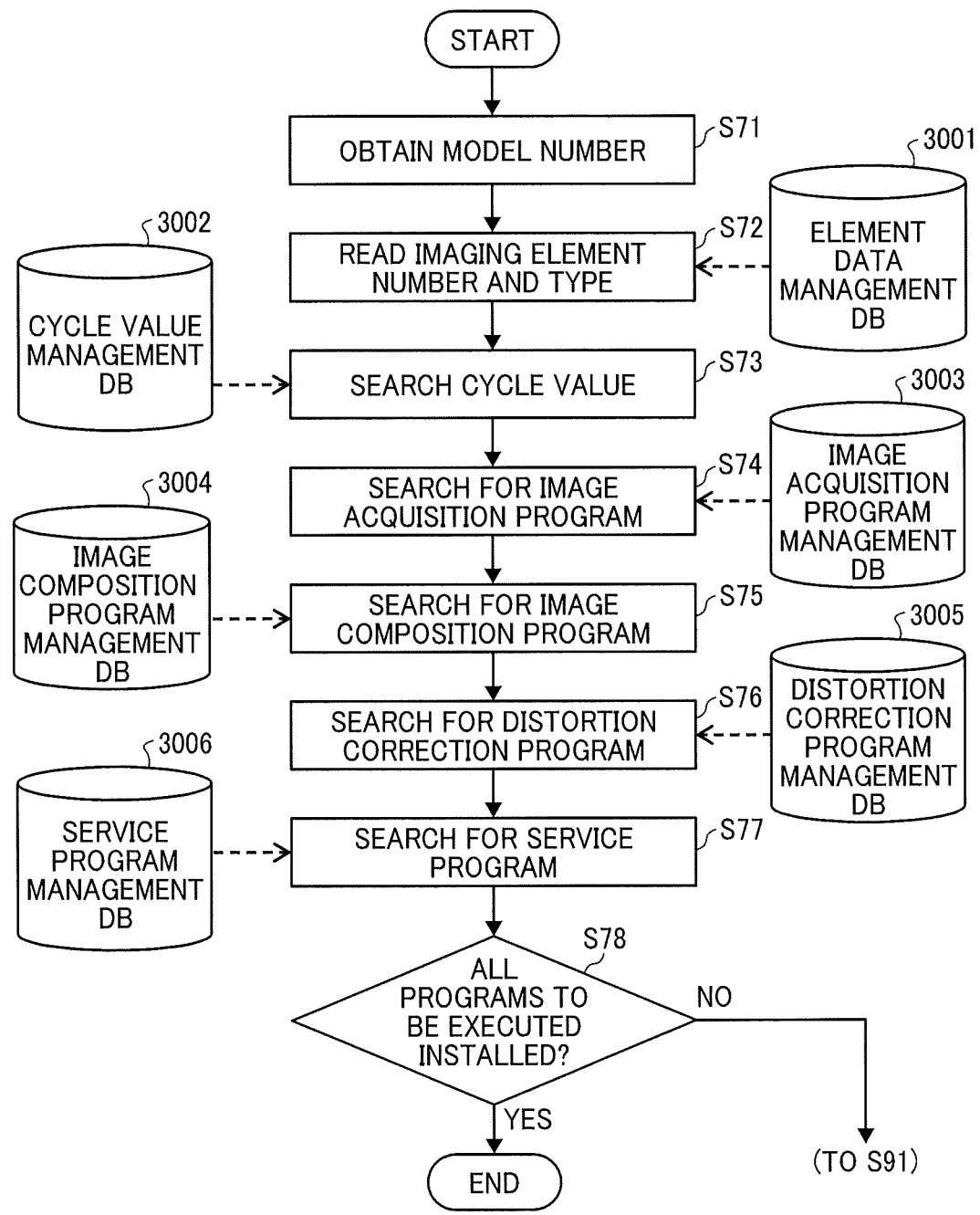
FIG. 24 is a sequence diagram illustrating operation of preparing for real-time processing to be performed by the real-time data processing terminal, according to an embodiment.
Figure 25:
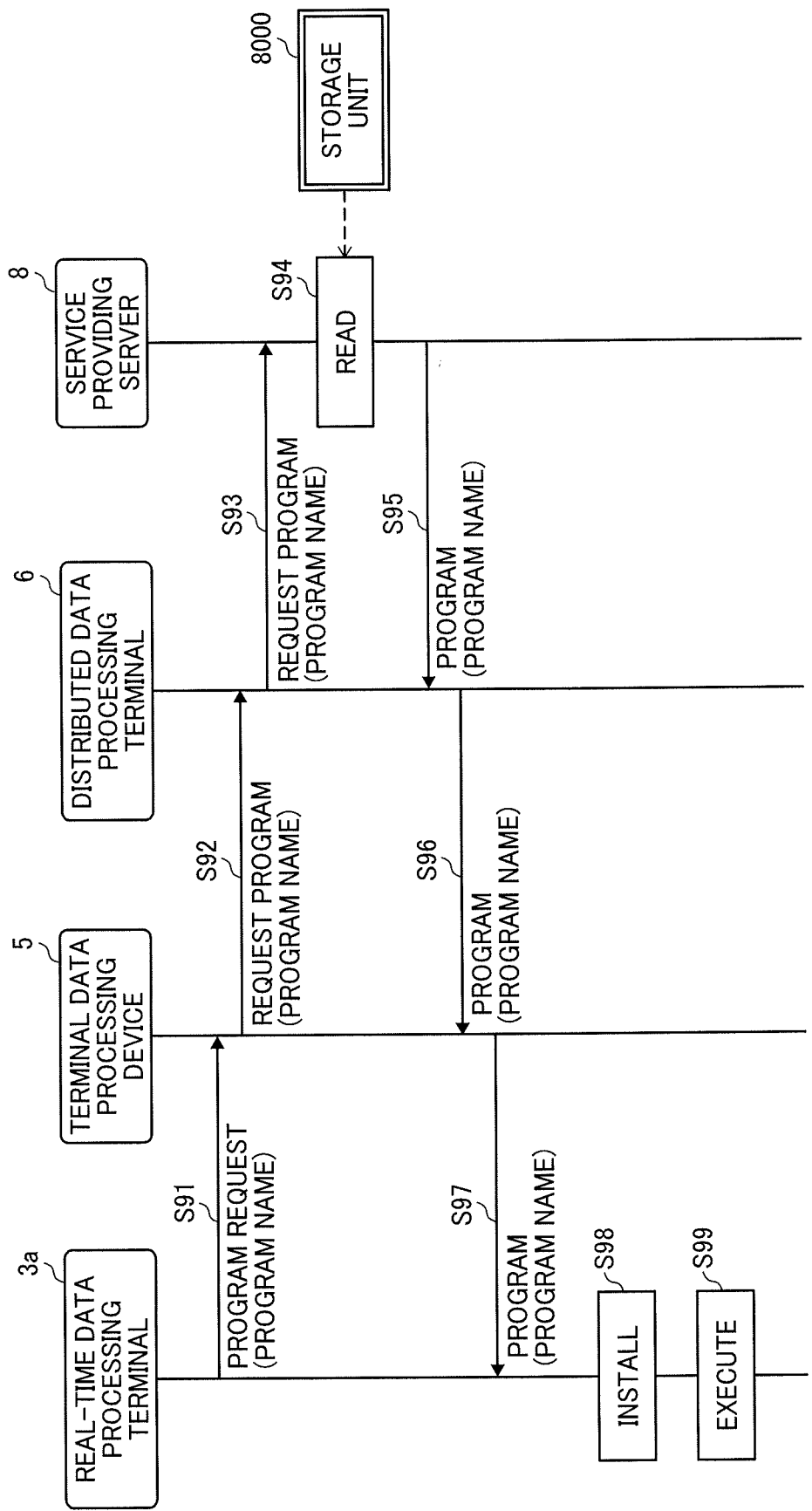
FIG. 25 is a sequence diagram illustrating operation of acquiring a program, performed by the communication system, according to an embodiment.

Referring now to FIGS. 23 to 25, image recognition preparation processing is described according to the embodiment. FIG. 23 is a sequence diagram illustrating operation of processing an image recognition start request, performed by the communication system 1, according to the embodiment.

As illustrated in FIG. 23, in the distributed data processing terminal 6, the acceptance unit 62 accepts a request to start image recognition from the user (S61). In this example, the distributed data processing terminal 6 displays a screen to the user using a GUI (Graphical User Interface), which allows the user to input an instruction. In other words, the distributed data processing terminal 6 provides a user interface for the real-time data processing terminal 3a. In response to a user instruction, the transmitter and receiver 61 of the distributed data processing terminal 6 transmits a request to start image recognition to the terminal data processing device 5 for the image acquisition terminal as the remote-control target (S62). The start request includes the authentication server ID for identifying the authentication server 9 that has performed the above-described authentication processing (FIGS. 19 and 20) and the session ID set in the operation of FIG. 18, which are respectively received at S49 of FIG. 18. The transmitter and receiver 51 of the terminal data processing device 5 receives the image recognition start request. The communication unit 58 of the terminal data processing device 5 transmits the image recognition start request to the real-time data processing terminal 3a (S63). The communication unit 48 of the real-time data processing terminal 3a receives the image recognition start request. As described above, since the user interface is separate from the real-time data processing terminal 3a, remote control of the real-time data processing terminal 3a is made possible from the distributed data processing terminal 6 that provides a user interface for the real-time data processing terminal 3a.

FIG. 24 is a sequence diagram illustrating operation of preparing for real-time processing to be performed by the real-time data processing terminal 3a, according to the embodiment. For example, the real-time data processing terminal 3a of the image acquisition terminal 2, which has received the image recognition start request in FIG. 21, executes the sequence of FIG. 24. As illustrated in FIG. 24, the connection unit 38 of the real-time data processing terminal 3a acquires the model number of the imaging unit 40 from the imaging unit 40 (S71). In this case, in response to a request for model number from the connection unit 38, the imaging unit 40 transmits the model number of its own imaging unit 40 to the connection unit 38.

More specifically, the storing and reading unit 39 searches the imaging element data management DB 3001 (FIG. 10A) using the model number of the imaging unit 40, acquired from the imaging unit 40 at S71, as a search key, to read the number of imaging elements and the lens type that are associated with the acquired model number. Furthermore, the storing and reading unit 39 searches the cycle value management DB 3002 (FIG. 1 OB) using the number of imaging elements, which is read at S72, as a search key to obtain the cycle value associated with the number of imaging elements that is read (S73).

Next, the storing and reading unit 39 searches the image acquisition program management DB 3003 (FIG. 11A) for the image acquisition program to be executed by the image acquisition terminal 2 (real-time data processing terminal 3a), using the number of imaging elements read out at S72 as a search key (S74). Similarly, the storing and reading unit 39 searches the image composition program management DB 3004 (FIG. 11B) for the image composition program to be executed by the image acquisition terminal 2 (real-time data processing terminal 3a), using the number of imaging elements read out at S72 as a search key (S75). Similarly, the storing and reading unit 39 searches the distortion correction program management DB 3005 (FIG. 11C) for the distortion correction program to be executed by the image acquisition terminal 2 (real-time data processing terminal 3a), using the lens type read out at S72 as a search key (S76). Further, the storing and reading unit 39 searches the service program management DB 3006 (FIG. 11D) for the service program to be executed by the image acquisition terminal 2 (real-time data processing terminal 3a), using the authentication server ID that is received at S63 (FIG. 21) as a search key (S77).

Next, the determiner 33 determines whether or not all the programs to be executed are installed (S78), based on the search results at S74 to S77, each indicating whether or not information indicating that the program to be executed is installed is stored in the corresponding DB (table). For example, when the search result by the storing and reading unit 39 indicates that information indicating that the image acquisition program is installed is stored in the image acquisition program management DB 3003 at S74, the determiner 33 determines that the image acquisition program has been installed. In contrary, when the search result indicates that information indicating that the image acquisition program is not installed is stored in the image acquisition program management DB 3003, the determiner 33 determines that the image acquisition program is not installed.

When the determiner 33 determines that all four programs are installed (S78: YES), the operation of FIG. 24 ends. On the other hand, when the determiner 33 determines that at least one program among the four programs is not installed (S78: NO), the operation proceeds to S91 described below referring to FIG. 25.

Please note that a number of programs to be installed differs depending on the number of imaging elements or type of lens of the imaging unit 40.

FIG. 25 is a sequence diagram illustrating processing to acquire a program, performed by the communication system 1, according to the embodiment. In this example, the real-time data processing terminal 3a acquires a program that is determined as not installed through the operation of FIG. 24 from the service providing server 8.

First, as illustrated in FIG. 25, the communication unit 48 of the real-time data processing terminal 3a transmits, to the communication unit 58 of the terminal data processing device 5, a request for a program not installed (S91). This request for program includes a name of the program to be installed obtained through operation of FIG. 22, and the authentication server ID and the session ID that are received at S63 of FIG. 21.

Next, the transmitter and receiver 51 of the terminal data processing device 5 transmits the program request received at the communication unit 58 to the transmitter and receiver 61 of the distributed data processing terminal 6 (S92). Then, the transmitter and receiver 61 of the distributed data processing terminal 6 transmits the program request to the transmitter and receiver 81 of the service providing server 8, through the established session (S93).

Next, in the service providing server 8, the storing and reading unit 89 checks the validity of the program request based on the authentication server ID and the session ID in the program request, and reads out a program indicated by the program name included in the program request (S94). Then, the transmitter and receiver 81 transmits the read program to the transmitter and receiver 61 of the distributed data processing terminal 6 (S95). With the read program, a name of the requested program, the authentication server ID, and the session ID are also transmitted.

Next, the transmitter and receiver 61 of the distributed data processing terminal 6 transmits a program identified with the program name to the transmitter and receiver 51 of the terminal data processing device 5 of the image acquisition terminal 2, which is identified with the authentication server ID and the session ID (S96). The communication unit 58 of the terminal data processing device 5 transmits the program identified with the program name to the communication unit 48 of the real-time data processing terminal 3a (S97).

Next, the storing and reading unit 39 of the real-time data processing terminal 3a installs the program acquired by the communication unit 48. The storing and reading unit 39 further registers, in corresponding one of the tables of FIGS. 11A to 11D, information indicating that the requested program is installed. For example, in case the service program is installed, the storing and reading unit 39 registers, in the service program management table of 11D, the information indicating installation of the service program in association with the program name of the program being installed and the authentication server ID (S98).

Next, the storing and reading unit 39 activates all the programs necessary for image recognition processing (S99). Accordingly, the real-time data processing terminal 3a starts the real-time processing as described below, by executing the activated programs.

<Image Recognition Processing>
(Object Detection Processing)

Figure 26:
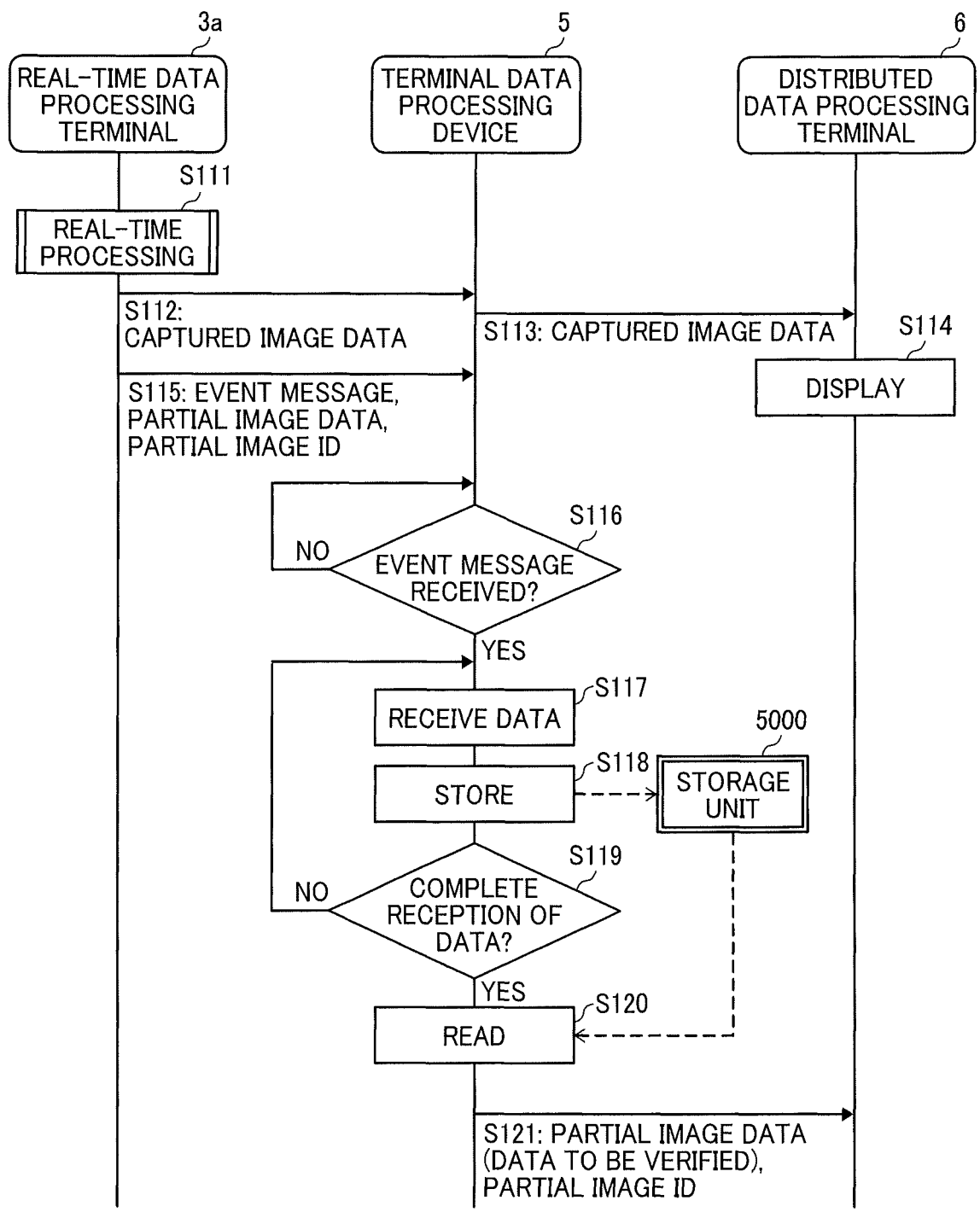
FIG. 26 is a sequence diagram illustrating an example of image recognition processing, performed by the communication system 1, according to the embodiment.
Figure 27:
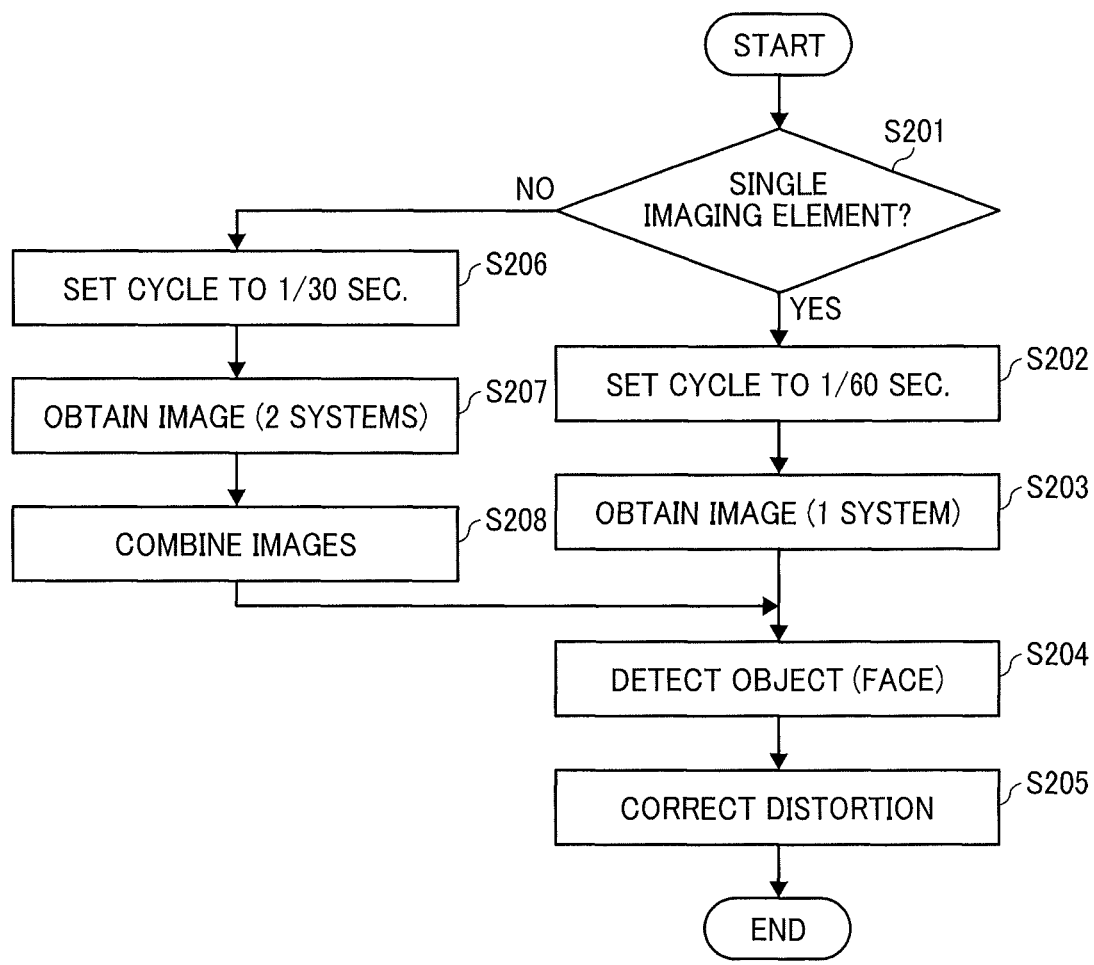
FIG. 27 is a flowchart illustrating an example of object detection processing, performed in the real-time processing.

The following describes the example case in which the "log in to object detection service" button a1 illustrated in FIG. 21 is pressed and the service providing server 8 permits the distributed data processing terminal 6 to execute the object detection service as described above referring to FIGS. 17 to 23. That is, after the above-described operations referring to FIGS. 17 to 20 are performed, the "start remote control" button c2 in FIG. 20 is pressed at the distributed data processing terminal 6, designating the image acquisition terminal 2 as a remote control target. The distributed data processing terminal 6 transmits a request to start image recognition to the image acquisition terminal 2. FIG. 26 is a sequence diagram illustrating image recognition processing, performed by the communication system 1 of FIG. 1, according to the embodiment. The real-time data processing terminal 3a performs real-time processing (S111). In the following, the real-time data processing is described with reference to FIG. 27. FIG. 27 is a flowchart illustrating an example of object detection processing, performed in the real-time processing.

As illustrated in FIG. 27, the determiner 33 determines whether or not a number of imaging elements in the imaging unit 40, connected to the real-time data processing terminal 3a, is one (S201). In this case, the determiner 33 determines the number of imaging elements, based on the number of imaging elements read out at S72. If the number of imaging elements is one (S201: YES), referring to the cycle value management table of FIG. 10B, the image processing unit 34 sets a cycle value, which defines a time interval for repeating the real-time processing, to 1/60 seconds (S202). Specifically, the image processing unit 34 sets the cycle value read out at S73.

Next, the connection unit 38 acquires captured image data, from the imaging unit 40 having one imaging system (here, the imaging unit 40a) (S203). The captured image data is digital image data, and is, for example, data of 4K image (3840 image pixel width X 2160 image pixel height). In this case, the connection unit 38 executes processing according to the image acquisition program (ProgC01 (1 system)) described above referring to FIG. 11A. In executing this processing, the real-time data processing terminal 3a does not have to determine whether or not execution of the image acquisition program is allowed using the authentication server ID included in the image recognition start request, with reference to the table of FIG. 11D. That is, since the image acquisition program is previously determined as the application not requiring authentication, authentication is not performed.

Next, the object detector 35 searches for feature points in the captured image data, as a candidate of a specific object, to detect the specific object (S204). Specifically, the object detector 35 picks up a rectangular section, one by one, starting from the edge of the captured image, to search for features points that match the shape model data of the object that is previously stored in the storage unit 3000, and specifies a position (coordinates) of the feature points that match the shape model data. The processing of S204 may be performed using any desired known method, such as the method described in, for example, Hitoshi IMAOKA, et. al., "Face recognition technology and its application: features on elemental technologies and solutions supporting public safety", Biometrics authentication, NEC Technical Journal, Vol. 63, no. 3, pp. 26-30, September 2010. In this case, the object detector 35 determines whether or not the authentication server ID included in the image recognition start request received at S63 is an appropriate authentication server ID managed in the service program management table of FIG. 11D, in association with the service program (ProgD01 (object detection)), and executes the processing based on the determination result. That is, since the object detection service program is previously determined as the application requiring authentication, authentication is performed.

Next, the image processing unit 34 corrects the distortion in the image including the detected object (S205). In this case, the image processing unit 34 executes processing according to the image processing program (ProgW01 (wide-angle correction)) as described above referring to FIG. 11C. In executing this processing, the real-time data processing terminal 3a does not have to determine whether or not execution of the wide-angle distortion correction program is allowed using the authentication server ID included in the image recognition start request, with reference to the table of FIG. 11D. That is, since the distortion correction program is previously determined as the application not requiring authentication, authentication is not performed.

On the other hand, when the number of imaging elements is not one (S201: NO), referring to the cycle value management table of FIG. 10B, the image processing unit 34 sets a cycle value indicating a cycle time for repeating the real-time processing, to 1/30 seconds (S206). Specifically, the image processing unit 34 sets the cycle time to be the cycle value read out at S73. The cycle time is set to 1/30 seconds, which is longer than a time it requires for one input, thus preventing the later-described image composition processing from delaying.

Next, the connection unit 38 acquires two items of captured image data from the imaging unit 40 having two imaging systems (the imaging unit 40b) (S206). The two items of captured image data are data of hemispherical images as illustrated in FIGS. 4A and 4B, respectively. In this case, the connection unit 38 executes processing according to the image acquisition program (ProgC02 (2 systems)) as described referring to FIG. 11A. In executing this processing, the real-time data processing terminal 3a does not have to determine whether or not execution of the image acquisition program is allowed, as described above.

Then, the image processing unit 34 combines the two items of captured image data to create an equirectangular projection image EC as illustrated in FIG. 4C (S208). In this case, the image processing unit 34 executes the processing according to the image composition program (ProgS02 (image composition)) described referring to FIG. 11B. In executing this processing, the real-time data processing terminal 3a does not have to determine whether or not execution of the image composition program is allowed using the authentication server ID included in the image recognition start request, with reference to the table of FIG. 11D.

The operation then proceeds to S204, and the object detector 35 detects the feature points of the object in data of the equirectangular projection image EC, to detect the object. In this case, the image processing unit 34 determines whether or not the authentication server ID included in the image recognition start request is an appropriate authentication server ID managed in the table of FIG. 11D, in association with the service program (ProgD01 (object detection)), and executes the processing based on the determination result.

Next, at S205, the image processing unit 34 corrects the distortion in the image of the detected object. In this case, the image processing unit 34 executes processing according to the image processing program (ProgW02 (fish-eye correction)) as described above referring to FIG. 11C. In executing this processing, the real-time data processing terminal 3a does not have to determine whether or not execution of the fish-eye distortion correction program is allowed using the authentication server ID included in the image recognition start request, with reference to the table of FIG. 11D.

As described above, in real-time processing, S204 of detecting an object is performed based on authentication.

Figure 32:
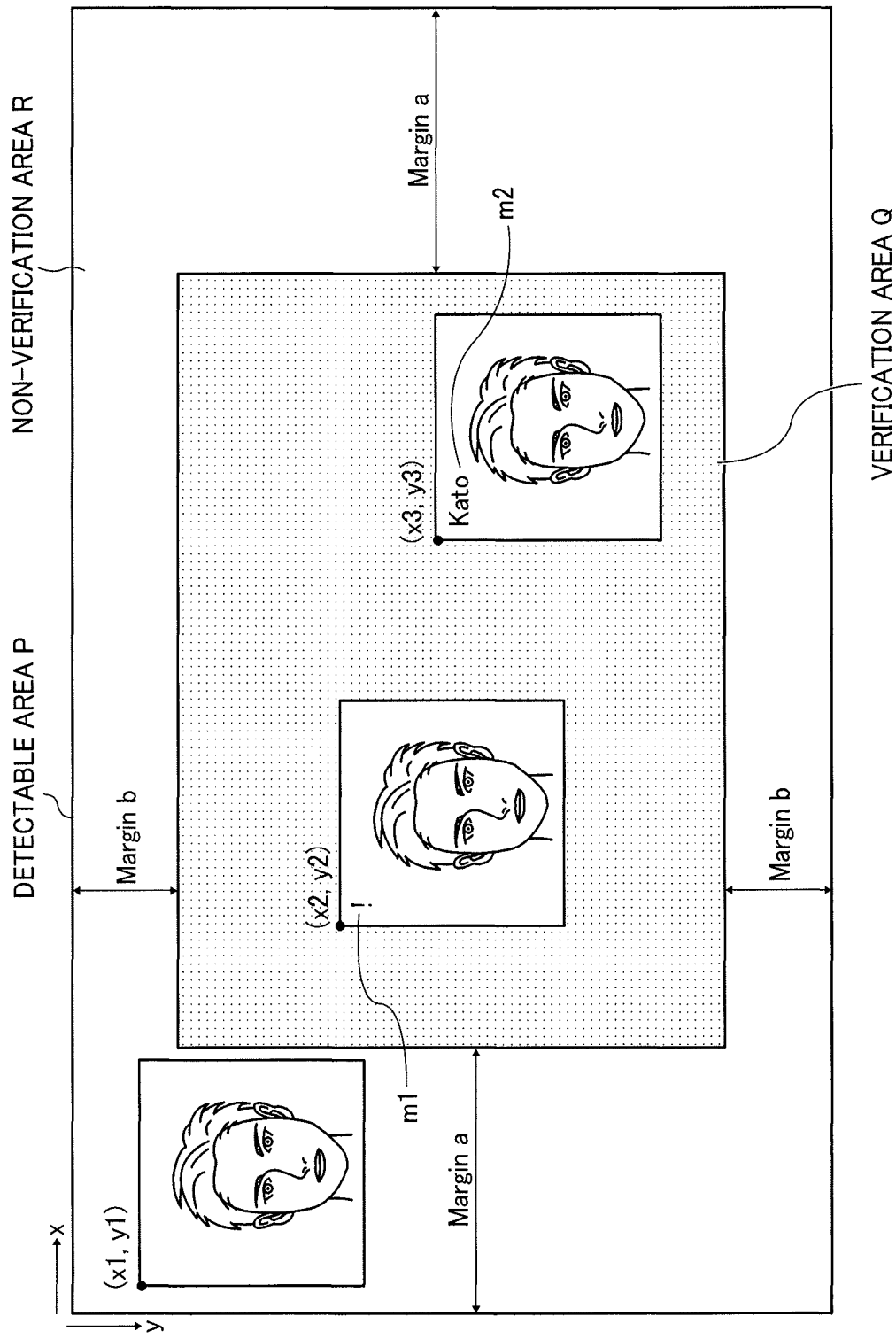
FIG. 32 is a diagram illustrating an image capturing area of the imaging unit, when the image acquisition terminal is provided in a certain room, according to the embodiment.

Referring back to FIG. 26, the communication unit 48 of the real-time data processing terminal 3a transmits captured image data to the communication unit 58 of the terminal data processing device 5 (S112). The transmitter and receiver 51 of the terminal data processing device 5 transmits the captured image data received at S112 to the transmitter and receiver 61 of the distributed data processing terminal 6 (S113). Accordingly, the display control 67 of the distributed data processing terminal 6 causes the display 517 to display a captured image as illustrated in FIG. 32 in real time (S114). FIG. 32 is an illustration of an example captured image, displayed at the distributed data processing terminal 6. The captured image is displayed with a frame that indicates a rectangle having a detected object (in this case, a detected human face). As described below referring to FIG. 32, a character image is combined with the captured image data to indicate a verification status of the detected object. The above-described S112 to S114 correspond to process to stream data.

<Event Generation Processing>

Figure 28:
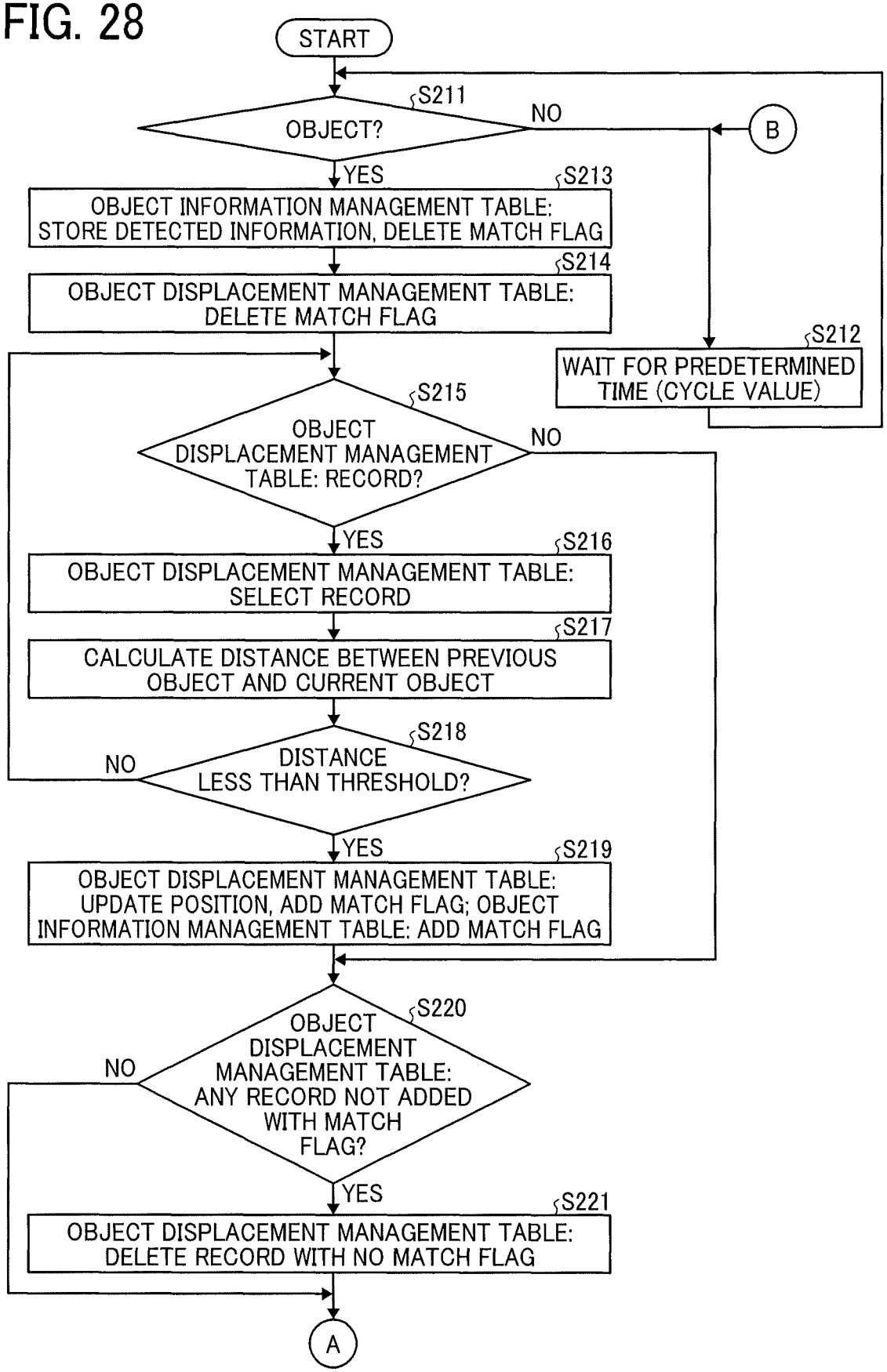
FIGS. 28 and 29 are a flowchart illustrating an example of event generation processing, performed in the real-time processing, according to a first embodiment.
Figure 29:
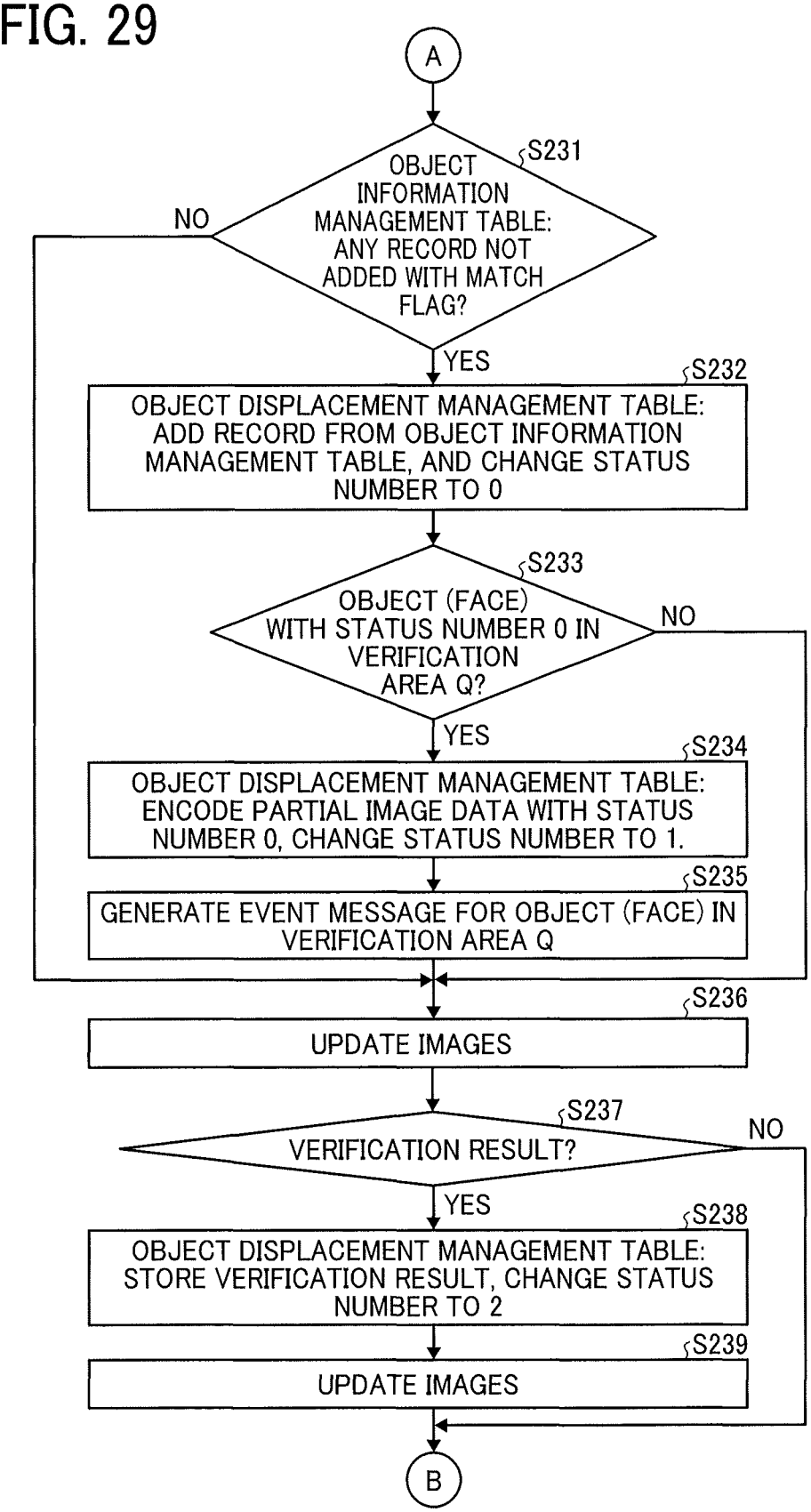

Referring to FIGS. 28 and 29, event generation processing to be performed in the real-time processing, is described according to an embodiment. FIGS. 28 and 29 are a flowchart illustrating event generation processing to be performed in the real-time processing, according to the embodiment.

At S211, the determiner 33 determines whether the object is detected based on the detection result obtained at S204 of FIG. 27. Specifically, when the detection result indicates that the object (in this case, a human face) is not detected (NO: S211), the operation proceeds to S212 to wait for a predetermined time period (the cycle value that is set), and return to S211. For example, the preset cycle value is set to 30 times per second, such that detection is performed 30 times a second. On the other hand, when the detection result indicates that the object (in this case, a human face) is detected (S211: YES), the operation proceeds to S213. As described below, at S211, the determiner 33 determines that the detected object is present, as long as the detected object is in the detectable area P (that is, even when the detected object is not within the verification area Q).

At S213, the storing and reading unit 39 stores information regarding the object that is detected at S204, as a new record in the object information management table (FIG. 14). At S213, the storing and reading unit 39 resets a value of the MATCH flag for all records that have been stored in the object information management table, for example, by deleting the value of the MATCH flag. The MATCH flag has been added at S219 to be described below.

At S214, the storing and reading unit 39 resets a value of the MATCH flag for all records that have been stored in the object displacement management table (FIG. 15), for example, by deleting the value of the MATCH flag. The MATCH flag has been added at S219 to be described below.

Next, S215 to S219 are performed to determine whether there is any record in the object displacement management table, that matches a particular record in the object information management table. That is, as described above referring to FIGS. 14 and 15, as a new record for a currently-detected object is entered into the object information management table, a record that has been entered before will be moved to the object displacement management table. In one example, if the record entered into the object information management table corresponds to any record stored in the object displacement management table, that object is determined to be moved from the previous position as indicated by the object displacement management table, to the current position as indicated by the object displacement information table. In another example, if the record entered into the object information management table does not correspond to any record stored in the object displacement management table, that object is determined as a new object. This determination processing is performed for each of the records that are entered into the object information management table, for example, in an order of entry.

When there is any record in the object displacement management table that can be compared with a particular record in the object information management table (S215: YES), the storing and reading unit 39 selects one record to be read out from the object displacement management table (S216). When there is no more record (S215: NO), the operation proceeds to S220.

At S217, the computation unit 31 calculates, for the record that is selected, a distance between the position of the currently-detected object, which is stored in the object information management table at S213, and the position of the previously-detected object, which is stored in the object displacement management table at S216. The position of the object is indicated by X and Y coordinates.

The determiner 33 determines whether the distance calculated at S217 is less than a threshold (S218). In this embodiment, the distance is calculated using Squared Euclidean Distance (SED), as described in $(X-Xn)^2+(Y-Yn)^2$. Alternatively, the determiner 33 may determine whether the calculated distance is equal to or less than the threshold.

Since the SED puts a higher weight on an object with a greater distance, two objects that are near in distance can be easily identified. In alternative to the SED, any desired computation method may be used to calculate a distance. For example, a city block distance may be used. In another example, a number of pixels of the object that are shifted in a specific direction (X direction or Y direction) may be counted to obtain a distance.

Next, when the distance calculated at S217 is less than the threshold (S218: YES), the determiner 33 determines that the currently-detected object and the previously-detected object are the same object, and the operation proceeds to S219. In such case, S215 to S218 are not performed for any other record that may remain in the object displacement management table as a subject for comparison with the particular record in the object information management table.

When the distance calculated at S217 is not less than (that is, equal to or greater than) the threshold (S218: NO), the currently-detected object and the previously-detected object are not the same object, and the operation returns to S215. In such case, S215 to S218 are performed for any other record in the object displacement management table as a subject for comparison with the particular record in the object information management table.

At S219, the storing and reading unit 39 refers to the object displacement management table to update the position of the previously-detected object stored in the object displacement management table at S216, with the position of the currently-detected object stored in the object information management table at S213. After updating, the storing and reading unit 39 adds the MATCH flag to each of the record in the object information management table, and the record in the object displacement management table, for that particular object.

Next, at S220, the storing and reading unit 39 determines whether there is any record, in the object displacement management table, that is not added with the MATCH flag. When it is determined that there is any record having no MATCH flag (S220: YES), the storing and reading unit 39 deletes such record with no MATCH flag value (S221), and the operation proceeds to S231 of FIG. 29. Any record having no MATCH flag value is the object, which has been previously detected, but no longer detected as there is no information regarding the currently-detected object in the object information management table. In such case, the determiner 33 determines that the object (in this case, a human face) is out of the detectable area P (which means that the object is also out of the verification area Q). In such case, the storing and reading unit 39 deletes that record from the object displacement management table. On the other hand, when it is determined that there is no record having no MATCH flag value (S220: NO), the operation proceeds to S231 without performing S221.

At S231, the storing and reading unit 39 determines whether there is any record, in the object information management table, that is not added with the MATCH flag. When it is determined that there is any record having no MATCH flag (S231: YES), the storing and reading unit 39 adds that record into the object displacement management table, as a record for a new object (S232). Further, the storing and reading unit 39 enters the value "0 (before verification)", for the verification status of the record that is added.

That is, when there is a record having no corresponding record in the object displacement management table, it can be determined that such record corresponds to a new object (in this case, a human) that is newly detected in the detectable area P. In such case, information relating to the newly-detected object is added to the object displacement management table, to be ready for verification when such newly-detected object moves into the verification area Q.

Further, referring to FIG. 15, the storing and reading unit 39 assigns a new partial image ID to the newly-detected object. For example, the partial image ID has a value that is incremented by one, from the partial image ID that has been assigned to the object previously detected for the last time. Even if the record is deleted at S221, the partial image ID is not re-numbered for each record. That is, each object being detected is assigned with a unique ID, which helps to uniquely identify each object.

When there is no record with no MATCH flag in the object information management table (S231: NO), the operation proceeds to S236.

At S233, the determiner 33 determines whether the object having the verification status "0 (before verification)" in the object displacement management table, is within the verification area Q (S233). Specifically, the determiner 33 determines whether the position of the object is within the verification area Q. When it is determined that the object is within the verification area Q (S233: YES), the image processing unit 34 refers to the position, width, and height of the object, to generate partial image data of the object, and encode the partial image data in a standard format such as JPEG (S234). This partial image data is transmitted for verification. The storing and reading unit 39 refers to the object displacement management table to change the verification status of the object, to "1 (verifying)".

When it is determined that the object is not within the verification area Q at S233 (S233: NO), the operation proceeds to S236. In such case, the partial image data is not transmitted.

Next, the event generator 36 generates an event message, which indicates transmission of the partial image data and the partial image ID for the partial image data, to the terminal data processing device 5 (S235). Specifically, the event generator 36 sends an event message "Send".

Next, the image processing unit 34 updates the captured image data to be transmitted to the distributed data processing terminal 6 as described above referring to FIG. 26. The character image to be combined with the captured image data may also be changed according to the verification status.

In particular, for the object with the verification status "1 (verifying)", the image processing unit 34 combines the captured image data with a character image indicating the verification status (S236). Specifically, at S236, for each partial image having the verification status of "1 (verifying)" in the object displacement management table, the image processing unit 34 refers to the position of the partial image in the object displacement management table, and combines a character image with the captured image such that the character image is displayed at a specific position of the captured image (S236).

FIG. 32 illustrates an example of a combined image, generated by combining the captured image with the character image. Specifically, FIG. 32 is an illustration of an image capturing area of the imaging unit, when the image acquisition terminal is provided in a certain room, according to the embodiment.

For example, for the partial image having the verification status "1 (verifying)" in the object displacement management table (FIG. 15), the image processing unit 34 refers to the position (x2, y2), and adds a waiting status mark m1 "!", which indicates that the partial image is being verified, to a position of the captured image where the partial image is located. In this example, the waiting status mark m1 is displayed at the coordinates of the position (x2, y2) of the partial image.

Referring back to FIG. 29, the communication unit 48 determines whether a verification result is received in response to a request for verification (S237). When the communication unit 48 does not receive a verification result at S318 to be described below (S237: NO), the operation proceeds to S212 of FIG. 28. When the communication unit 48 receives the verification result (that is, the name and the partial image ID) (S237: YES), the storing and reading unit 39 stores the received name, in the name field associated with the received partial image ID in the object displacement management table (S238). Further, the storing and reading unit 39 changes the verification status, from the "1 (verifying)" to "2 (verification completed)".

Next, the image processing unit 34 further combines the captured image data with a character image indicating the verification status "2 (verification completed)" (S239).

Specifically, at S239, for each partial image having the verification status of "2 (verification completed)" in the object displacement management table, the image processing unit 34 refers to the position of the partial image in the object displacement management table associated with the received partial image ID, and combines a character image indicating the received name with the captured image such that the character image is displayed at a specific position of the captured image (S239).

For example, as illustrated in FIG. 32, for the partial image having the verification status "2 (verification completed)" in the object displacement management table (FIG. 15), the image processing unit 34 refers to the position (x3, y3) and the name m2 "Kato", and adds the name m2 "Kato" to a position of the captured image where the partial image is located.

As described above referring to S112 and S113 of FIG. 26, the communication unit 48 transmits the captured image data, which is obtained at S236 or S239, to the distributed data processing terminal 6. The display control 67 of the distributed data processing terminal 6 controls the display 517 to display a captured image as illustrated in FIG. 32 in real time (S114).

As illustrated in FIG. 32, the display control 67 controls the display 517 to display the partial image representing a particular object captured in the detectable area P. When the object is in the detectable area P, but not within the verification area Q, the display 517 displays the partial image data with no character image. When the object enters into the verification area Q, the display 517 displays the partial image data with the mark m1, indicating that the object is being verified. When the object has been verified, the display 517 displays the partial image data with the mark m2, indicating that the object has been verified, with the verification result indicating the verified name. Since the image being displayed changes according to the verification status, the user at the distributed data processing terminal 6 is able to promptly know the current verification status of the object being displayed. The operation then returns to S212 of FIG. 28.

Next, processing to be performed by the terminal data processing device 5, to perform verification, is described referring to FIG. 26.

Referring to FIG. 26, the communication unit 48 of the real-time data processing terminal 3a transmits the "Event" message, with the partial image data of the object (in this case, human face), and the partial image ID, to the communication unit 58 of the terminal data processing device 5 (S115).

Next, the data detector 56 of the terminal data processing device 5 detects whether or not the event message "Send" is received at the communication unit 58 (S116).

When the event message is received (S116: YES), the communication unit 58 receives the partial image data and the partial image ID transmitted together with the event message (S117). The storing and reading unit 59 temporarily stores the partial image data in the storage unit 5000 (S118).

Next, the data detector 56 monitors for the partial image data to determine whether reception of the partial image data is completed or not (S119). The processing of S119 is repeated until all items of partial image data and the partial image ID are received for all of event messages that are received (S119: NO). When reception of the partial image data and the partial image ID is completed (S119: YES), the storing and reading unit 59 reads partial image data and the partial image ID, each having been transmitted with the event message and temporarily stored in the storage unit 5000 (S120).

The transmitter and receiver 51 transmits all items of partial image data and partial image ID, read out at S120, to the transmitter and receiver 61 of the distributed data processing terminal 6 via the intranet 200 (S121). Accordingly, the transmitter and receiver 61 of the distributed data processing terminal 6 receives all items of partial image data and partial image ID. Accordingly, the transmitter and receiver 61 of the distributed data processing terminal 6 receives all items of partial image data.

(Verification Processing)

Figure 30:
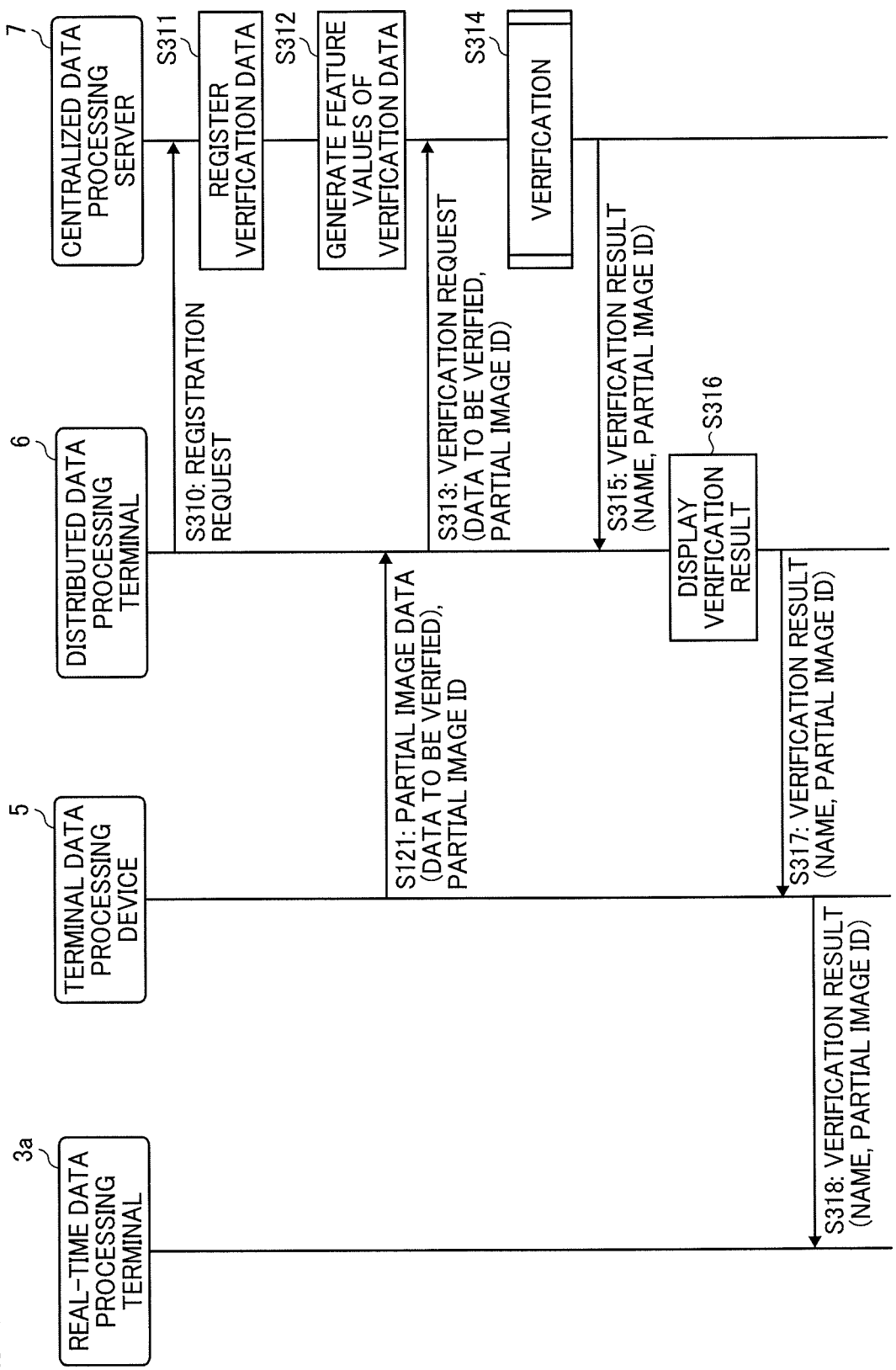
FIG. 30 is a sequence diagram illustrating processing of verifying data to be verified, according to an embodiment.
Figure 31:
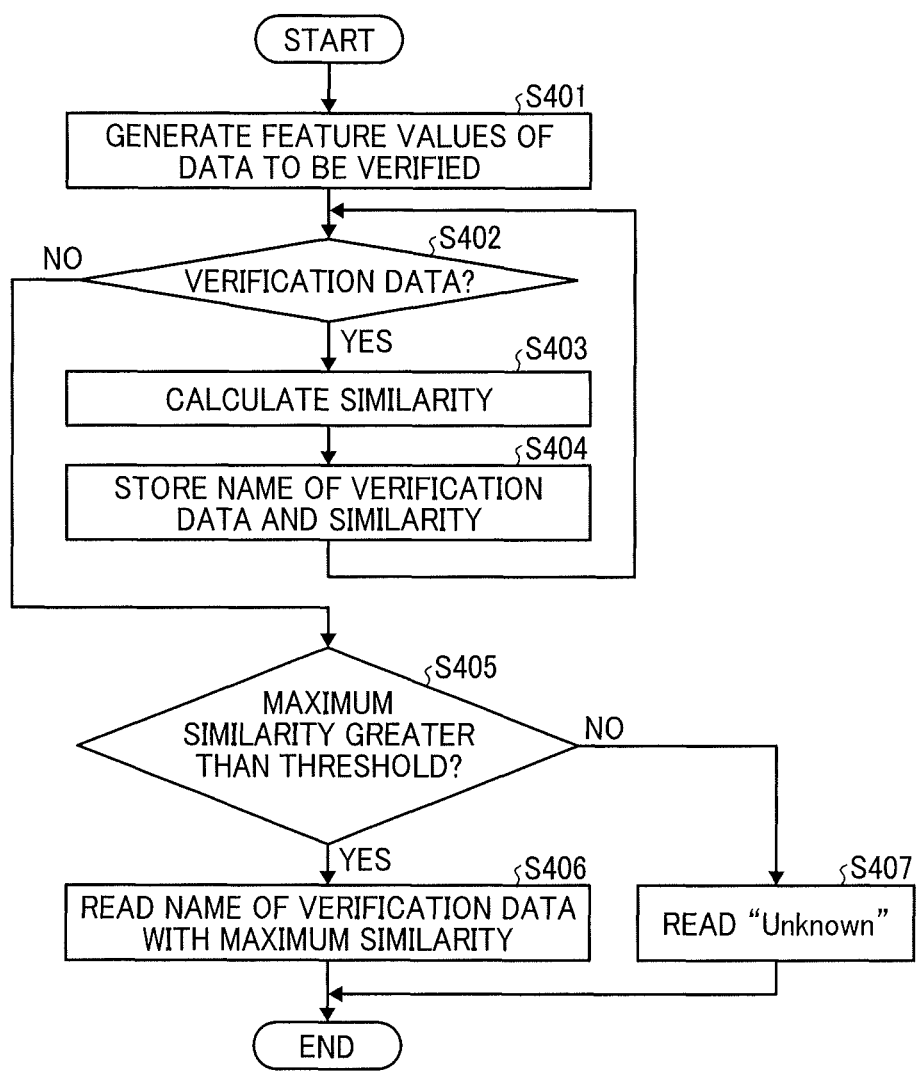
FIG. 31 is a flowchart illustrating processing of verifying data to be verified, according to the embodiment.

Next, referring to FIGS. 30 to 32, processing of verifying data to be verified, i.e., the partial image data, is described, according to an embodiment. FIG. 30 is a sequence diagram illustrating verification processing, according to the embodiment. FIG. 31 is a flowchart illustrating verification processing, according to the embodiment. FIG. 32 is a diagram illustrating an image capturing area of the imaging unit, when the image acquisition terminal is provided in a certain room, according to the embodiment.

In response to a user operation, the distributed data processing terminal 6 accesses the centralized data processing server 7 to transmit a request for registration of verification data used for verification (S310). In response to the request, the storing and reading unit 79 of the centralized data processing server 7 stores the verification data in the storage unit 7000, and further registers a file name and a name of the object for the verification data to be registered, in the verification data management DB 7001 (FIG. 12) (S311).

Next, in the centralized data processing server 7, the feature value generator 74 converts the verification data that is registered at S311 into bitmap data, to generate feature value parameters for the verification data (S312). Such feature value parameters are used to identify an individual using various types of information that can be discriminative such as height or slope of facial components such as a nose or eyes detected in the facial image. S310 to S312 may be performed in any desired time, before reception of the partial image data to be verified.

Next, as the transmitter and receiver 61 of the distributed data processing terminal 6 receives the partial image data as data to be verified, and the partial image ID, at S121 of FIG. 26, the transmitter and receiver 61 transmits, to the centralized data processing server 7, verification request information indicating a verification request (S313). The verification request includes the partial image data (target data to be verified) and the partial image ID. The centralized data processing server 7 receives the verification request at the transmitter and receiver 71.

Next, the centralized data processing server 7 performs verification processing (S314). Referring to FIG. 31, verification processing is described according to the embodiment.

As illustrated in FIG. 31, the feature value generator 74 of the centralized data processing server 7 decodes the data to be verified, which is received at S313, into bitmap data, and calculates parameters of feature values for the data to be verified (S401). Such feature value parameters are used to identify an individual using various types of information that can be discriminative such as height or slope of facial components such as a nose or eyes detected in the facial image.

Then, the storing and reading unit 79 searches the verification data management DB 7001 to determine whether or not there is any registered verification data (S402). When it is determined at S517 that there is the registered verification data (S402: YES), the verification unit 75 compares the feature value parameters between the verification data and the data to be verified, and calculates the degree of similarity between these data (S403). Next, the storing and reading unit 79 temporarily stores, in the storage unit 7000, the "name" assigned to the verification data registered at S311 and the "similarity" calculated at S403 in association (S404). The above-described processing from S402 is performed on verification data listed next in the verification data management table in FIG. 12.

On the other hand, when it is determined at S402 that there is no verification data being registered (including cases where there is absolutely no verification data), the operation proceeds to S405. The determiner 73 determines whether the maximum similarity of the verification data, from among the similarities temporarily stored in the storage unit 7000, is greater than a threshold (S405).

When the determiner 73 determines that the maximum similarity is greater than the threshold ("YES" at S405), the storing and reading unit 79 reads the "name" assigned to the verification data having the maximum degree of similarity, from the verification data management DB 7001 (S406). The threshold is set to, for example, "80%". When the similarity is low, the "name" of such verification data is not read out.

When the determiner 73 determines that the maximum similarity is equal to or less than the threshold ("NO" at S405), the storing and reading unit 79 reads information indicating "Unknown" from the storage unit 7000 (S407). Processing of S314 then ends. Referring back to FIG. 30, the transmitter and receiver 71 of the centralized data processing server 7 transmits verification result information indicating the verification result that includes the calculated similarity to the distributed data processing terminal 6 (S315). The verification result information includes the name of the verification data that is read at S406, or information read at S407, and the partial image ID received at S313. The transmitter and receiver 61 of the distributed data processing terminal 6 receives the verification result information.

Next, the display control 67 of the distributed data processing terminal 6 controls the display 517 to display the screen including the verification result as illustrated in FIG. 32 (S316). In the following, processing to display the verification result is described with reference to FIG. 32.

As described above referring to FIGS. 14, 15, 28 and 29, the real-time data processing terminal 3a determines whether the currently-detected object matches the object that has been previously detected, based on a distance between the currently-detected object and the previously-detected object. When the currently-detected object matches the previously-detected object, such that these two objects are the same object, the real-time data processing terminal 3a does not transmit a request for verifying partial image data for that object, to the centralized data processing server 7, via the terminal data processing device 5 and the distributed data processing terminal 6. That is, when the currently-detected object does not match any of the previously-detected objects, the real-time data processing terminal 3a determines that the currently-detected object is a newly-detected object when the currently-detected object is stored in the object information management table, and transmits a verification request. This greatly reduces the number of times the verification request is transmitted to the centralized data processing server 7, thus reducing an amount of data to be transmitted, and reducing communication costs. For example, a certain fee may be charged every time the verification service, which may be provided by a Web API, is used. By limiting the number of verification requests to be transmitted, the cost can be saved.

Further, in one example, the real-time data processing terminal 3a transmits the verification request, only when the currently-detected object is entered in the verification area Q, which is set smaller than the detectable area P.

The detectable area P is a range of the image capturing area in which the imaging unit 40 can detect an object (in this case, a face). The detectable area P includes a verification area Q in which an image of the object (i.e., face) can be verified, and a non-verification area R other than the verification area Q in which an image of the object cannot be verified. Still referring to FIG. 32, the verification area Q can be defined by margins a and b of the detectable area P. The margin a is arbitrarily set for each of right and left sides in X direction, and the margin b is arbitrarily set for each of upper and lower sides in Y direction. Information on the areas, such as the margins a and b, are stored in the service program acquired by the real-time data processing terminal 3a at S97 illustrated in FIG. 25.

As described above, the detectable area P is previously determined based on an image capturing area of the imaging element 401a, such that it is usually fixed. The verification area Q can be freely set, for example, by the user of the distributed processing system 100, so as to match a size or a range of a room or an area where verification processing is applied. Even after a certain object is detected in the detectable area P, unless the object is not detected in the verification area Q, the real-time data processing terminal 3a does not send data to be verified to the centralized data processing server 7, via the terminal data processing device 5 and the distributed data processing terminal 6. This can greatly reduce an amount of data to be transmitted and communication costs.

The processing to detect an object at S204 is performed throughout the detectable area P of the image capturing area. If the detected object is out of the range (in this case, a rectangular area) defined by the margins a and b, that object is not within the verification area Q, but within the non-verification area R. In such case, the object in the detectable area P is detected, but not subject to verification as the object is out of the verification area Q. That is, the object is detected in a non-verification area R other than the verification area Q, of the detectable area P.

Here, (x1, y1) represents the coordinates of the upper left corner of the partial image data, when the object, represented by the partial image data, is detected in the non-verification area R.

(x2, y2) represents the coordinates of the upper left corner of the partial image data, when the object, represented by the partial image data, is detected in the verification area Q. Further, in FIG. 32, the waiting status mark m1 represented by "!" is displayed near the upper left corner (x2, y2) of the partial image data detected in the verification area Q. The waiting status mark m1 is displayed during a time period after the time when the distributed data processing terminal 6 transmits the verification request information (S313), until the time when the distributed data processing terminal 6 receives the verification result information from the centralized data processing server 7 (S315).

(x3, y3) represents the coordinates of the upper left corner of the partial image data, when the object, represented by the partial image data, is detected in the verification area Q. Further, in FIG. 32, the name information m2 represented by "Kato" is displayed near the upper left corner (x3, y3) of the partial image data detected in the verification area Q. The name information, in this example, is the name identifying the verified object, received from the centralized data processing server 7 at S315. As described above, as the object enters the verification area Q, the partial image representing the object is displayed with the waiting status mark m1 first, and then with the name information m2 after 1 to 2 seconds. With the name information, the user is able to know who the displayed object (in this example, the human face) is. If the name information is not available, "Unknown" is displayed. Specifically, the "Unknown" is displayed at S407 of FIG. 31, based on determination that the "name" in the verification result received at S315 is "Unknown".

Second Embodiment

Figure 33:
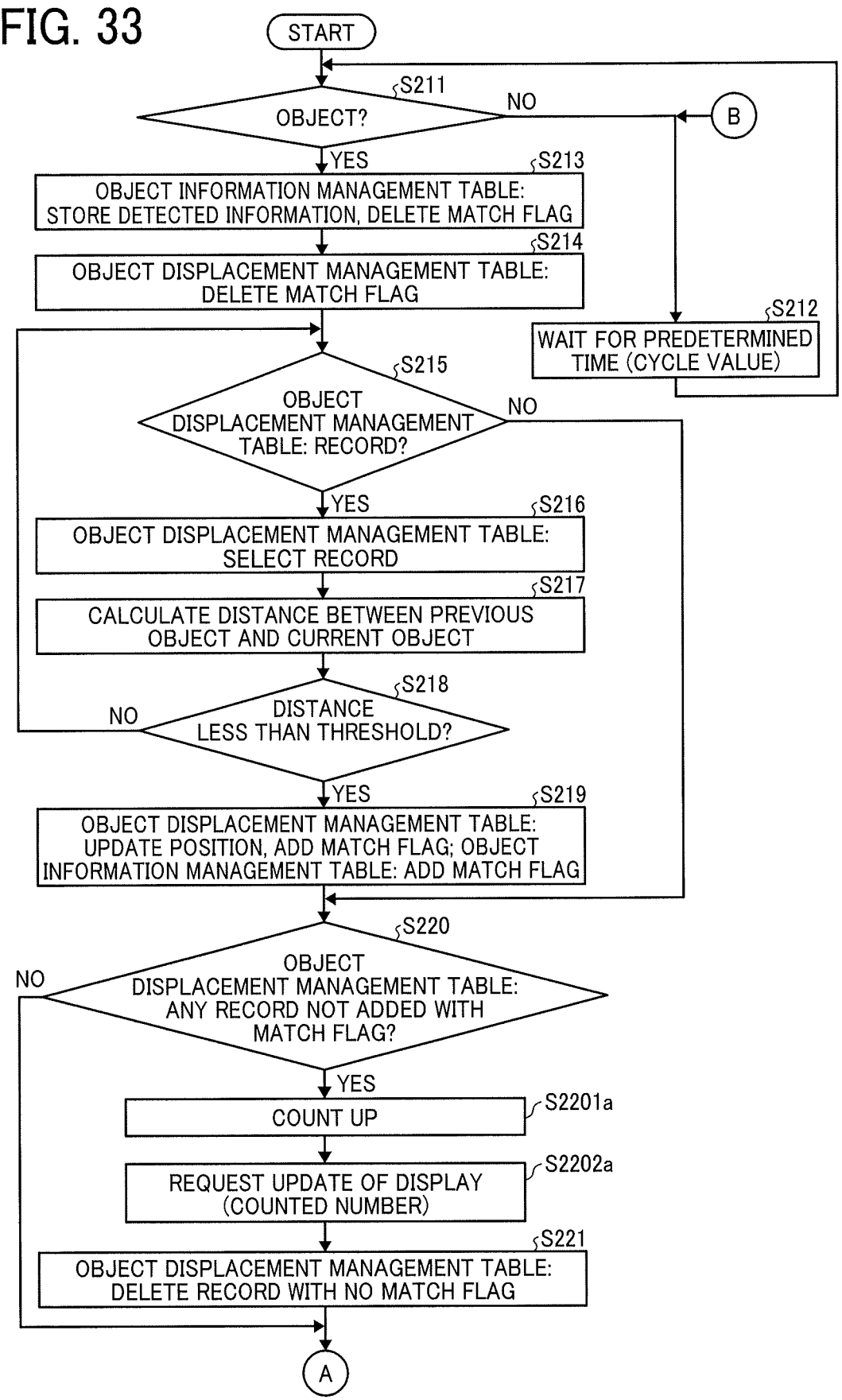
FIG. 33 is a flowchart illustrating an example of event generation processing, performed in the real-time processing in alternative to the event generation processing illustrated in FIG. 28, according to a second embodiment.
Figure 34:
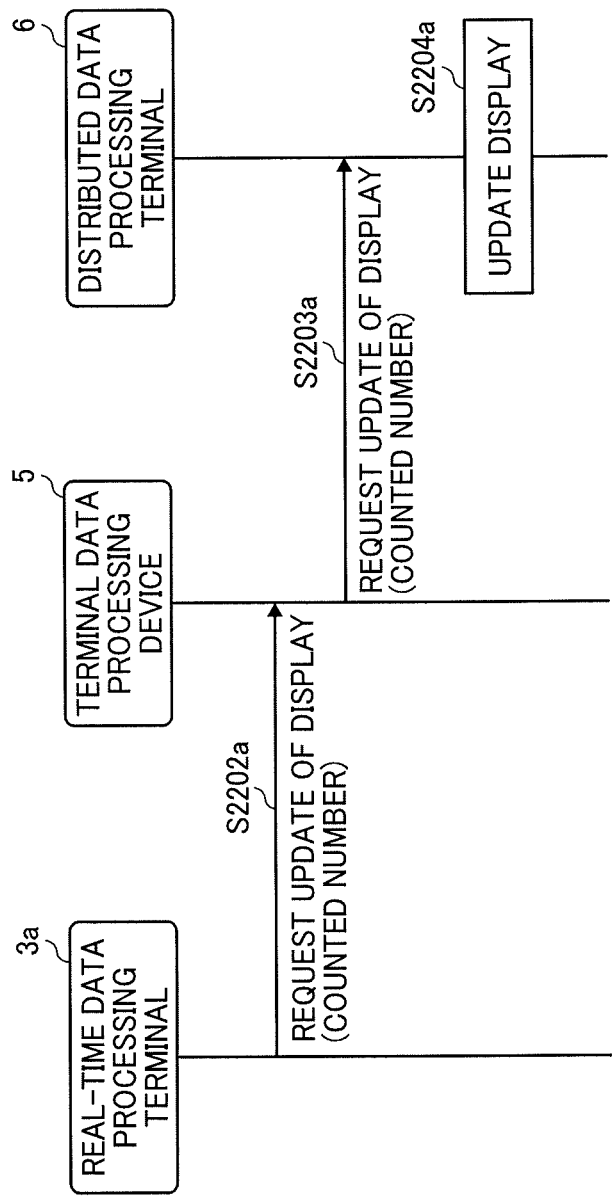
FIG. 34 is a sequence diagram illustrating processing to request update of display, according to the second embodiment.
Figure 35:
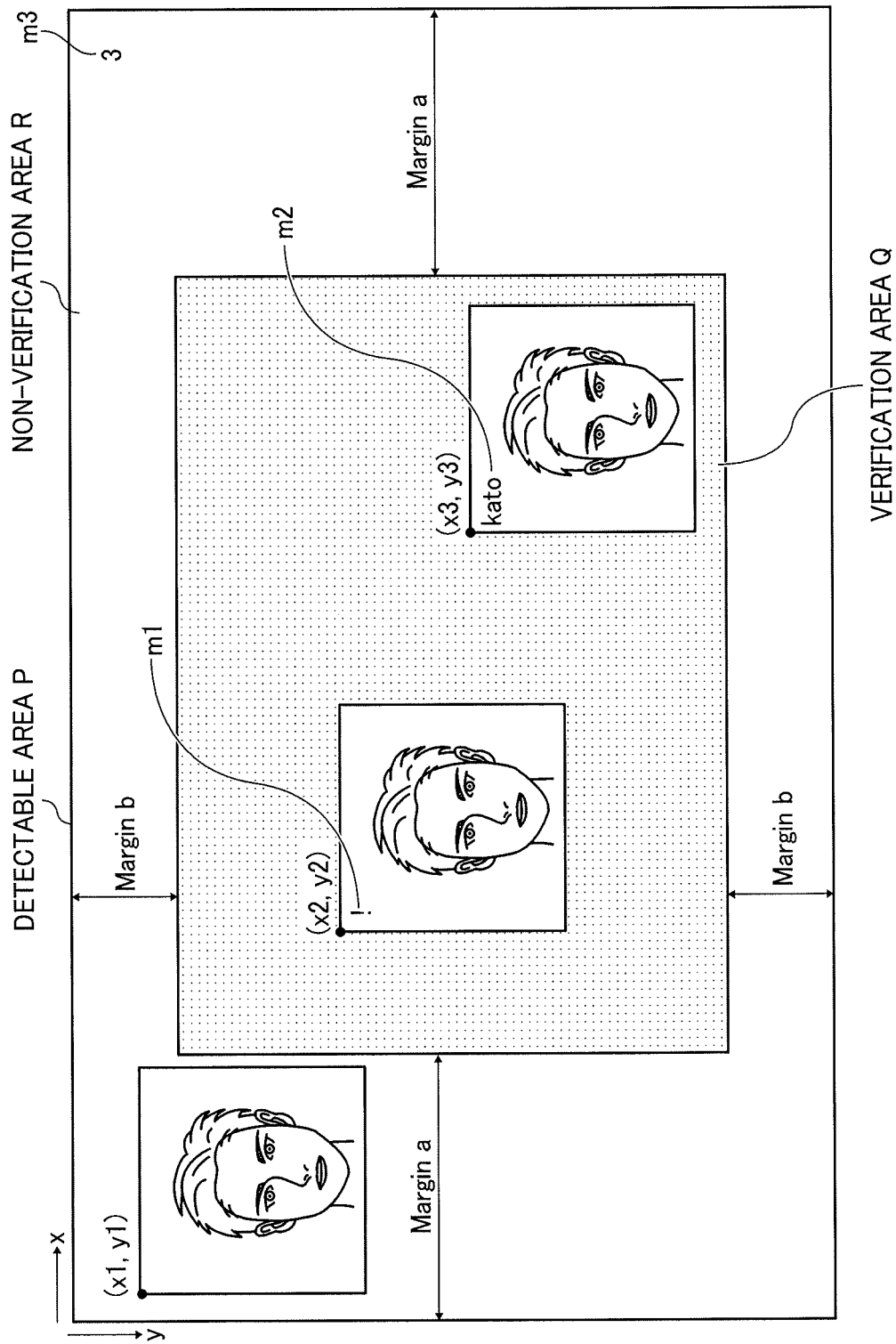
FIG. 35 is a diagram illustrating an image capturing area of the imaging unit, when the image acquisition terminal is provided in a certain room, according to the second embodiment.

Referring now to FIGS. 33 to 35, operation performed by the communication system 1 of FIG. 1 is described according to a second embodiment. In this embodiment, the communication system 1 operates in a substantially similar manner as described above according to the first embodiment, except for operation performed by the computation unit 31.

The computation unit 31 of FIG. 8 is further provided with the function of counting a number of objects (in this case, a human) that has been detected in the verification area Q, when the object that has entered the verification area Q exits from the verification area Q.

Referring to FIGS. 33 to 35, operation of capturing the image and displaying the image, performed by the communication system 1, is described according to the second embodiment. FIG. 33 is a flowchart illustrating an example of event generation processing, performed in the real-time processing, according to the second embodiment, in alternative to the event generation processing illustrated in FIG. 28. FIG. 34 is a sequence diagram illustrating operation of requesting update of display, according to the second embodiment. FIG. 35 is a diagram illustrating an image capturing area of the imaging unit, when the image acquisition terminal is provided in a certain room, according to the second embodiment.

The operation of FIG. 33 is substantially similar to the operation FIG. 28, except for addition of S2201a and S2202a.

At S220 of FIG. 33, when there is any record in the object displacement management table with no MATCH flag (S220: YES), the computation unit 31 counts up the number of objects that have entered the verification area Q (S2201a). The communication unit 48 of the real-time data processing terminal 3a transmits display update request information indicating a request to update display (S2202a). The display update request information indicates a request for updating the image displayed on the display 517 of the distributed data processing terminal 6, and includes the counted number obtained by the computation unit 31. Accordingly, the communication unit 58 of the terminal data processing device 5 receives the display update request information.

Next, referring to FIG. 34, in response to the display update request information received at S2202a, the transmitter and receiver 51 of the terminal data processing device 5 transmits the display update request information (including the counted number), received by the communication unit 58, to the distributed data processing terminal 6 (S2203a). Accordingly, the transmitter and receiver 61 of the distributed data processing terminal 6 receives the display update request information. At S2204a, the distributed data processing terminal 6 displays an image that is updated to include the counted number. For example, as illustrated in FIG. 35, the display control 67 of the distributed data processing terminal 6 controls the display 517 to display the counted number m3 in addition to the verification result. The image of FIG. 35 indicates that, currently, total of three objects, representing three persons, have entered in the verification area Q, since the time when counting starts.

As described in the second embodiment, information indicating that the object exits the verification area Q, can be used to count an accumulated number of objects (humans) that have been entered in the verification area Q. For example, the real-time data processing terminal 3a may be disposed at a location where many visitors enter a certain area, such as an event like a tradeshow, or an amusement park. In such case, the user may want to have information indicating the number of visitors, in addition to verifying each visitor. Since the status of the object can be accurately obtained, such information may be used to obtain the accumulated number of visitors, for example. More specifically, as described above, the number of objects is incremented by one, when the determiner 33 determines that the object is out of the verification area Q (or the detectable area P). As described above referring to the first embodiment, the determiner 33 determines that any object that remains in the object displacement management table, after the MATCH flag has been added, as the object that has existed the verification area Q.

Third Embodiment

Referring now to FIGS. 36 to 41, the communication system 1 is described according to a third embodiment.

In the third embodiment, in place of the imaging units 40a and 40b and the real-time data processing terminal 3a in the first embodiment and second embodiment, imaging units 40c and 40d and a real-time data processing terminal 3b are used, respectively. In the following, hardware configurations of the imaging units 40c and 40d and a functional configuration of the real-time data processing terminal 3b are described below. Since the hardware configurations of the real-time data processing terminal 3a and the real-time data processing terminal 3b are substantially the same, description thereof will be omitted.

In the third embodiment, Light Detection and Ranging (LiDAR) technology is applied to the imaging units 40a and 40b illustrated in FIG. 3, so as to measure a distance of an object using light, in addition to measuring a distance of an object using image processing. This improves accuracy in object detection. LiDAR is one of remote sensing techniques using light, which measures the amount of time it takes for each pulse of laser light to reflect back, and calculates a distance to an object or analyzes properties of the object.

<<Hardware Configuration>>

Figure 36A:
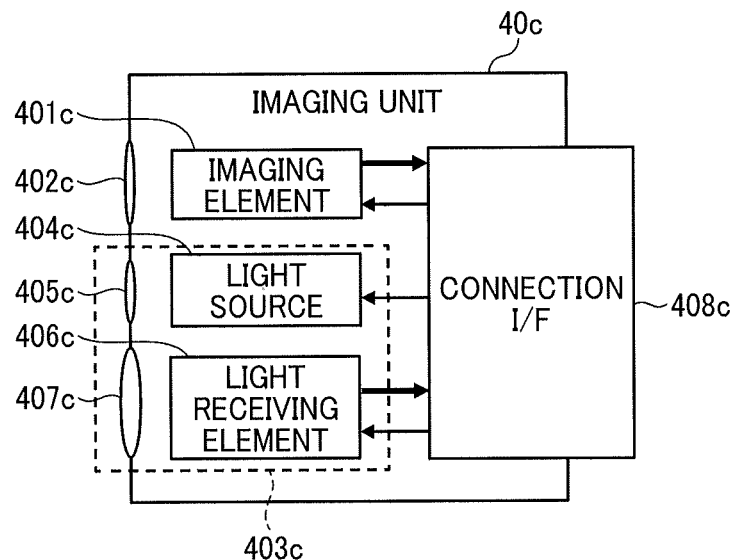
FIGS. 36A and 36B (FIG. 36) are schematic diagrams each illustrating an example of a hardware configuration of an imaging unit with a LiDAR unit, according to the third embodiment.
Figure 36B:
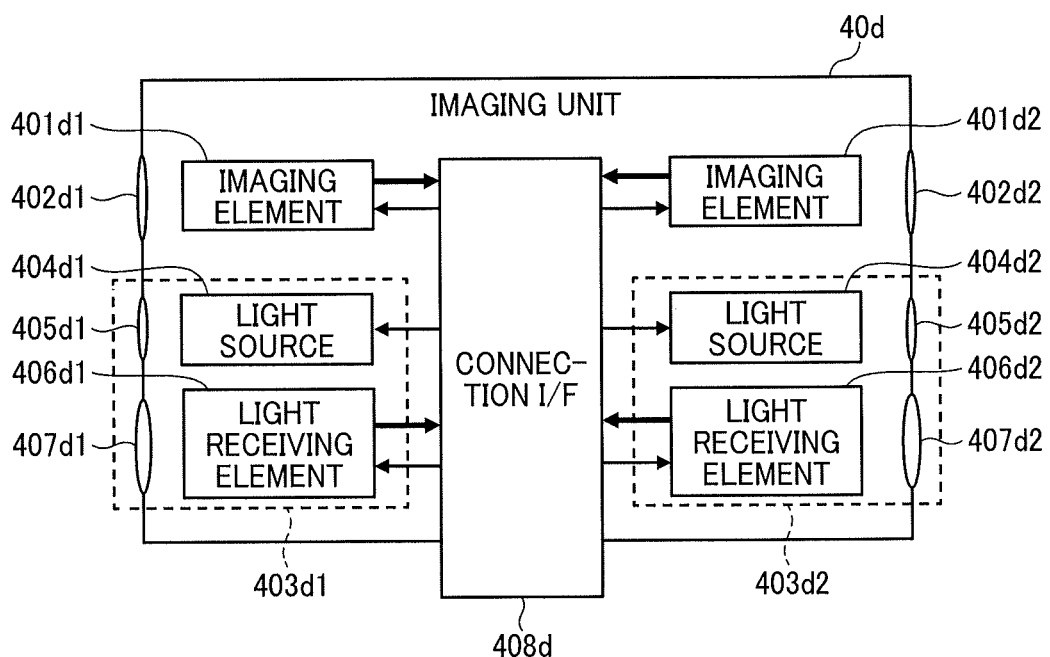

Next, referring to FIGS. 36A and 36B, a hardware configuration of the imaging unit is described according to the embodiment. FIG. 36A is a diagram illustrating a hardware configuration of an imaging unit 40c provided with the LiDAR, which is substantially similar to that of the imaging unit 40a of FIG. 3A. FIG. 36B is a diagram illustrating a hardware configuration of an imaging unit 40d provided with the LiDAR, which is substantially similar to that of the imaging unit 40b of FIG. 3B. The imaging unit 40 is a generic term for a plurality of types of imaging units (imaging units 40c and 40d) having different number of imaging elements or having different types of imaging elements.

First, the imaging unit 40c illustrated in FIG. 36A is described. As illustrated in FIG. 36A, the imaging unit 40c includes an imaging element 401c such as a CMOS or a CCD, a lens 402c, and a connection I/F 408c to be electronically connected to the imaging unit I/F 313 of the real-time data processing terminal 3b. When the imaging unit 40c is connected to the imaging unit I/F 313 of the real-time data processing terminal 3b, the imaging element 401c captures an image according to an imaging control signal transmitted from the imaging unit I/F 313 via the connection I/F 408c. Accordingly, the imaging unit 40c illustrated in FIG. 36A obtains a planar image.

The imaging unit 40c further includes a LiDAR unit 403c. The LiDAR unit 403c includes a light source 404c, a lens 405c, a light receiving element 406c, and a lens 407c. The light source 404c is implemented by, for example, a laser diode. The LiDAR unit 403c irradiates light at least to the detectable area P of the imaging element 401c.

The light source 404c emits light toward an object, as a measurement target. The emitted light is near infrared light having a wavelength range of from 800 nm to 950 nm, which is an electromagnetic wave. Further, the light source 404c is provided with a drive circuit that boosts the voltage supplied from the real-time data processing terminal 3b via the connection I/F 408c to a prescribed voltage. The drive circuit generates an oscillation signal for causing the light source 404c to emit light. The light source 404c periodically emits short pulse light having a pulse width of several nanoseconds to several hundred nanoseconds as modulated light according to the oscillation signal.

The lens 405c transmits light emitted from the light source 404c, and controls states such as the emission direction and the emission angle of the light to be emitted. The lens 405c collimates the light emitted from the light source 404c into parallel light (including almost parallel light). For this reason, the LiDAR unit 403c is able to measure distances even when the measurement target is rather a very small object.

The light receiving element 406c is implemented by various types of photodiode such as a silicon PIN (P-intrinsic-N) photodiode, and an avalanche photodiode (APD: Avalanche Photo Diode). Further, the light receiving element 406c is provided with a light receiving signal amplifier circuit that amplifies the received light signal. The light receiving signal amplification circuit amplifies the electric signal output from the light receiving element 406c, and outputs the amplified electric signal as a reflected light signal to the real-time data processing terminal 3b via the connection I/F 408c.

Of the light emitted from the light source 404c, the light receiving element 406c receives the light transmitted through the lens 407c and reflected by the object to be measured (hereinafter referred to as "reflected light"), converts such light into an electrical signal, and transmits the electrical signal to the real-time data processing terminal 3b. Here, the reflected light (reflected wave) is a light in which a near infrared light, which is the electromagnetic wave emitted from the light source 404c, is reflected by the object to be measured.

The lens 407c passes reflected light and controls the incident direction, incident angle, and the like of the reflected light.

Next, the imaging unit 40d illustrated in FIG. 36B is described. As illustrated in FIG. 36B, the imaging unit 40d includes imaging elements 401d1 and 401d2 each may be a CMOS or a CCD, lenses 402d1 and 402d2, and a connection I/F 408d to be electronically connected to the imaging unit I/F 313 of the real-time data processing terminal 3b.

The imaging unit 40d further includes LiDAR units 403d1 and 403d2. The LiDAR unit 403d1 includes a light source 404d1, a lens 405d1, a light receiving element 406d1, and a lens 407d1. The LiDAR unit 403d1, which is provided on the side of the imaging device element 401d1, is able to emit light at least to the detectable area of the imaging element 401d1, in the detectable area P of the imaging unit 40d.

The light source 404d1, the lens 405d1, the light receiving element 406d1, and the lens 407d1 are substantially similar to the light source 404c, the lens 405c, the light receiving element 406c, and the lens 407c, in configuration. Accordingly, description thereof is omitted.

The LiDAR unit 403d2 includes a light source 404d2, a lens 405d2, a light receiving element 406d2, and a lens 407d2. The LiDAR unit 403d2, which is provided on the side of the imaging element 401d2, is able to emit light at least to the detectable area of the imaging element 401d2, in the detectable area P of the imaging unit 40d.

The light source 404d2, the lens 405d2, the light receiving element 406d2, and the lens 407d2 are substantially similar to the light source 404c, the lens 405c, the light receiving element 406c, and the lens 407c, in configuration. Accordingly, description thereof is omitted.

Figure 37:
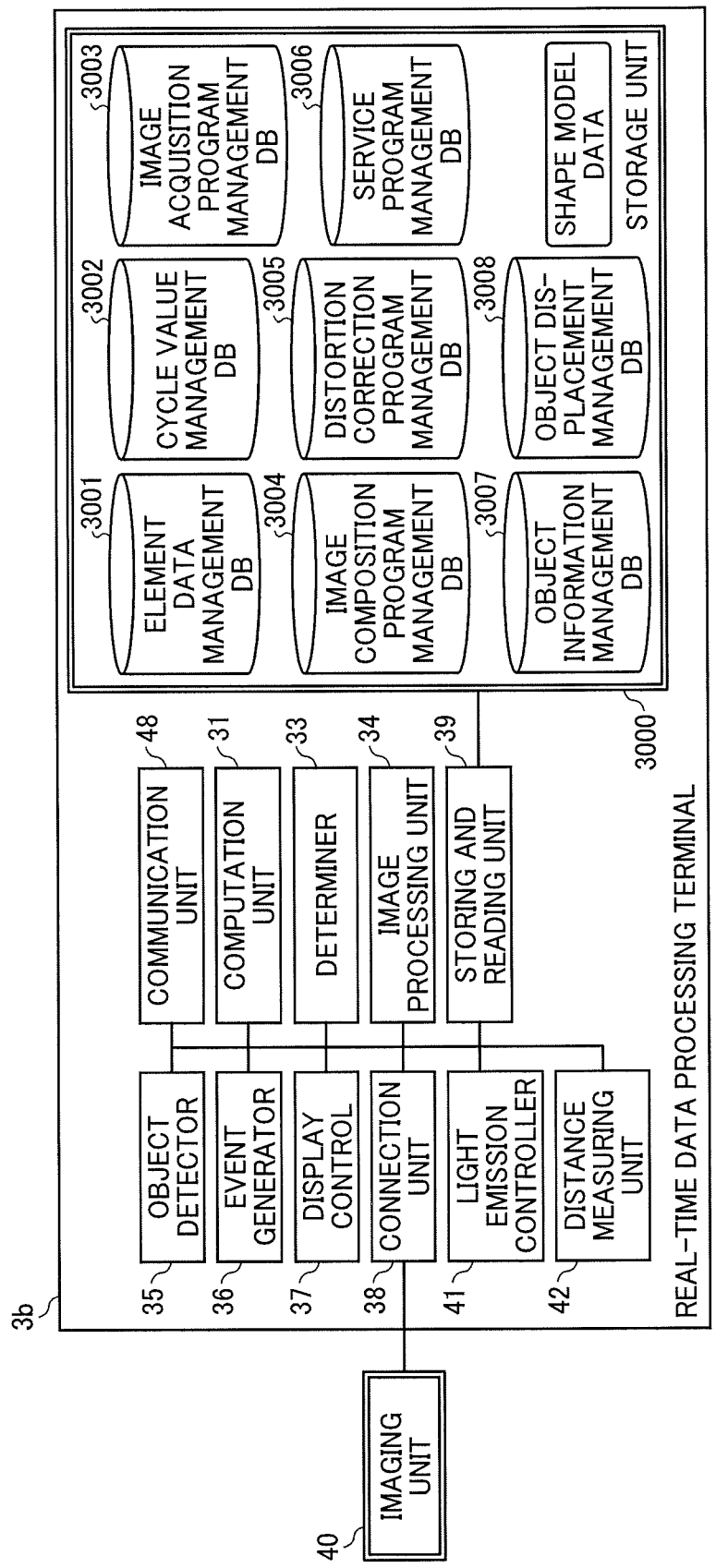
FIG. 37 is a schematic block diagram illustrating a functional configuration of the real-time data processing terminal 3, according to the third embodiment.

Referring to FIG. 37, a functional configuration of the real-time data processing terminal 3b is described according to the third embodiment. Since a functional configuration of the communication system other than the real-time data processing terminal 3b is substantially similar to the one illustrated above referring to FIGS. 8 and 9, description thereof is omitted.

The real-time data processing terminal 3b of FIG. 37 is substantially similar to the real-time data processing terminal 3a of the first embodiment illustrated in FIG. 8, except for some differences, such that description of the same elements is omitted. Specifically, the real-time data processing terminal 3b further includes a light emission controller 41 and a distance measuring unit 42, which will be described below. These units illustrated in FIG. 37, including the light emission controller 41 and the distance measuring unit 42, are functions that are implemented by or that are caused to function by operating any of the hardware components illustrated in FIG. 2 in cooperation with the instructions of the CPU 301 according to the control program expanded from the EEPROM 304 to the RAM 303.

The light emission controller 41 controls light emission of the light source 404c (or the light sources 404d1 and 404d2).

The distance measuring unit 42 measures a distance from the imaging unit 40c to the object as the measurement target. Specifically, the distance measuring unit 42 starts measuring a time period when a signal is generated at the above-described drive circuit, and stops measuring the time period when a signal converted from a reflected light of the object is generated. The distance measuring unit 42 then calculates a time period it takes for the light emitted to the object is received as the reflected light at the imaging unit 40c. That is, the distance measuring unit 42 calculates a distance from the image acquisition terminal 2 including the imaging unit 40c to the object to be measured, based on a time period from the time when light is emitted from the light source 404c to the time when the reflected light is received. With the above configuration, when the imaging unit 40c is connected to the real-time data processing terminal 3b, the light emission controller 41 modulates light emitted from the light source 404c, to irradiate a light beam having a spread angle of small value through the lens 405c. The light beam from the light source 404c is irradiated onto an object (for example, a face) to be measured. The light beam irradiated to the object to be measured, is reflected at a reflection point of the object to be measured, as a reflected light that is scattered and reflected in a uniform direction. Of the reflected light, only a light component passing the same optical path as the light beam irradiated to the object to be measured, enters the light receiving element 406c through the lens 407c that is substantially coaxial with the light source 404c. The light receiving element 406c detects the reflected light that has entered the light receiving element 406c, and outputs a reflection signal. The distance measuring unit 42 calculates a distance to the measurement target, based on a time difference between the time when the light is emitted from the light source 404c and the time when the reflected light is received at the light receiving element 406c.

Similarly, when the imaging unit 40d is connected to the real-time data processing terminal 3b, the light emission controller 41 modulates light beams emitted from the light sources 404d1 and 404d2, respectively, to irradiate light beams through the lenses 405d1 and 405d2, with each light beam having a spread angle of small value. The light beams from the light sources 404d1 and 404d2 are irradiated onto an object (for example, a face) to be measured. The light beams irradiated to the object to be measured, are each reflected at a reflection point of the object to be measured, as a reflected light that is scattered and reflected in a uniform direction. Of the reflected light, only light components passing the same optical paths as the light beams irradiated to the object to be measured, enter the light receiving elements 406d1 and 406d2 through the lenses 407d1 and 407d2 that are substantially coaxial with the light sources 404d1 and 404d2. The light receiving elements 406d1 and 406d2 respectively detect the reflected light beams that have entered the light receiving elements 406d1 and 406d2, and output reflection signals. The distance measuring unit 42 calculates a distance to the measurement target, based on a time difference between the time when the light is emitted from each of the light sources 404d1 and 404d2 and the time when the reflected light is received at corresponding one of the light receiving elements 406d1 and 406d2.

<<Operation>>

Figure 38:
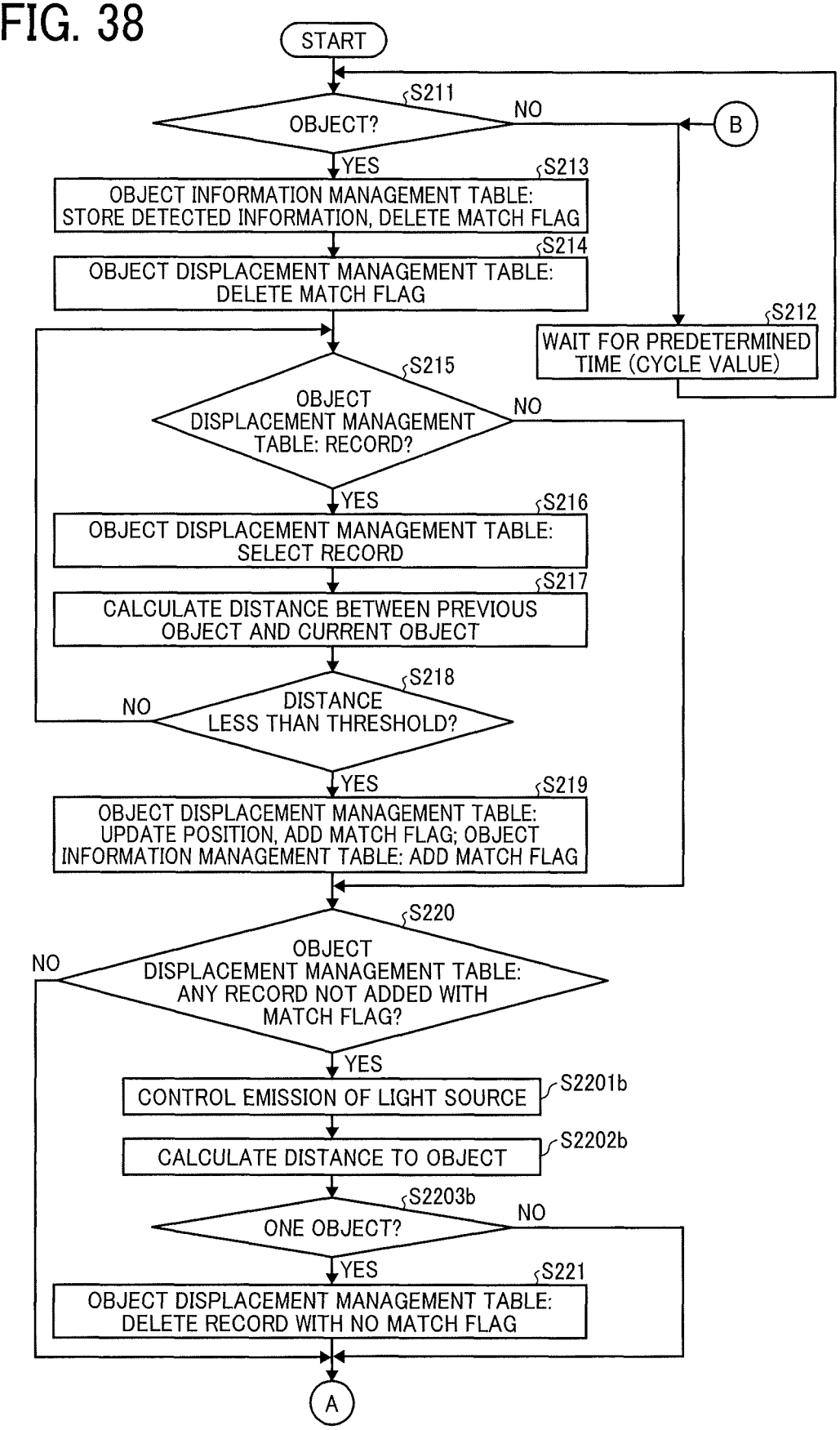
FIG. 38 is a flowchart illustrating an example of event generation processing, performed in the real-time processing in alternative to the event generation processing illustrated in FIG. 28, according to the third embodiment.
Figure 39:
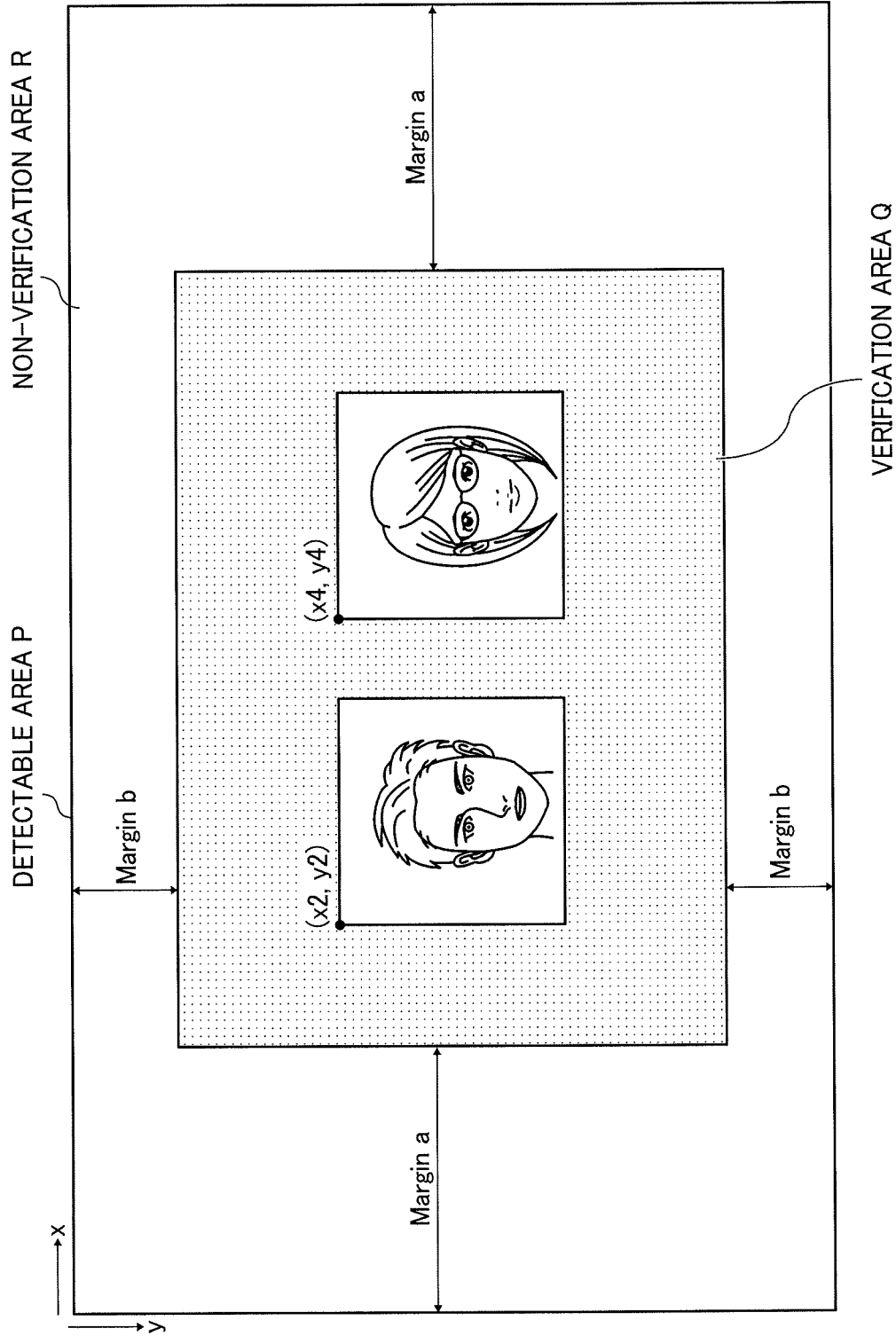
FIG. 39 is a diagram illustrating an image capturing area of the imaging unit, when the image acquisition terminal is provided in a certain room, according to the third embodiment.
Figure 40:
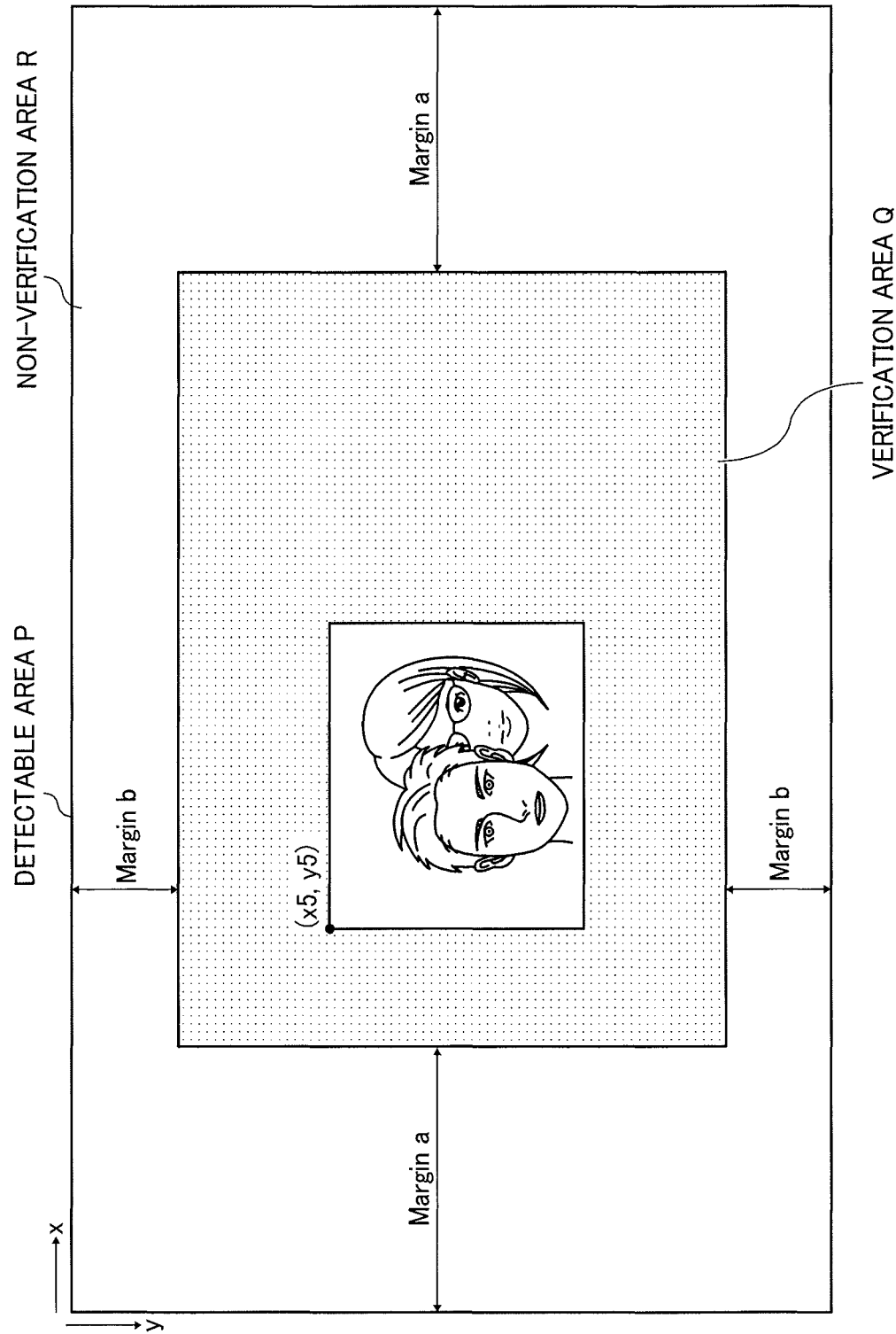
FIG. 40 is a diagram illustrating an image capturing area of the imaging unit without application of the LiDAR technology, according to the third embodiment.
Figure 41:
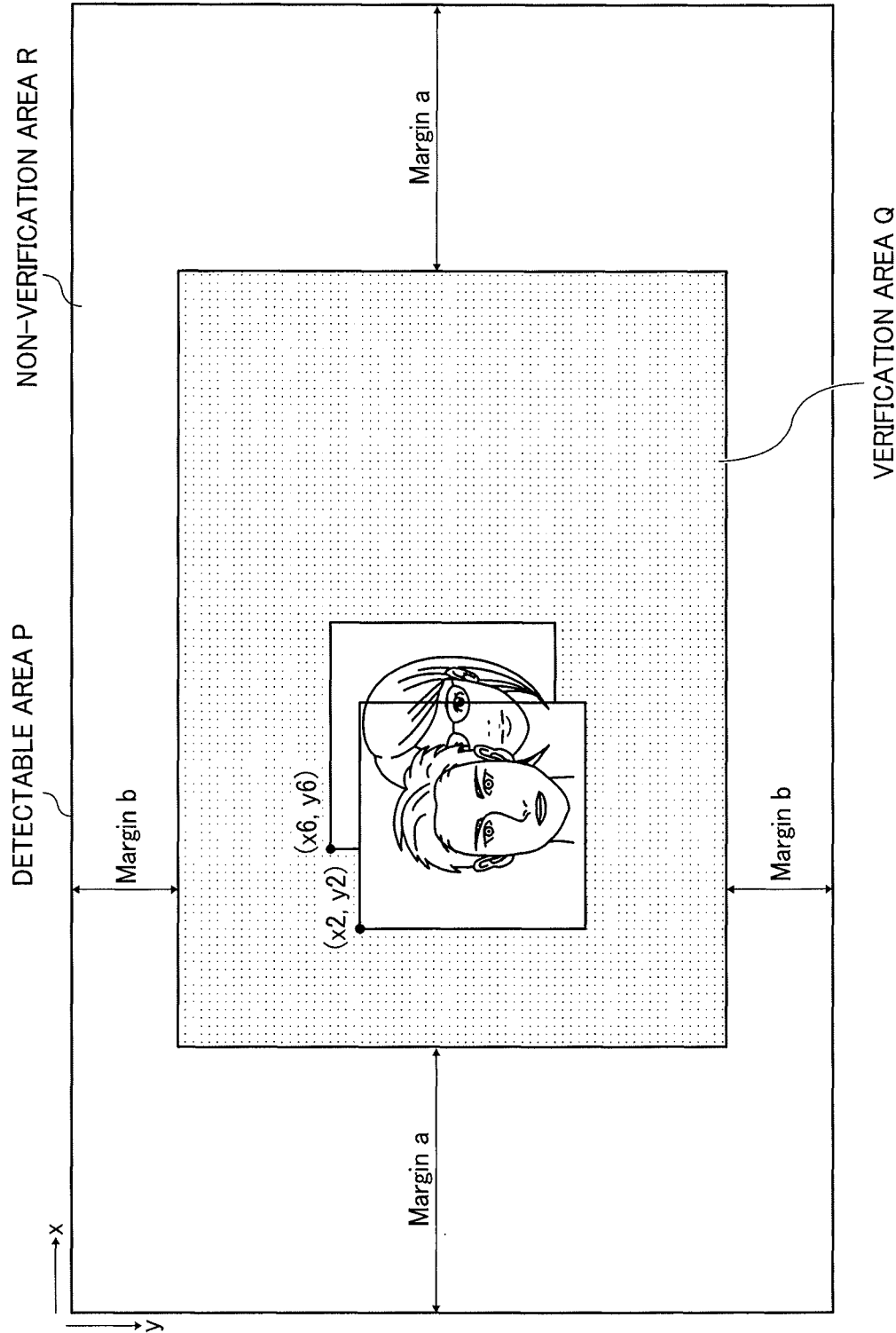
FIG. 41 is a diagram illustrating an image capturing area of the imaging unit with application of the LiDAR technology, according to the third embodiment.

Referring to FIGS. 38 to 41, operation of capturing the image and displaying the image, performed by the communication system 1, is described according to the third embodiment. FIG. 38 is a flowchart illustrating an example of event generation processing, performed in the real-time processing in alternative to the event generation processing illustrated in FIG. 28, according to the third embodiment. FIG. 39 is a diagram illustrating an image capturing area of the imaging unit, when the image acquisition terminal is provided in a certain room, according to the third embodiment. FIG. 40 is a diagram illustrating an image capturing area of the imaging unit without application of the LiDAR technology, according to the third embodiment. FIG. 41 is a diagram illustrating an image capturing area of the imaging unit with application of the LiDAR technology, according to the third embodiment. Although the following describes an example case in which the imaging unit 40c is connected to the real-time data processing terminal 3b, processing is performed in a substantially similar manner for the case where the imaging unit 40d is connected to the real-time data processing terminal 3b.

The operation of FIG. 38 is substantially similar to the operation of FIG. 28, except for addition of S2201b and 2202b. More specifically, as described below, for the object that has been determined as it exits from the detectable area P (that is, any record added with no MATCH flag), processing to measure a distance using the LiDAR technology is performed.

As described above referring to FIG. 28, at S220 of FIG. 38, when there is any record in the object displacement management table with no MATCH flag (S220: YES), the computation unit 31 performs S2201b and S2202b illustrated in FIG. 38. Specifically, the light emission controller 41 controls the light source 404c to emit light to the object as a measurement target (S2201b). The distance measuring unit 42 measures a time period between the time when the light is emitted and the time when the reflected light is received, to calculate a distance from the imaging unit 40c to the object as the measurement target (S2202b).

Next, based on the measurement result by the distance measuring unit 42, the determiner 33 determines whether the object detected by the object detector 35 as one, has more than one portion that differs in distance (S2203b). In this example, the determiner 33 determines that the object is not one object when a distance between portions of the object is equal to or greater than a predetermined distance value. The predetermined distance value is set to, for example, 20 cm. Since the distance between the tip of the nose and the cheek is several centimeters, the determiner 33 determines that the detected object is one object (here, a face), if portions of the object is apart for several centimeters, which is less than the predetermined distance value (S2203: YES).

For example, as illustrated in FIG. 39, it is assumed that two objects are detected. In this example, a male face having an upper left corner (x2, y2), and a female face having an upper left corner (x4, y4) are detected in the verification area Q. If the male face and the female face are apart from each other, such that a distance between these two objects, which can be calculated by a difference between coordinates (x2, y2) and (x4, y4), is not less than the threshold (S218: NO), the determiner 33 determines that these objects are not the same object. Accordingly, the MATCH flag is not added (S220: YES). In such case, the operation proceeds to S221.

In contrary, when the male face and the female face overlap with each other (for example, the female face is behind the male face), the object detector 35 may recognize these objects as one object. This may cause an error in, for example, counting the accumulated number of objects. As illustrated in FIG. 40, without application of the LiDAR technology, the facial image representing the male face, and the facial image representing the female face, may be displayed as partial image data having the upper left corner (x5, y5).

In view of this, as described above referring to FIGS. 36 to 38, the distance measuring unit 42 is provided, which measures a distance between the objects using LiDAR technology. Even when the object detector 35 recognizes two objects as one object, the determiner 33 is able to correctly recognize these two objects when a distance between these objects is equal to or greater than the predetermined distance value (S2203b: NO).

In this example, as illustrated in FIG. 41, partial image data representing a male face having an upper left corner (x2, y2), and partial image data representing a female face having an upper left corner (x6, y6) are detected in the verification area Q, even when these partial image data are partly overlapped. In such case (that is, S2203b: NO), S221 is not perfoinied, and the operation proceeds to S231 of FIG. 29.

As described above, when the determiner 33 determines that there is any record not added with the MATCH flag, the determiner 33 does not automatically determine that the object exists the verification area Q to proceed to S221. Instead, the determiner 33 determines whether the object, indicated by the record not added with the MATCH flag, is one object based on a measurement result obtained using the LiDAR technology. Based on determination that the object is one object, the determiner 33 determines that the object has exited the verification area Q.

Based on determination that the object detected as one object, is two different objects (S2203b: NO), the operation proceeds to S231 of FIG. 29, and further to S211 of FIG. 38 to repeat S211.

Alternatively, when the determination at S2203b is NO, the determiner 33 may proceed to S216 to calculate a distance between the currently-detected object and the previously-detected object for each of the correctly-detected objects. When the calculated distance is less than the threshold (S218: YES), the determiner 33 adds the MATCH flag, such that partial image data representing the detected object is not transmitted.

The above-described operation of FIG. 38 may be performed in various other ways. In the above-described embodiment, the real-time data processing terminal 2b performs processing to measure a distance to the object (S2201b and S2202b), for the record representing the object that is determined to be exit at S220. This greatly reduces computational loads. Alternatively, such processing to measure a distance to the object may be performed at any desired time before S220. In one example, such processing may be performed after S218, for the objects that have been determined as the same object.

Although the count number m3 is displayed in FIGS. 39 to 41 as in the second embodiment, the count number m3 may not be displayed as in the first embodiment.

As described above, according to the third embodiment, even when the determiner 33 determines that the object exists the verification area Q based on image processing, the determiner 33 further determines whether the object is correctly detected as one object using the LiDAR technology. This improves the accuracy in object recognition.

In any of the above-described embodiments, the determiner 33 determines whether the objects are the same at S217 and S218, based on a distance between the currently-detected object and the previously-detected object. In addition, the determiner 33 may make determinations based on the difference in area between partial image data representing the currently-detected object and partial image data representing the previously-detected object. Even when the currently-detected object is close to the previously-detected object, as long as detection areas are greatly different, the determiner 33 may determine that these objects are not the same object. This can reduce transmission of requests, such as requests for verification (S115, S121), which are unnecessary.

Specifically, when the following two conditions including condition 1 and condition 2 are satisfied, the operation proceeds to S219.

(Condition 1) The distance between the previously-detected object and the currently-detected object is less than (or equal to or less than) a threshold (This condition is the same as S218).

(Condition 2) The absolute value of the area difference between the previously-detected object and the currently-detected object is less (or equal to or less than) a threshold. The threshold may be any value that is previously set.

In this example, the area of the object is calculated by the computation unit 31, from a height and a width of the partial image.

Further, in any one of the above-described embodiments, the waiting status mark m1 may be expressed in any way other than the mark "!". For example, the waiting status mark m1 may be represented by an icon such as an hourglass icon, or a comment such as "verifying" or "authenticating".

In any one or more of the above-described embodiments, any desired data other than the captured image data that has been captured with the imaging unit 40 may be processed, such as image data created by the user. That is, examples of image data to be processed include the captured image data and the image data created by the user. Alternatively, the image acquisition terminal 2, which is an example of a communication terminal, may generate image data rather than obtaining the image data from the outside. Further, the image acquisition terminal 2 may acquire data other than image data, such as audio data by collecting audio or even temperature data from a temperature sensor, or humidity data from a humidity sensor.

Further, any one of the CPUs 301, 501, and 701, etc. may be a single processor or a multiple processor. Similarly, any one of the image acquisition terminal 2, the distributed data processing terminal 6, and the centralized data processing server 7 may be implemented by one or more apparatus such as one or more computers. The distributed data processing terminal 6 may also operate as a server.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

The illustrated apparatuses are only illustrative of one of several computing environments for implementing the embodiments disclosed herein. For example, in some embodiments, any of the servers in the communication system 1 includes a plurality of computing devices, e.g., a server cluster, that are configured to communicate with each other over any type of communications link, including a network, a shared memory, etc. to collectively perform the processes disclosed herein.

Moreover, the service providing server 8 and the authentication server 9 can be configured to share the processing of authenticating the user in various combinations. That is, the illustrated elements of the service providing server 8 and the authentication server 9 can be combined into a single server apparatus, or divided between a plurality of machines in combinations other than that shown in any of the above-described figures.

Further, any one of the above-described operation of determining whether a plurality of objects is a same object, and reducing the number of data transmissions is applicable to any desired system other than the above-described communication system.

The invention claimed is:

1. A communication terminal communicably connected with a server, comprising circuitry configured to:
   obtain first image data of at least a part of a first object detected at a first point of time;
   transmit the first image data to the server to request verification of the first image data;
   obtain second image data of at least a part of a second object detected at a second point of time, the second point of time being a time later than the first point of time;
   calculate a distance between a first position indicating a position of the first object at the first point of time, and a second position indicating a position of the second object at the second point of time; and
   control not to transmit the second image data based on a determination indicating that the calculated distance is equal to or less than a threshold.

2. The communication terminal of claim 1, wherein the circuitry determines that the first object and the second object are a same object when the calculated distance is equal to or less than the threshold, and determines that the first object and the second object are different objects when the calculated distance is greater than the threshold.

3. The communication terminal of claim 2, wherein the circuitry is further configured to
   store, in a first table, a record of the first object detected in a detectable area at the first point of time, and
   store, in a second table, a record of the second object detected in the detectable area at the second point of time,
   wherein, when the calculated distance is greater than the threshold, the circuitry is further configured to delete the record of the first object from the first table as an object that has exited the detectable area.

4. The communication terminal of claim 2, wherein the circuitry is further configured to
   store, in a first table, a record of the first object detected in a detectable area at the first point of time, and
   store, in a second table, a record of the second object detected in the detectable area at the second point of time,
   wherein, when the calculated distance is greater than the threshold, the circuitry is further configured to store, in the first table, the record of the second object as an object newly detected in the detectable area.

5. The communication terminal of claim 1, wherein the circuitry is further configured to
   detect the first object in a detectable area,
   determine whether the first position of the first object at the first point of time is within a verification area, the verification area being smaller than the detectable area,
   refrain from transmitting the first image data based on a determination that the first position of the first object is out of the verification area, and
   transmit the first image data to request for verification of the first image data, based on a determination that the first position of the first object is within the verification area.

6. The communication terminal of claim 5, wherein the circuitry is further configured to count a number of objects that have entered the verification area, and
   control a display to display information indicating the counted number of objects.

7. The communication terminal of claim 6, wherein the circuitry increments the number of objects by one, when the first object that has been verified exits the verification area.

8. The communication terminal of claim 1, wherein the circuitry is further configured to calculate a difference in area between the first image data and the second image data; and
   control not to transmit the second image data based on a determination indicating that the area difference is equal to or greater another threshold and the determination indicating that the calculated distance is equal to or less than the threshold.

9. The communication terminal of claim 1, wherein the circuitry is further configured to
   control emission of light from a light source,
   measure a distance from the communication terminal to the second object, based on a time period between a time when the light is emitted from the light source to the second object, and a time when reflected light from the second object is received,
   determine that the second object is a single object and control not to transmit the second image data, based on a determination that the measured distance to the second object is less than a predetermined value, and
   determine that the second object is a plurality of objects, and re-calculate a distance between the first position and a second position indicating a position of each of the plurality of second objects, based on a determination that the measured distance to the second object is equal to or greater than the predetermined value.

10. The communication terminal of claim 1, wherein the circuitry is further configured to transmit the first image data in an encoded format to the server.

11. A communication system comprising:
a data processing terminal; and
the communication terminal of claim 1, the communication terminal being configured to communicate with the server via the data processing terminal,
the data processing terminal being configured to:
transmit a request for verifying the first object represented by the first image data, to the server, and
receive a response including a verification result.

12. The communication system of claim 11, wherein the data processing terminal is further configured to control a display to display information generated based on the verification result received from the server.

13. The communication system of claim 12, wherein the circuitry of the communication terminal is further configured to count a number of objects that have been verified, and transmit the counted number of objects to the data processing terminal, and
wherein the data processing terminal is configured to display, on a display, information indicating the counted number of objects in addition to the verification result.

14. A method of controlling communication of data with a server, the method comprising:
obtaining first image data of at least a part of a first object detected at a first point of time;
transmitting the first image data to the server to request verification of the first image data;
obtaining second image data of at least a part of a second object detected at a second point of time, the second point of time being a time later than the first point of time;
calculating a distance between a first position indicating a position of the first object at the first point of time, and a second position indicating a position of the second object at the second point of time; and
controlling not to transmit the second image data based on a determination indicating that the calculated distance is equal to or less than a threshold.

15. A non-transitory recording medium which, when executed by one or more processors, cause the processors to perform a method of controlling communication of data with a server, the method comprising:
obtaining first image data of at least a part of a first object detected at a first point of time;
transmitting the first image data to the server to request verification of the first image data;
obtaining second image data of at least a part of a second object detected at a second point of time, the second point of time being a time later than the first point of time;
calculating a distance between a first position indicating a position of the first object at the first point of time, and a second position indicating a position of the second object at the second point of time; and
controlling not to transmit the second image data based on a determination indicating that the calculated distance is equal to or less than a threshold.

* * * * *